US012727541B2

(12) United States Patent
Ehle et al.

(10) Patent No.: US 12,727,541 B2
(45) Date of Patent: Sep. 8, 2026

(54) HARVESTER ROW UNIT IMPACT ABSORBING AND KERNEL RETAINING STALK GAP RAILS

(71) Applicant: Davaus, LLC, Hoagland, IN (US)

(72) Inventors: Austin D. Ehle, Fort Wayne, IN (US); David J. Hockemeyer, Hoagland, IN (US); Treg Shidler, Clay City, IN (US); Andrew Fuelling, Decatur, IN (US)

(73) Assignee: Davaus, LLC, Hoagland, IN (US)

( * ) Notice: Subject to any disclaimer, the term of this patent is extended or adjusted under 35 U.S.C. 154(b) by 511 days.

(21) Appl. No.: 18/377,098

(22) Filed: Oct. 5, 2023

(65) Prior Publication Data

US 2024/0114837 A1 Apr. 11, 2024

Related U.S. Application Data

(60) Provisional application No. 63/414,193, filed on Oct. 7, 2022.

(51) Int. Cl.
*A01D 45/02* (2006.01)
*A01D 47/00* (2006.01)

(52) U.S. Cl.
CPC ............ *A01D 45/023* (2013.01); *A01D 47/00* (2013.01)

(58) Field of Classification Search
CPC .................................................... A01D 45/023
See application file for complete search history.

(56) References Cited

U.S. PATENT DOCUMENTS 3,894,382 A * 7/1975 Jauss .................... A01D 45/021 56/14.3
4,845,930 A 7/1989 Dow
5,060,464 A 10/1991 Caron
5,704,202 A 1/1998 Calmer
6,237,312 B1 5/2001 Becker
(Continued)

FOREIGN PATENT DOCUMENTS

EP 2335470 A1 6/2011

OTHER PUBLICATIONS

International Search Report in related PCT/US23/34605.
Written Opinion of the International Search Authority in related PCT/US23/34605.

*Primary Examiner* — Joseph M Rocca
*Assistant Examiner* — Rohan Om Patel
(74) *Attorney, Agent, or Firm* — George Pappas; Barrett McNagny LLP

(57) ABSTRACT

A harvester row unit comprises first and second deck plates having first and second stripping edges which are facing and spaced apart for defining a stalk gap therebetween, first and second gathering chains extending over the first and second deck plates and comprising a plurality of sweeping lugs which traverse adjacent to and along the stalk gap, and one or more elastically compressible stalk gap rails mounted to the first and second deck plates adjacent to and extending along the first and second stripping edges. The stalk gap rails include a ramped leading end and a trailing end, and the sweeping lugs climb up the ramped leading end, traverse across the stalk gap rails, and climb down the trailing end, and/or include support pads and pockets between adjacent support pads defining one or more flexible walls which deform when impacted by kernel carriers.

21 Claims, 43 Drawing Sheets

(56) References Cited

U.S. PATENT DOCUMENTS

| | | | | |
|---|---|---|---|---|
| 6,370,853 | B1 | 4/2002 | Randall et al. | |
| 7,073,316 | B2 | 7/2006 | Resing et al. | |
| 7,373,767 | B2 | 5/2008 | Calmer | |
| 7,874,134 | B1 * | 1/2011 | Hoffman | A01D 45/023<br>56/119 |
| 7,913,480 | B2 | 3/2011 | Christensen et al. | |
| 8,171,708 | B2 | 5/2012 | Calmer | |
| 8,196,380 | B2 | 6/2012 | Carboni | |
| 8,286,410 | B2 | 10/2012 | Priepke et al. | |
| 8,857,139 | B1 | 10/2014 | Calmer | |
| 9,788,487 | B2 | 10/2017 | Walker | |
| 9,961,830 | B2 | 5/2018 | Gengerke | |
| 10,674,665 | B2 | 6/2020 | Calmer | |
| 11,058,059 | B2 | 7/2021 | Crow et al. | |
| 2008/0092507 | A1 * | 4/2008 | Bollig | A01D 45/021<br>56/106 |
| 2014/0230392 | A1 * | 8/2014 | Dybro | G01L 1/00<br>56/10.2 R |
| 2017/0164555 | A1 * | 6/2017 | Gengerke | A01D 45/025 |
| 2017/0238467 | A1 * | 8/2017 | Gessel | A01D 45/023 |
| 2021/0329839 | A1 * | 10/2021 | Calmer | A01D 45/021 |

* cited by examiner 94
92
96
90
106

102
90
92
98

86
98
102
170a
6e
6e 106
96
94
100
170b
104
88
86
98
102
170a 90
92
170b
100
104
88

86
X
126
124
126
94
124
126
124
126
12c
X
96
88

172
90
174
144
96
94
140
92
112
126
142
124
94
96
144
126
12d
12d
92

110
34
90
96
92
152
94
90
94
34
152
84
72a
30a
72b
30b
28

110
94
34
92
152
94
82a
82b
34
72a
30a
72b
30b
28

124
172'
112'
174'
112w'
144'

106
112'
172'
112w'
144'
124
106
112'
112w'
174'
124
106
112'
112w'
31c
106
124
144'
112w'
112'
34'
106

HARVESTER ROW UNIT IMPACT ABSORBING AND KERNEL RETAINING STALK GAP RAILS

CROSS REFERENCE TO RELATED APPLICATIONS

This application claims priority under 35 U.S.C. 119(e) of U.S. provisional patent application Ser. No. 63/414,193 filed on Oct. 7, 2022, entitled Harvester Row Unit Impact Absorbing and Kernel Retaining Stalk Gap Rails, the disclosure of which is hereby incorporated herein by reference.

BACKGROUND OF THE INVENTION

1. Field of the Invention

The present invention relates to grain harvesting machines. More particularly, the present invention is directed to devices which can be secured to row units of a harvesting machine for reducing crop yield loss resulting from kernels being stripped/dislodged from their cobs, pods, shells and stems during harvesting thereof.

2. Background

Grains such as wheat, rice, oats, rye, barley, corn (maize), sorghum, millet, soybeans, flax (linseed), sunflowers and rapeseed, the kernels of which grow in or on a cob, pod or shell referred to herein as a "kernel carrier" are typically harvested using a header mounted to a harvester combine. The header is mounted to the front of the harvester combine whereby, as the harvester combine travels through a crop field, the header receives the plants. Typically, harvester combines further include a thresher located in a central section of the harvester combine and a transportation unit (such as, for example, an auger or draper) mounted between the header and the thresher for transporting harvested plants therebetween.

The header comprises a plurality of horizontally spaced apart, side-by-side row units which can be aligned with rows of plants in a field. Each row unit comprises a pair of deck plates which are generally parallel and spaced apart from each other for defining a stalk gap therebetween. The stalk gap is sized to receive the stalk of a plant while preventing the kernel carrier of the plant from falling therethrough. Accordingly, as the harvester combine traverses along the field, the plant stalks are received into the stalk gaps and the kernel carriers are captured above the deck plates.

The row units further include a pair of parallel, counter rotating stalk pulling rolls which are disposed beneath, and aligned with, the stalk gap. As the plant stalks enter the stalk gap, the stalk pulling rolls grab and pull the stalks downward, thereby bending the stalks and pulling the kernel carriers against the deck plates for thereby separating the kernel carriers from the stalks.

Typically, row units further comprise a pair of gathering chains supported atop the deck plates with one gathering chain on each side of the stalk gap. The gathering chains include sweeping lugs that extend horizontally outward therefrom. As the gathering chains rotate, the sweeping lugs travel across the deck plates adjacent to and along the stalk gap for thereby sweeping the detached kernel carriers across the top of the deck plates to the transportation unit. The transportation unit then conveys the kernel carriers to the thresher for further processing.

However, when the kernel carriers are pulled against the deck plates by the stalk pulling rolls, detached kernels and kernels that contact the edges of the deck plates are known to scrape off or be dislodged from the kernel carriers. These kernels tend to fall through the stalk gap, thereby resulting in crop yield loss.

To mitigate crop yield loss, there are known row units that incorporate rails disposed along the edge of the deck plates adjacent to the stalk gap which are adapted to prevent detached kernels from falling through the stalk gap. Examples of prior row units incorporating rails disposed along the edge of the deck plates adjacent to the stalk gap are shown and described in Crow et al., U.S. Pat. No. 11,058,059, Gengerke, U.S. Pat. No. 9,961,830, and Dow, U.S. Pat. No. 4,845,930.

Additionally, there are known row units that incorporate cushioning devices for cushioning the impact of the kernel carriers against the deck plates and thereby reducing the tendency for kernels to be scraped off or otherwise dislodged from the kernel carriers. For example, there are known row units that incorporate spring suspended deck plates, cushioning devices attached to the sweeping lugs, or cushioning strips secured to the deck plates and extending along the stalk gap. Examples of prior row units incorporating such devices are shown and described in Gengerke, U.S. Pat. No. 9,961,830, Carboni, U.S. Pat. No. 8,196,380, and Dow, U.S. Pat. No. 4,845,930.

Although there are known row units which include or which can be modified to incorporate devices which prevent detached kernels from falling through the stalk gap and/or which cushion the impact of the kernel carriers against the deck plates, these devices require significant and, in many instances, costly modifications to the row units/deck plates. Accordingly, a need exists for an improved, more cost-efficient device which can be easily incorporated into an existing row unit and simultaneously cushions/dampens the impact of the kernel carriers and prevents detached kernels from falling through the stalk gap.

SUMMARY OF THE INVENTION

In one form thereof, the present invention is directed to a harvester row unit comprising a first deck plate having a first stripping edge and a second deck plate having a second stripping edge, wherein the first and second stripping edges can be facing and spaced apart for defining a stalk gap therebetween. A first gathering chain extends over the first deck plate, a second gathering chain extends over the second deck plate, and one or more elastically compressible stalk gap rails can be mounted to the first and second deck plates adjacent to and extending along the first and second stripping edges, the stalk gap rails having a ramped leading end and a trailing end. The first gathering chain and the second gathering chain can each comprise a plurality of sweeping lugs adapted to traverse adjacent to and along the stalk gap. As the sweeping lugs traverse adjacent to and along the stalk gap, the sweeping lugs can engage the stalk gap rails and climb up the ramped leading end, traverse across the stalk gap rails, and climb down the trailing end.

Preferably, the stalk gap rails are constructed from a material other than metal. Yet more preferably, the stalk gap rails are constructed from ultra-high molecular weight polyethylene, high-density polyethylene, nylon, or other similarly resilient, high wear-resistant engineered polymers.

Preferably, the stalk gap rails can include support pads which abut the first and second deck plates and flexible beams which are supported above the first and second deck plates by the support pads.

Preferably, the trailing end of the stalk gap rails is ramped.

Preferably, the stalk gap rails are mounted to the first and second deck plates with one or more fasteners each of which is received through a fastener bore extending through the stalk gap rail, and wherein one or more pockets are formed in the stalk gap rails between adjacent fastener bores.

Preferably, agitating portions are provided adjacent the stalk gap rails. Yet more preferably, the agitating portions are adjacent the ramped leading ends.

Preferably, the agitating portions comprise dam plates which extend from the stalk gap rails away from the stalk gaps and agitating protrusions which extend from the dam plates away from the first and second deck plates.

Preferably, the harvester row unit can further include one or more rail end retaining elements mounted to the first and second deck plates adjacent to the stalk gap rail ramped leading ends. The rail end retaining elements can be adapted to prevent lodging of debris under the ramped leading ends.

Preferably, the one or more rail end retaining elements comprise retaining fasteners which are adapted to be secured to the first and second deck plates. Yet more preferably, the one or more rail end retaining elements comprise ramped portions having rail end receiving pockets formed therein and agitating portions extending from the ramped portions, wherein the ramped leading ends are received into rail end receiving pockets. Preferably, the agitating portions extend from the ramped portions away from the respective first and second stripping edges.

In another form thereof, the present invention is directed to a harvester row unit comprising a first deck plate having a first stripping edge and a second deck plate having a second stripping edge, wherein the first and second stripping edges can be facing and spaced apart for defining a stalk gap therebetween. A first gathering chain extends over the first deck plate, a second gathering chain extends over the second deck plate, and one or more elastically compressible stalk gap rails can be mounted to the first and second deck plates adjacent to and extending along the first and second stripping edges. The first gathering chain and the second gathering chain can each comprise a plurality of sweeping lugs adapted to traverse adjacent to and along the stalk gap. The stalk gap rails can comprise an elongate body including a plurality of support pads and one or more pockets between adjacent support pads defining one or more flexible walls. The flexible walls elastically deform when impacted by kernel carriers.

Preferably, the elongate body is constructed from a first elastic polymer and one or more of the pockets are filled with a second elastic polymer. Yet more preferably, the first elastic polymer is more wear-resistant than the second elastic polymer, and the second elastic polymer is more pliable than the first elastic polymer.

Preferably, the first elastic polymer is a high density, wear-resistant polymer and the second elastic polymer is a low-density, pliable elastic polymer. Yet more preferably, the first elastic polymer is constructed from a material selected from the group consisting of ultra-high molecular weight polyethylene, high-density polyethylene, and nylon, and the second elastic polymer is constructed from a material selected from a group consisting of silicone, polyurethane and rubber.

Preferably, the body further comprises opposite, longitudinal side surfaces wherein a pair of side rail walls are defined between the longitudinal side surfaces and the pockets, and wherein one or more slots are formed extending through one of the side rail walls, through the bottom rail surface, and into one or more of the pockets. Yet more preferably, one or more of the pockets and one or more of the slots are filled with a pliable elastic material.

BRIEF DESCRIPTION OF THE DRAWINGS

The above-mentioned and other features of this invention and the manner of attaining them will become more apparent, and the invention itself will be better understood by reference to the following description of the embodiments of the invention, taken in conjunction with the accompanying drawings, wherein.

Figure 1:
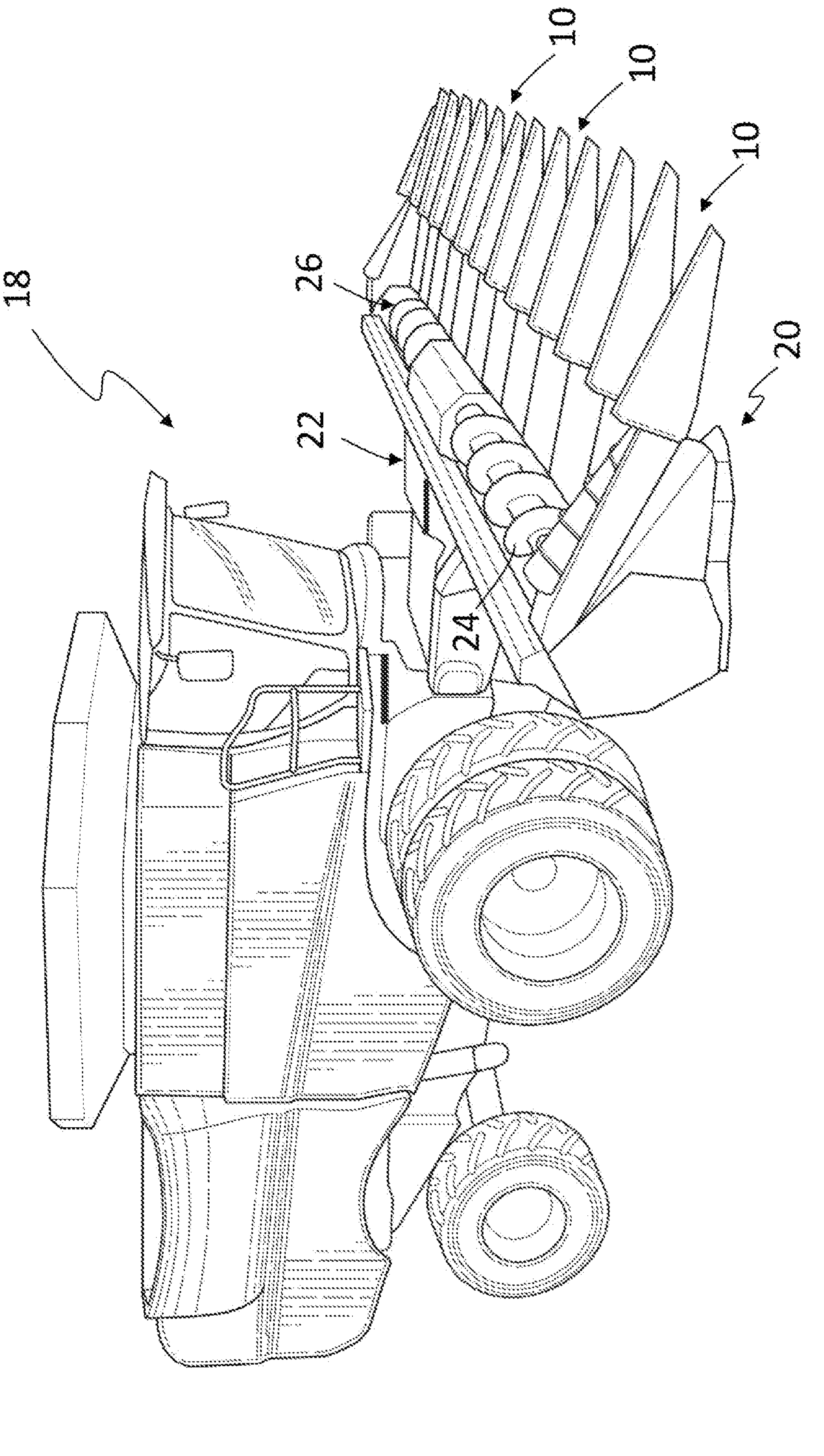
FIG. 1 is a perspective view of a harvesting machine having an attached header for harvesting corn plants.

Corresponding reference characters indicate corresponding parts throughout several views. Although the exemplification set out herein illustrates certain embodiments of the invention, the embodiments disclosed below are not intended to be exhaustive or to be construed as limiting the scope of the invention to the precise form disclosed.

DETAILED DESCRIPTION OF THE PREFERRED EMBODIMENTS

A harvester row unit constructed in accordance with the principles of the present invention is shown and designated by the numeral 10. The row unit 10 is adapted for harvesting plants such as corn 12 having stalks 14 with kernel carriers such as corn ears/corncobs 16 attached to and extending therefrom.

Figure 2:
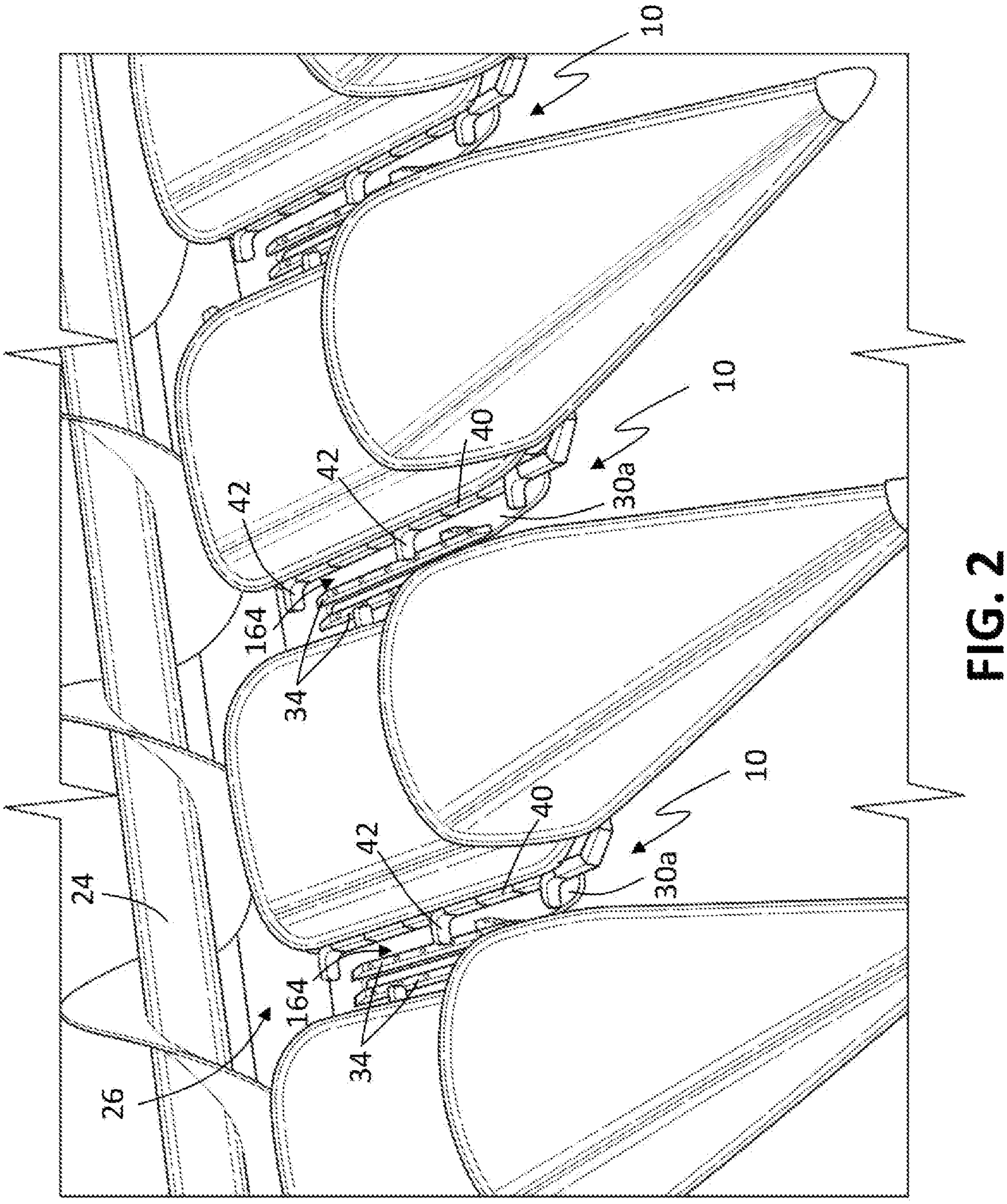
FIG. 2 is a perspective view of the header of FIG. 1 showing a plurality of row units supported on the header and constructed in accordance with the principles of the present invention.

As best seen in FIGS. 1-2, a plurality of row units 10 can be deployed on a header 20 of a harvester combine 18. The header 20 includes a header frame 22 which mounts to the harvester combine 18 and supports the row units 10. An auger 24 and a trough 26 are secured to the header frame 22 behind the row units 10.

As best seen in FIG. 2, the row units 10 are spaced horizontally apart from each other at regular intervals along the header frame 22. Preferably, the row units 10 are spaced at intervals for thereby aligning with rows of corn plants 12 in a field. In the present exemplary embodiment, each row unit 10 comprises a row unit frame 28, a pair of deck plates 30*a*, 30*b*, a pair of counter rotating stalk pulling rolls 32, a pair of stalk gap/dampening rails 34, a pair of drive sprockets 36, a pair of idler sprockets 38, a pair of gathering chains 40, and a plurality of sweeping lugs 42.

Figure 5A:
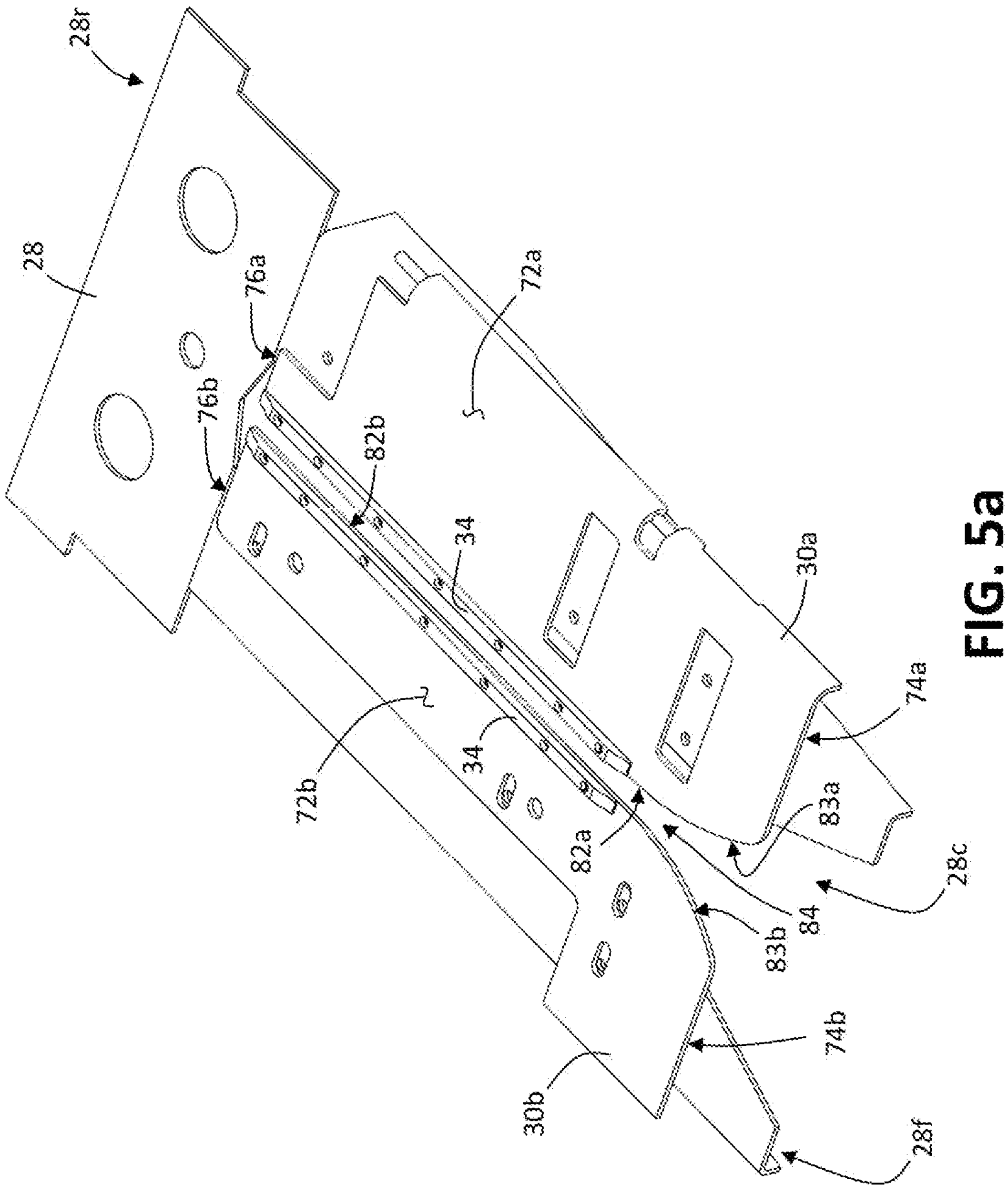
FIG. 5*a* is a perspective view of the row unit with the gathering chains, the sweeping lugs, and the drive and idler sprockets removed for greater clarity.

As best seen in FIG. 5*a*, each row unit frame 28 includes a header frame engaging rear end 28*r* and a crop facing front end 28*f*. The rear end 28*r* is adapted to be secured to the header frame 22 for mounting the row unit 10 thereto, and the front end 28*f* projects outwardly from the header frame 22. The frame 28 further includes a central, crop receiving frame channel 28*c* which extends into the front end 28*f* towards the rear end 28*r*. In operation, as the row unit 10 engages corn plants 12, the corn plant stalks 14 enter the crop receiving frame channel 28*c* at the front end 28*f* and traverse through the frame channel 28*c* towards the rear end 28*r*.

Figure 5B:
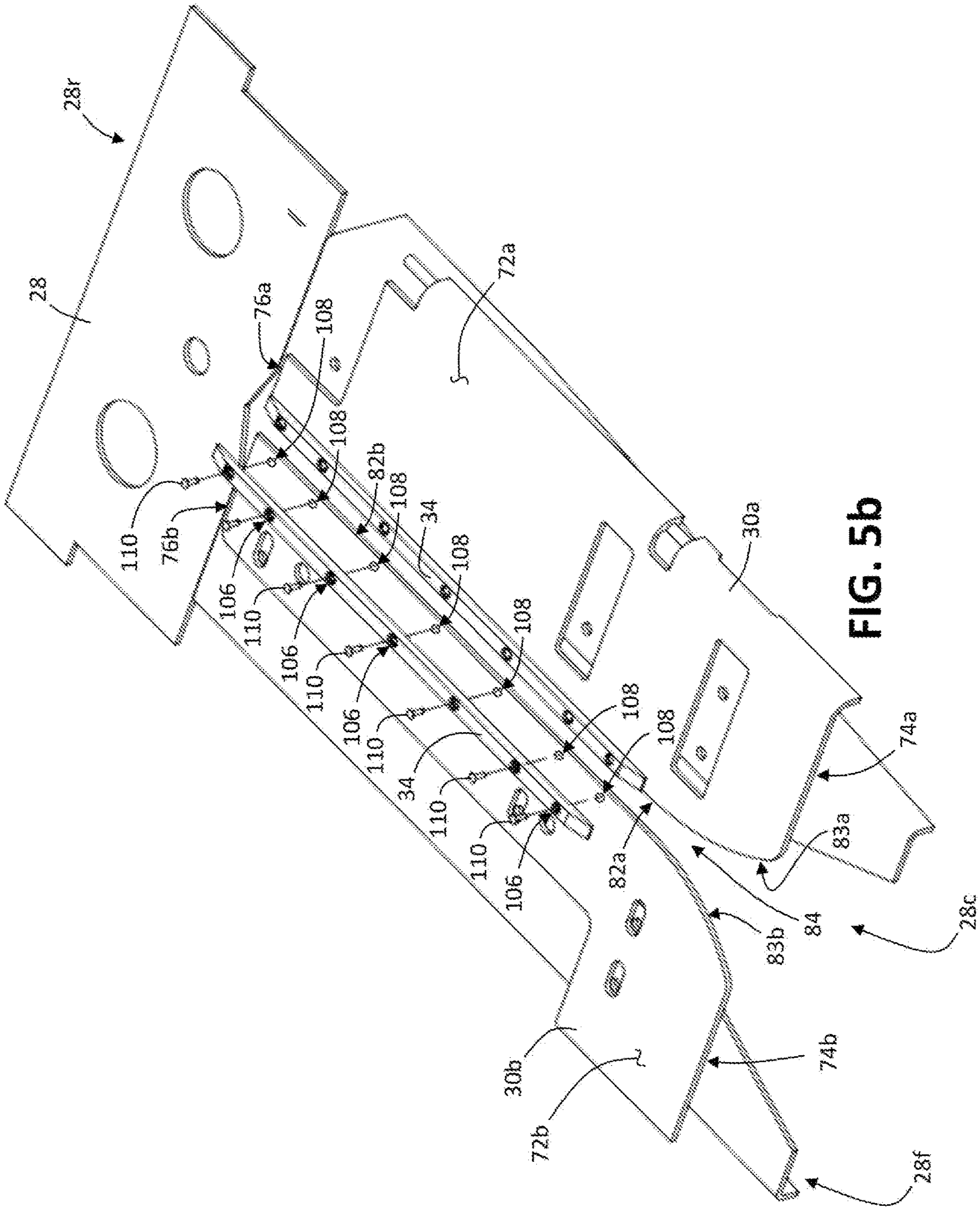
FIG. 5*b* is a partially exploded perspective view of the row unit shown in FIG. 5*a* showing the dampening/stalk gap rail and rail fasteners in an exploded state.

As shown in FIGS. 5*a-b*, the deck plates 30*a*, 30*b* include respective top surfaces 72*a*, 72*b*, first terminal ends 74*a*, 74*b*, and second terminal ends 76*a*, 76*b*. The deck plates 30*a*, 30*b* further include stripping edges 82*a*, 82*b* extending between first terminal ends 74*a*, 74*b*, and second terminal ends 76*a*, 76*b*, respectively. The deck plates 30*a*, 30*b* are mounted on top of the row unit frame 28 in a known and customary manner, one on either side of the frame channel 28*c* with the first terminal ends 74*a*, 74*b* thereof adjacent the frame front end 28*f* Preferably, the deck plates 30*a*, 30*b* are spaced horizontally apart with the stripping edges 82*a*, 82*b* generally parallel and facing each other for defining a stalk gap 84 therebetween. As shown in FIG. 5*a*, the stalk gap 84 can be aligned with the frame channel 28*c* and corn stalks 14 can be received and traverse through the stalk gap 84 and the frame channel 28*c* simultaneously.

Preferably, the stripping edges 82*a*, 82*b* include diverging curved portions 83*a*, 83*b* adjacent the deck plate first terminal ends 74*a*, 74*b*. The diverging curved portions 83*a*, 83*b* curve horizontally away from each other and are adapted to funnel corn stalks 14 into the stalk gap 84 as the harvester combine 18 traverses through the field of corn plants 12.

Figure 3:
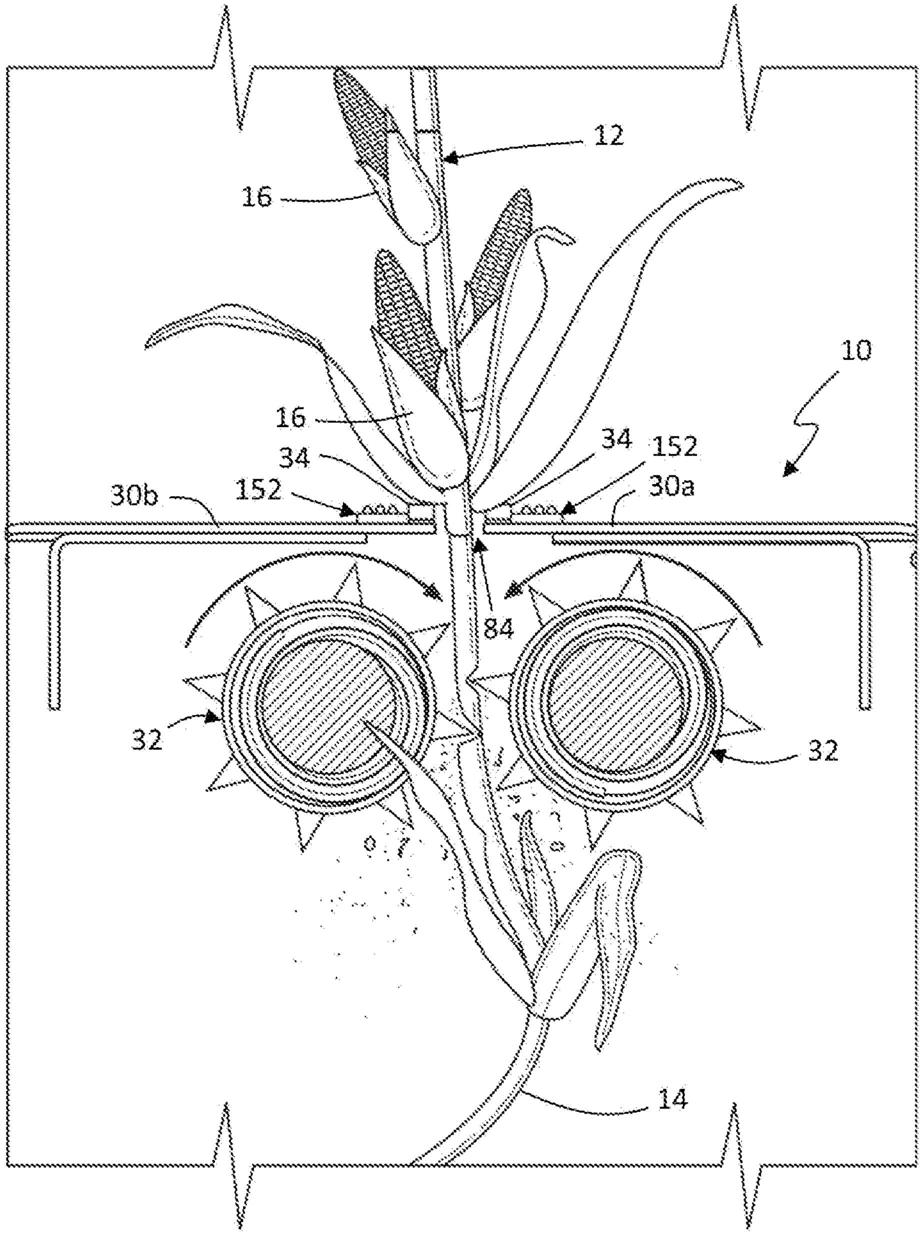
FIG. 3 is a front plan view of the row unit of FIG. 2 engaging a corn plant.

As best seen in FIG. 3, the stalk pulling rolls 32 extend parallel to one another and are disposed beneath, and can be aligned parallel with, the stalk gap 84. Preferably, the stalk pulling rolls 32 are supported and driven by a drive system (not shown) which is commonly available on the market. In operation, as corn plants 12 enter a row unit 10, the stalks 14 are directed into the stalk gap 84 and engage the counter rotating stalk pulling rolls 32 which grab and pull the stalks 14 downward for thereby pulling the corn ears 16 against the row unit 10. As the corn ears 16 strike and are pulled against the row unit 10, they are separated from the stalks 14 and are thereafter collected into the trough 26 by the gathering chains 40 and the sweeping lugs 42. Additionally, after the corn ears 16 are separated from the stalks 14, the stalk pulling rolls 32 can be adapted to sever/cut/mulch the stalks 14.

Preferably, the row unit further includes a hydraulically actuated rocker arm system (not shown) which is known and commonly available on the market. The right deck plate 30*a* can be operably linked to the hydraulically actuated rocker arm system for enabling an operator to selectively adjust the width of the stalk gap 84. For example, the hydraulically actuated rocker arm system can be used for selectively sliding/moving deck plate 30*a* across the row unit frame 28, thereby allowing the operator to selectively adjust the width of the stalk gap 84 to loosely receive stalks 14 while preventing corn ears 16 from passing therethrough.

Figure 4:
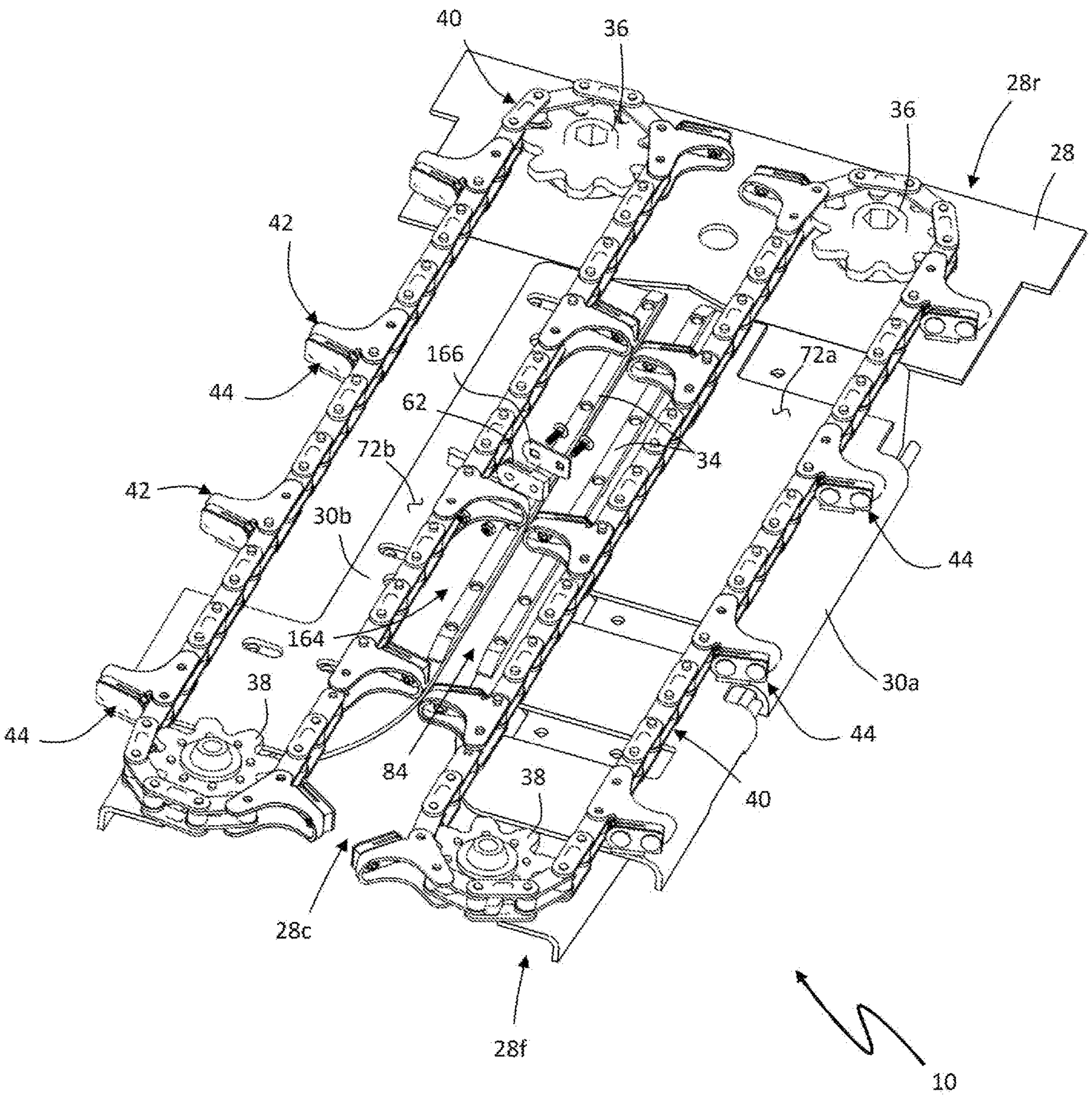
FIG. 4 is a perspective view of the row unit with some components removed for greater clarity.

As shown in FIG. 4, the pair of drive sprockets 36 can be mounted adjacent to the row unit frame rear end 28*r* and the idler sprockets 38 can be mounted adjacent the front end 28*f*, or vice versa. Each drive sprocket 36 is aligned with a corresponding idler sprocket 38 with a pair of drive and idler sprockets 36, 38 on each side of the stalk gap 84. Gathering chains 40 can be deployed about the pairs of drive and idler sprockets 36, 38 and can be slidingly supported on the top deck surfaces 72*a*, 72*b* with one gathering chain 40 on each side of the stalk gap 84.

Preferably, one or more sweeping lugs 42 can be provided on each gathering chain 40. As the gathering chains 40 rotate, the sweeping lugs 42 travel adjacent to and along the stalk gap 84 and sweep the detached corn ears 16 across the top of the deck plates 30*a*, 30*b* to the trough 26 and the auger 24. As best seen in FIG. 7*c*, each sweeping lug 42 includes a mounting section 54 and a sweeping protrusion 56 extending from the mounting section 54. The mounting sections 54 can be secured to the gathering chains 40 for mounting the sweeping lugs 42 thereto, and the sweeping protrusions 56 extend outwardly from the gathering chains 40 and are adapted to engage and sweep the detached corn ears 16 across the top deck surfaces 72*a*, 72*b*.

Figures 7A, 7B:
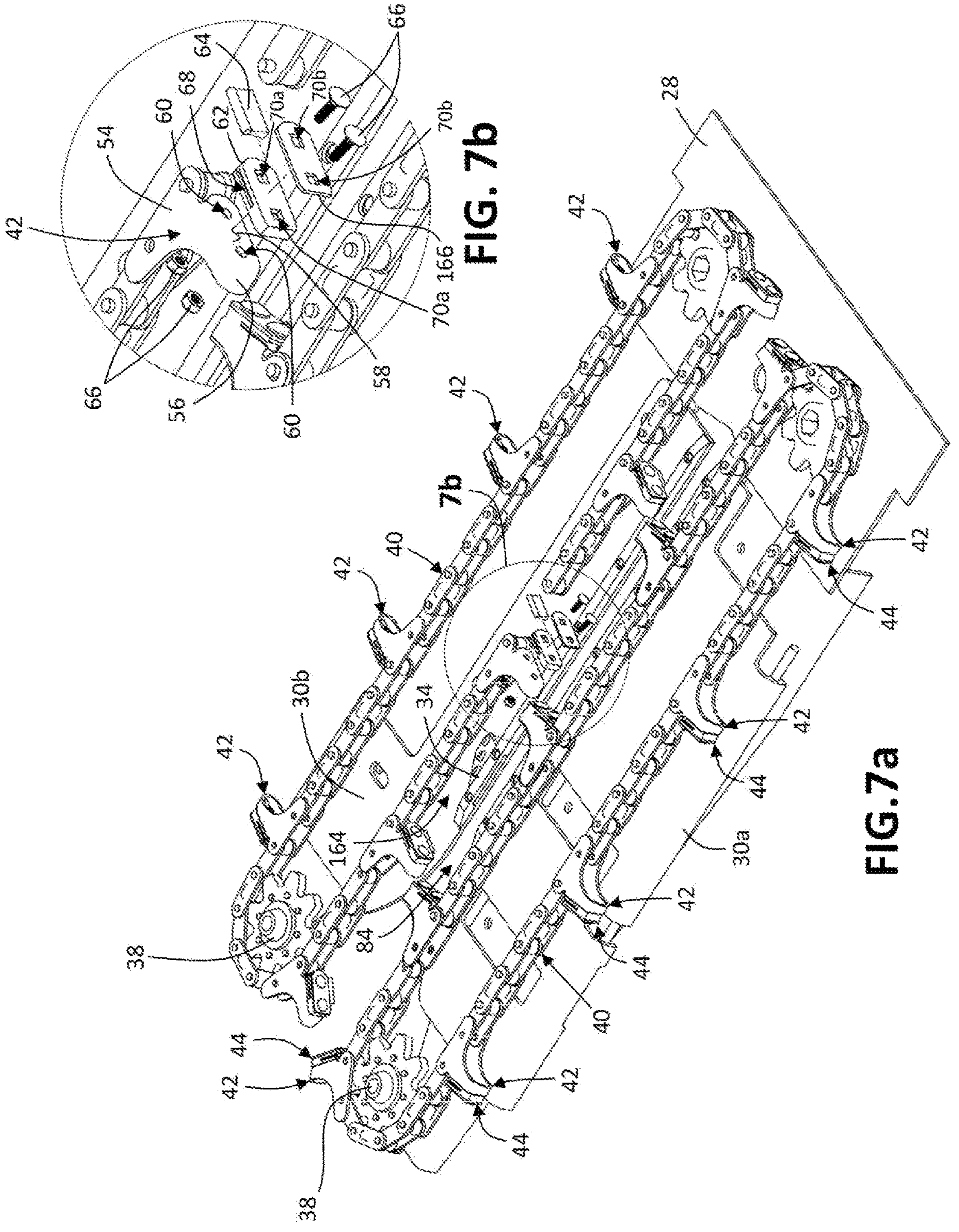
FIG. 7*a* is another perspective view of the row unit shown in FIG. 4.
FIG. 7*b* is a magnified detail view of the Circled Detail 7*b* shown in FIG. 7*a;*
Figure 7C:
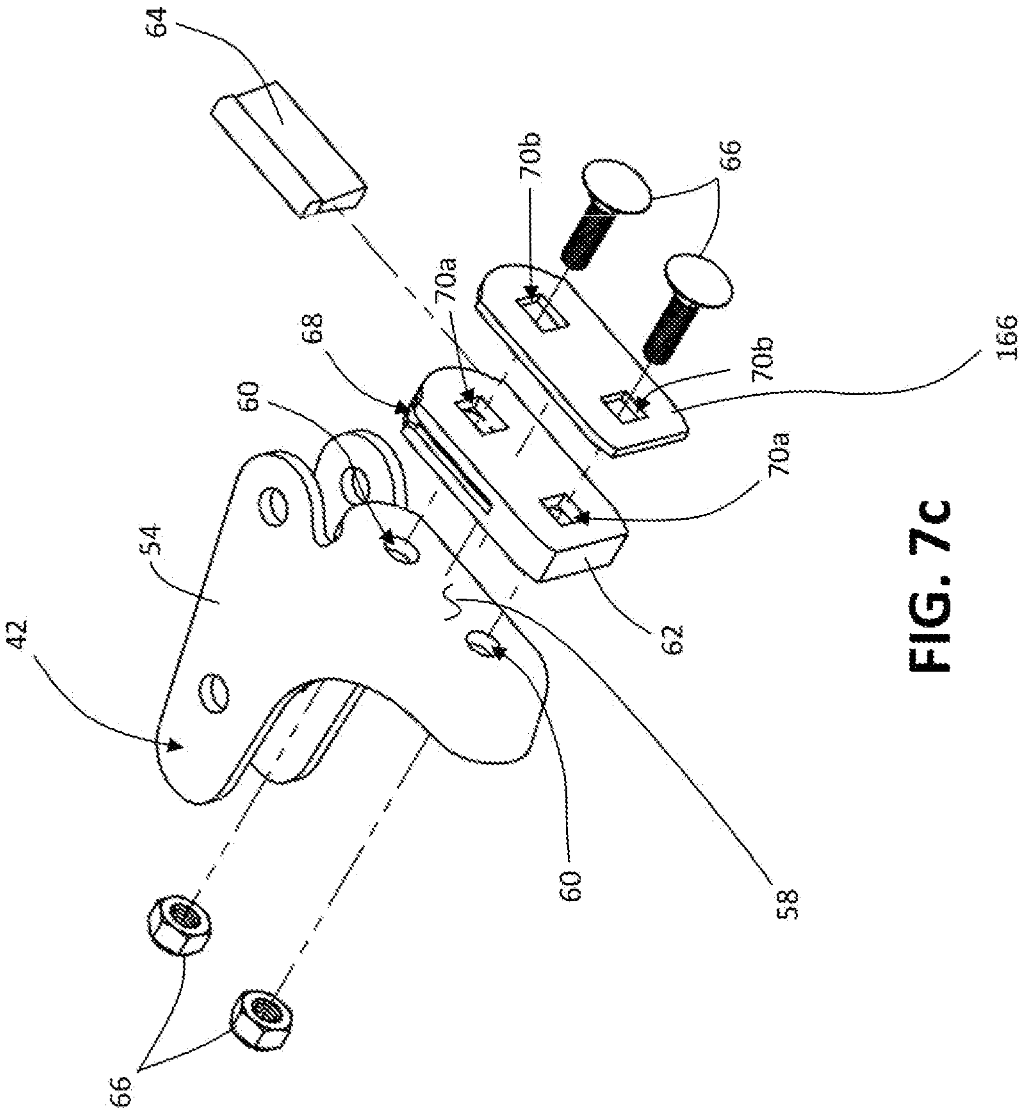
FIG. 7*c* is an exploded perspective view of the sweeping lug and sweeping member shown in FIG. 7*b;*
Figure 8A:
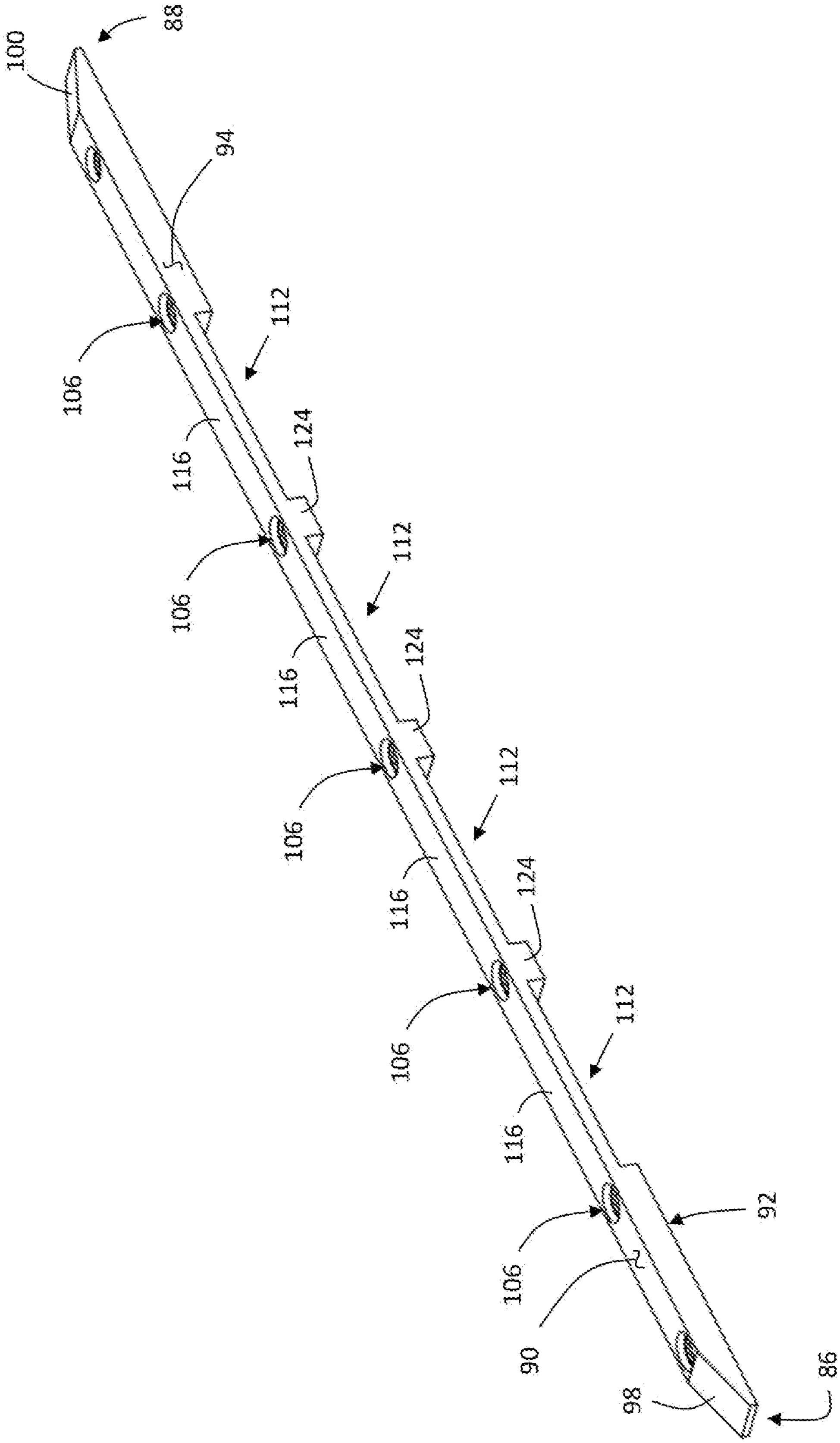
FIG. 8*a* is a perspective view of a stalk gap rail having windows, flexible walls, and support/fastener pads.
Figure 8D:
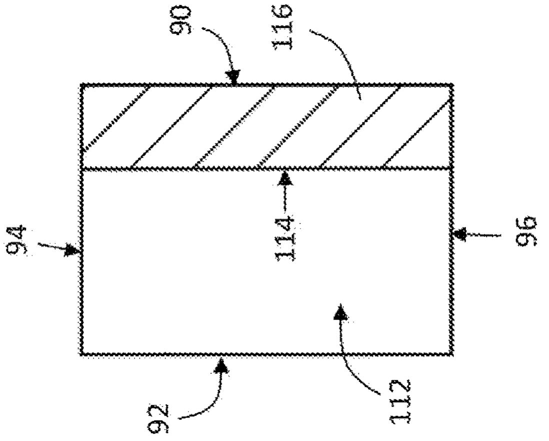
FIG. 8*d* is a cross section view of the stalk gap rail taken along the line 8*d*-8*d* shown in FIG. 8*c;*
Figure 8C:
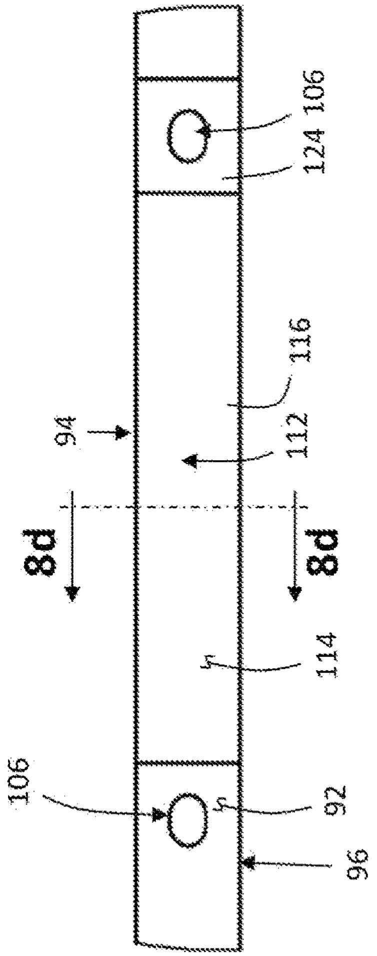
FIG. 8*c* is a magnified detail view of the Circled Detail 8*c* shown in FIG. 8*b;*
Figure 8B:
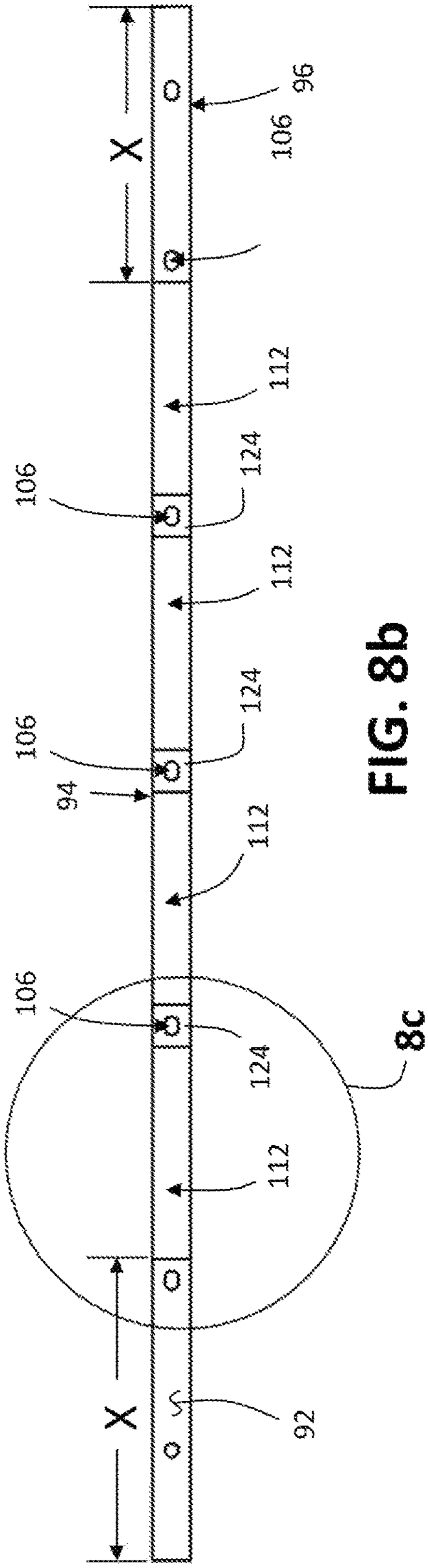
FIG. 8*b* is a bottom plan view of a stalk gap rail having dampening pockets.

As best seen in FIGS. 7*a-c*, sweeping members 44 can be secured to one or more of the sweeping lugs 42. The sweeping members 44 are, preferably, mounted to the sweeping protrusions 56 and extend towards, and brush against, the top deck surfaces 72*a*, 72*b*. As the gathering chains 40 rotate, the sweeping members 44 can be adapted to sweep detached kernels towards the trough 26 and the auger 24.

As shown in FIGS. 4 and 5, the stalk gap rails 34 are mounted to the top deck surfaces 72*a*, 72*b* adjacent to and extending along the stalk gap 84 with a stalk gap rail 34 extending along each stripping edge 82*a*, 82*b*. As mentioned hereinabove, as corn plants 12 engage the row unit 10, the corn plant stalks 14 traverse through the stalk gap 84 and engage and are pulled downwardly by the stalk pulling rolls 32. As the stalks 14 are pulled downwardly, the corn ears 16 attached thereto are pulled downwardly against and strike the stalk gap rails 34.

In this regard, the stalk gap rails 34 are adapted to be elastically compressed against the deck plates 30*a*, 30*b* by the impact of the corn ears 16 for cushioning/dampening the impact and thereby reducing the number of kernels dislodged from the corn ears 16. Preferably, the stalk gap rails 34 can be constructed from a resilient, high-wear resistant, elastic material such as, for example, ultra-high molecular weight polyethylene, high-density polyethylene, nylon, and other similar high wear-resistant engineered polymer materials.

As best seen in FIGS. 6*a-e*, each stalk gap rail 34 can comprise leading and trailing ends 86, 88, top and bottom rail surfaces 90, 92, and opposite longitudinal side surfaces 94, 96. The stalk gap rails 34 can be mounted to the deck plates 30*a*, 30*b* with the bottom rail surfaces 92 abutting the top deck surfaces 72*a*, 72*b* and with the longitudinal side surfaces 94 (hereinafter the "stalk gap abutting surfaces 94") extending along the deck plate stripping edges 82*a*, 82*b*, respectively.

Preferably, the stalk gap rails 34 can include a plurality of rail bores 106 provided at regular intervals between the leading and trailing ends 86, 88 and, more preferably, extending through the stalk gap rail support/fastener pads 124. As best seen in FIG. 5*b*, a corresponding plurality of fastener bores 108 can be provided extending through the deck plates 30*a*, 30*b* adjacent to the stripping edges 82*a*, 82*b*. The rail bores 106 can be aligned with the fastener bores 108 and rail fasteners 110 can be extended through the rail bores 106 and into or through the fastener bores 108 for thereby securing stalk gap rails 34 to the deck plates 30*a*, 30*b*.

Preferably, the rail fasteners 110 are, for example, rivets, screws adapted to threadingly engage the deck plate fastener bores 108, or nuts and bolts (not shown).

Figure 6A:
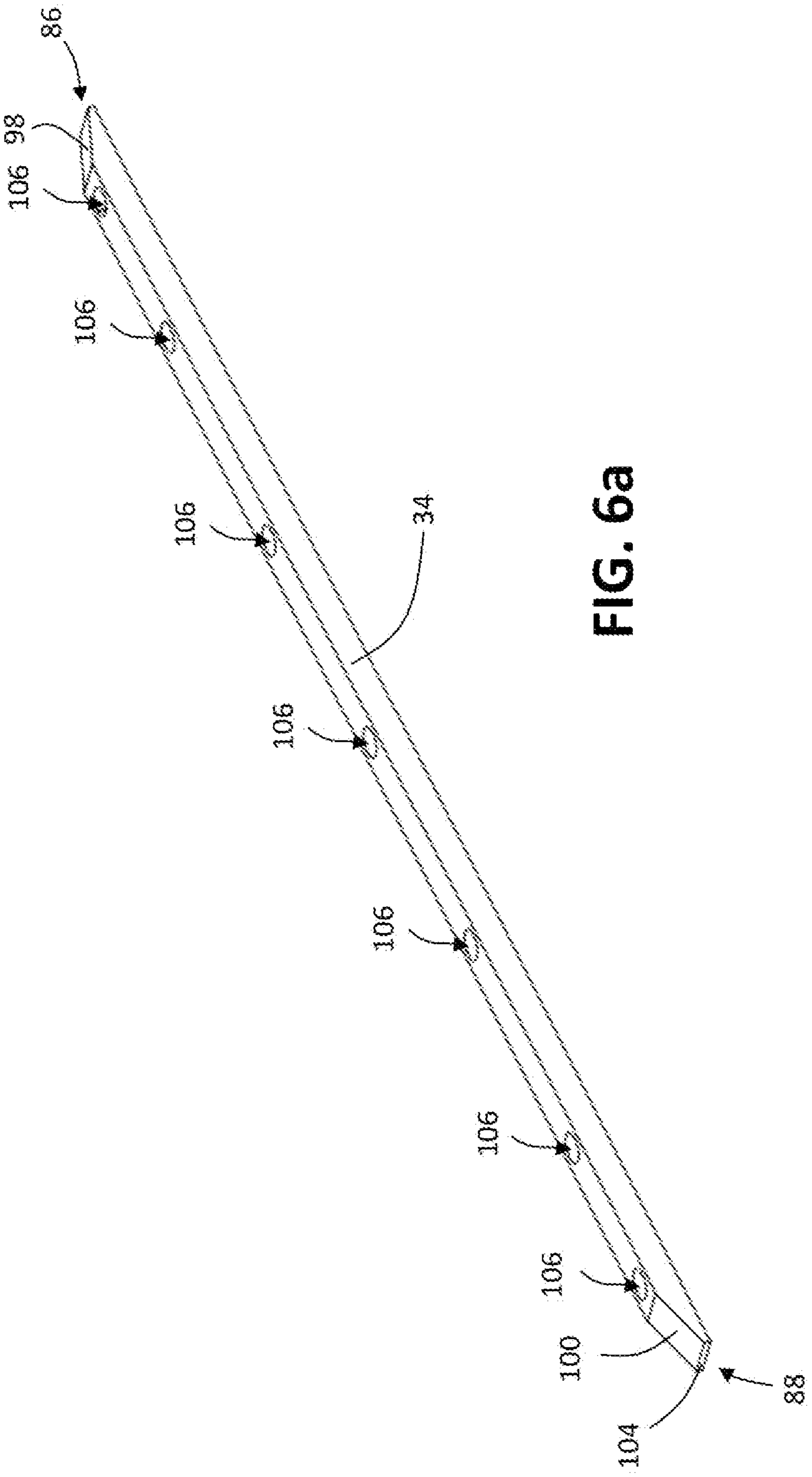
FIG. 6*a* is a perspective view of a dampening/stalk gap rail.
Figure 6E:
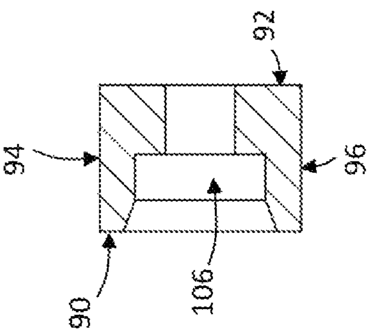
FIG. 6*e* is a cross section view of the stalk gap rail taken along the line 6*e*-6*e* shown in FIG. 6*c;*
Figure 6D:
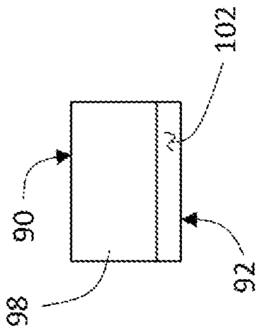
FIG. 6*d* is a front end view of the stalk gap rail shown in FIG. 6*a;*
Figure 6C:
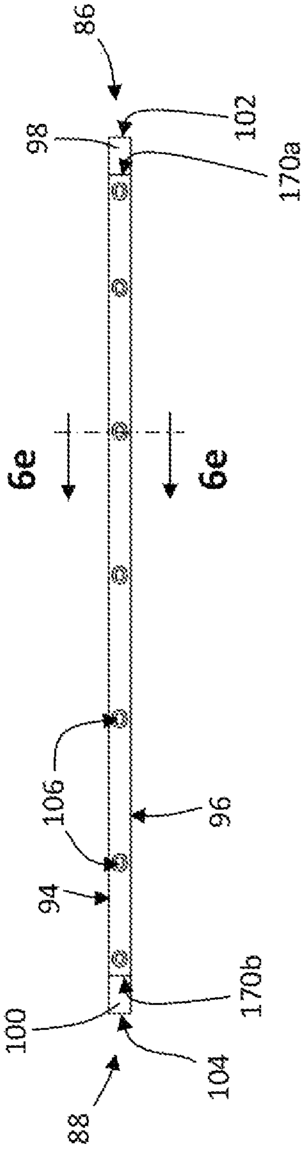
FIG. 6*c* is a top plan view of the stalk gap rail shown in FIG. 6*a;*

Preferably, as best seen in FIG. 6*e*, the rail bores 106 are counter bored and chamfered such that, after installation, the rail fasteners 110 can be recessed beneath the top rail surfaces 90 and are thereby protected from abrasion during operation of the row unit 10.

Figure 6B:
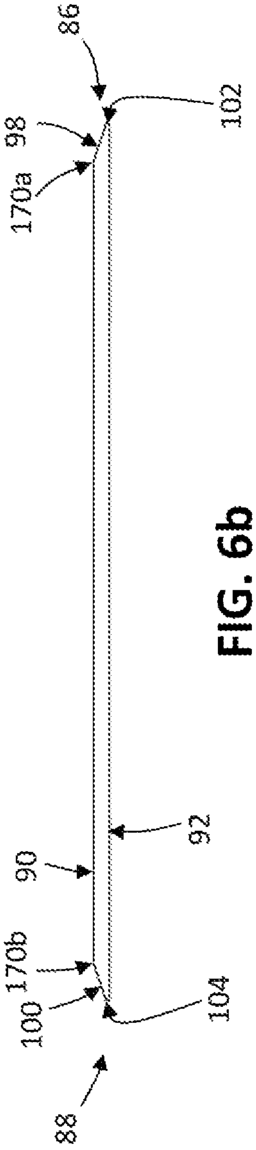
FIG. 6*b* is a side elevation view of the stalk gap rail shown in FIG. 6*a;*

Preferably, the leading and trailing ends 86, 88 of the stalk gap rails 34 can include respective leading and trailing ramped sections 98, 100 and leading and trailing edge surfaces 102, 104. As best seen in FIG. 6*b*, the leading and trailing ramped sections 98, 100 slope downwardly from respective inboard points 170*a*, 170*b* of the top rail surface 90 to the leading and trailing edge surfaces 102, 104, respectively. As the gathering chains 40 rotate about the drive sprockets 36 and idler sprockets 38, the sweeping lugs 42 climb over the leading-edge surfaces 102, climb up the leading ramped sections 98, glide across the top rail surfaces 90, and glide down the trailing ramped sections 100 and trailing edge surfaces 104.

As best seen in FIGS. 4 and 7*a-b*, deck troughs 164 are defined between a gathering chain 40, a stalk gap rail 34, and a respective deck plate 30*a*, 30*b*. The deck troughs 164 extend parallel to the stripping edges 82*a*, 82*b* and extend along the top deck surfaces 72*a*, 72*b* from the first terminal ends 74*a*, 74*b* to the second terminal ends 76*a*, 76*b*. Preferably, the deck troughs 164 are adapted to capture kernels which have been dislodged from the corn ears 16 whereby the detached kernels can be swept into the trough 26 by the sweeping members 44.

As mentioned hereinabove, the sweeping lugs 42 comprise mounting sections 54 and sweeping protrusions 56 extending therefrom. Preferably, as shown in FIGS. 7*b-c*, the sweeping protrusions 56 extend generally perpendicularly from the mounting sections 54 and include front faces 58 with one or more mounting bores 60 extending therethrough. The mounting bores 60 are adapted to receive and engage fasteners 66 for securing the sweeping members 44 to the sweeping protrusions 56. The fasteners 66 can be, for example, nuts and bolts, screws adapted to threadingly engaging the mounting bores 60, or rivets (not shown).

Preferably, as best seen in FIG. 7*c*, the sweeping members 44 comprise a body portion 62, a sweeping portion 64, and a mounting plate 166. The body portions 62 are adapted to abut the front face 58 of a sweeping protrusion 56. The mounting plates 166 can be placed abutting the body portions 62 opposite the front faces 58 whereby the body portions 62 are sandwiched between the mounting plates 166 and the sweeping protrusions 56. The sweeping portions 64 can be mounted to the body portions 62 and are adapted to extend downwardly into the deck troughs 164. Preferably, as the gathering chains 40 rotate about the drive and idler sprockets 36, 38, the sweeping portions 64 brush against both the top deck surfaces 72*a*, 72*b* and the stalk gap rail longitudinal side surfaces 96 for thereby sweeping any detached kernels captured in the deck troughs 164 to the trough 26 for further conveyance. The sweeping portions 64 can be, for example, brushes formed from a plurality of bristles.

Preferably, one or more fastener bores 70*a* are provided extending through the body portions 62 and one or more corresponding fastener bores 70*b* are provided extending through the mounting plates 166. The fastener bores 70*a*, 70*b* are adapted to be aligned with each other and with the mounting bores 60 whereby a fastener 66 can be extended through each of the bores 70*a*, 70*b*, 60 for securing the body portions 62 and the mounting plates 166 to the sweeping protrusions 56. For example, a fastener 66 can be inserted through a fastener bore 70*b* of the mounting plate 166, through a fastener bore 70*a* of a body portion 62, and into a mounting bore 60 of a sweeping protrusion 56 for thereby securing the body portion 62 to the sweeping protrusion 56.

Preferably, slots 68 can be provided extending into the body portions 62. The slots 68 can be sized to receive the sweeping portions 64 for mounting the sweeping portions 64 to the body portions 62. Yet more preferably, the sweeping portions 64 can be secured to the body portions 62 by, for example, press-fitting and/or gluing the sweeping portions 64 into the slots 68 or by fastening the sweeping portions 64 to the body portions 62 with one or more fasteners (not shown).

In operation, as mentioned above, a plurality of row units 10 are mounted to the header frame 22 and are deployed on the harvester combine 18. The row units 10 are spaced apart from each other at intervals for thereby aligning each row unit 10 with a row of corn plants 12, and as the harvester combine 18 is driven through a field, corn plants 12 are received and engaged by the row units 10.

As the corn plants 12 engage the row units 10, the stalks 14 are directed into the stalk gaps 84 and engage the stalk pulling rolls 32. The stalk pulling rolls 32 grab and pull the stalks 14 downward and pull the corn ears 16 against the row unit 10 for thereby separating the corn ears 16 from their stalks 14. The detached corn ears 16 are then conveyed across the deck plates 30*a*, 30*b* by the gathering chains 40 and the sweeping lugs 42 and are deposited into the trough 26 where they are further conveyed to other sections of the harvester combine 18 by the auger 24.

In traditional row units, the impact of the corn ears 16 against the traditional deck plates is known to cause loose kernels to be stripped/dislodged therefrom. Accordingly, in the present invention, a pair of stalk gap rails 34 are mounted to the deck plates 30*a*, 30*b* for cushioning/dampening the impact of the corn ears 16 thereagainst. In particular, when the corn ears 16 strike and are pulled against the stalk gap rails 34, the stalk gap rails 34 elastically compress against the deck plates 30*a*, 30*b* for absorbing energy from the impact and thereby reduce stripping/dislodging of kernels from the corn ears 16.

Of course, the pliability of the stalk gap rails 34 corresponds to both the level of cushioning/dampening of the impact of the corn ears 16 against the row unit 10 as well as the resiliency and wear-life of the stalk gap rails. Preferably, the pliability of the stalk gap rails 34 can be selectively adjusted to both minimize stripping/dislodging of kernels and maximize the wear-life of the stalk gap rails 34. For example, as shown in FIGS. 8*a-d*, a plurality of dampening pockets 112 can be formed extending into the bottom rail surfaces 92 and through the side surfaces 94, 96. The dampening pockets 112 can be adapted for selectively increasing the pliability of the stalk gap rails 34 and thereby selectively increasing the level of cushioning/dampening of the impact of the corn ears 16 against the row unit 10.

As shown in FIGS. 8*a-d*, each dampening pocket 112 includes a top pocket surface 114. Flexible walls/beams 116 are defined between the top pocket surfaces 114 and the top rail surfaces 90 and support/fastener pads 124 are defined between adjacent dampening pockets 112. The support/fastener pads 124 are adapted to abut the top deck surfaces 72*a*, 72*b*, respectively, and support the flexible walls/beams 116 thereabove. As the corn ears 16 strike the flexible walls/beams 116, the flexible walls/beams 116 are adapted to bend and flex towards the deck plates 30*a*, 30*b*, respectively, for cushioning/dampening the impact thereagainst.

Figure 9C:
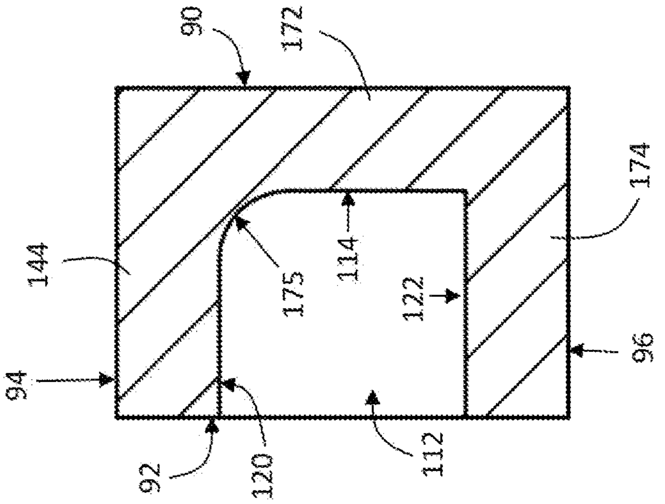
FIG. 9*c* is a cross section view of the stalk gap rail taken along the line 9*c*-9*c* shown in FIG. 9*b;*
Figure 9B:
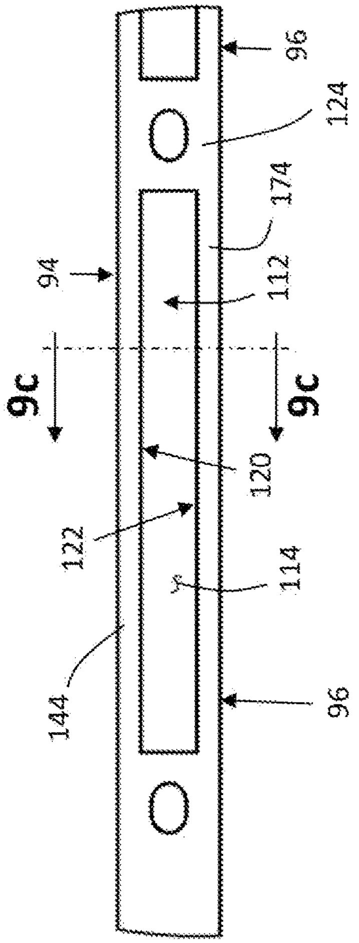
FIG. 9*b* is a magnified detail view of the Circled Detail 9*b* shown in FIG. 9*a;*
Figure 9A:
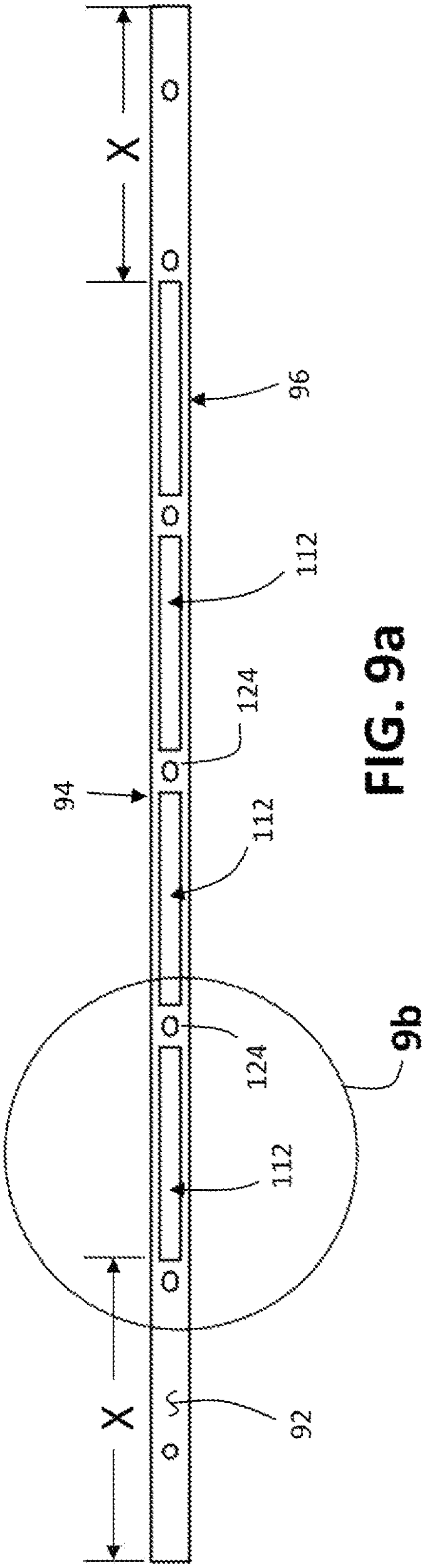
FIG. 9*a* is a bottom plan view of a stalk gap rail having dampening pockets.
Figure 10A:
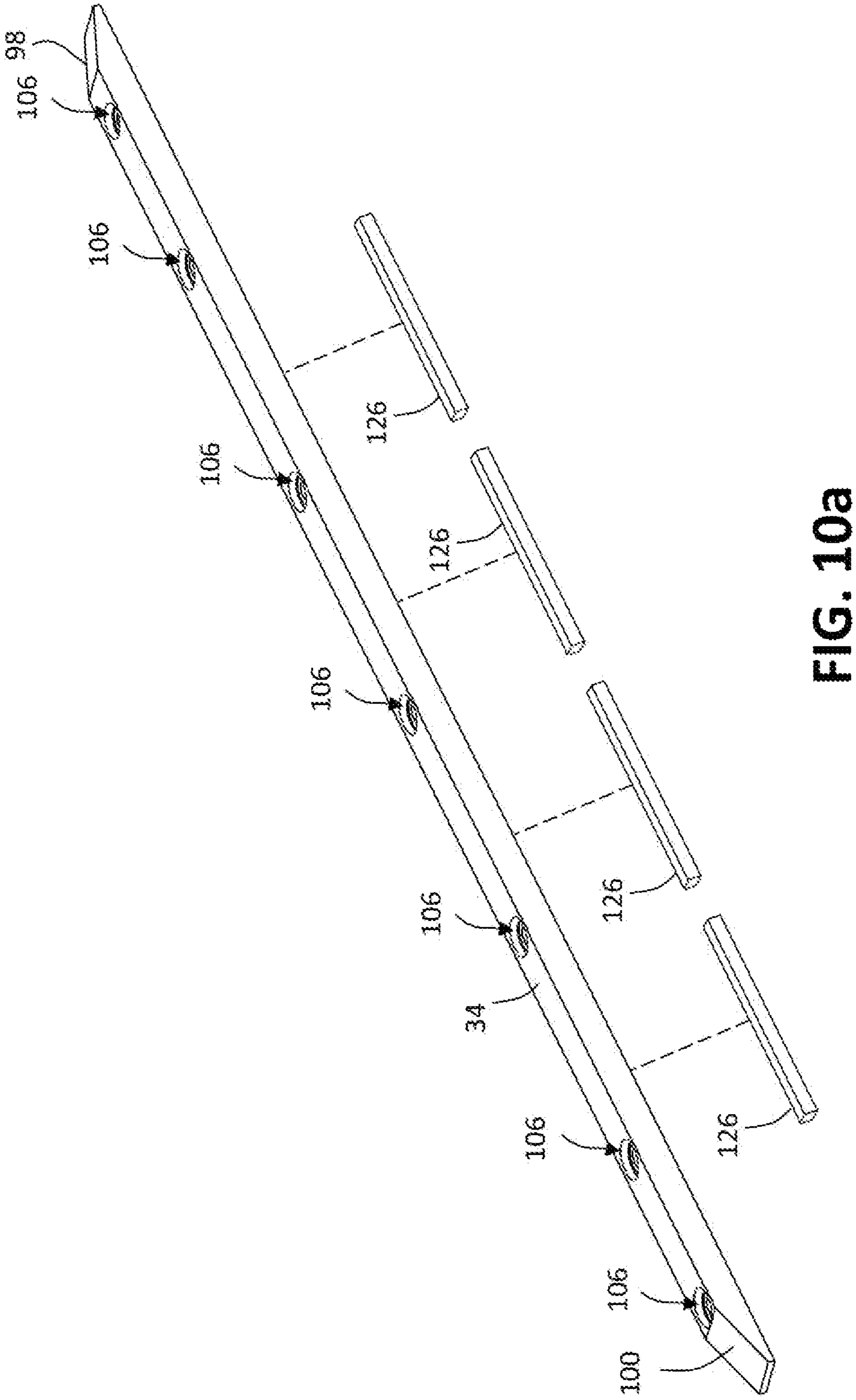
FIG. 10*a* is an exploded perspective view of a stalk gap rail having dampening inserts.
Figure 10D:
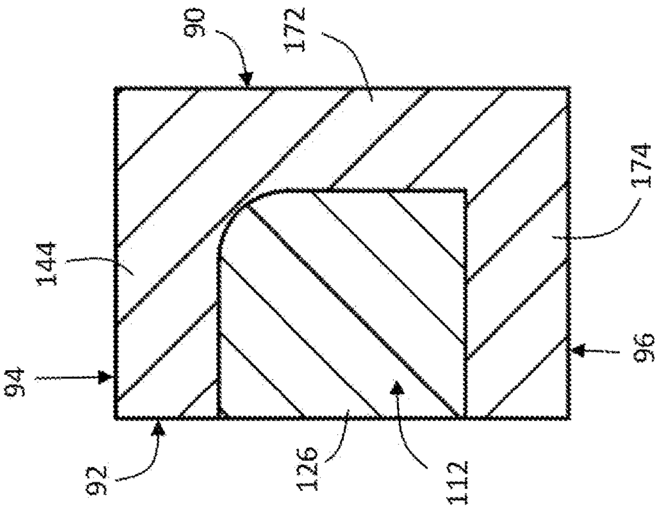
FIG. 10*d* is a cross section view of the stalk gap rail taken along the line 10*d*-10*d* shown in FIG. 10*c;*
Figure 10C:
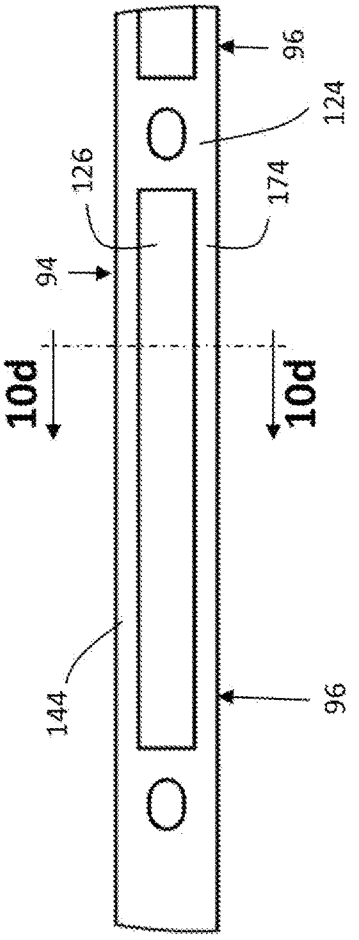
FIG. 10*c* is a magnified detail view of the Circled Detail 10*c* shown in FIG. 10*b;*
Figure 10B:
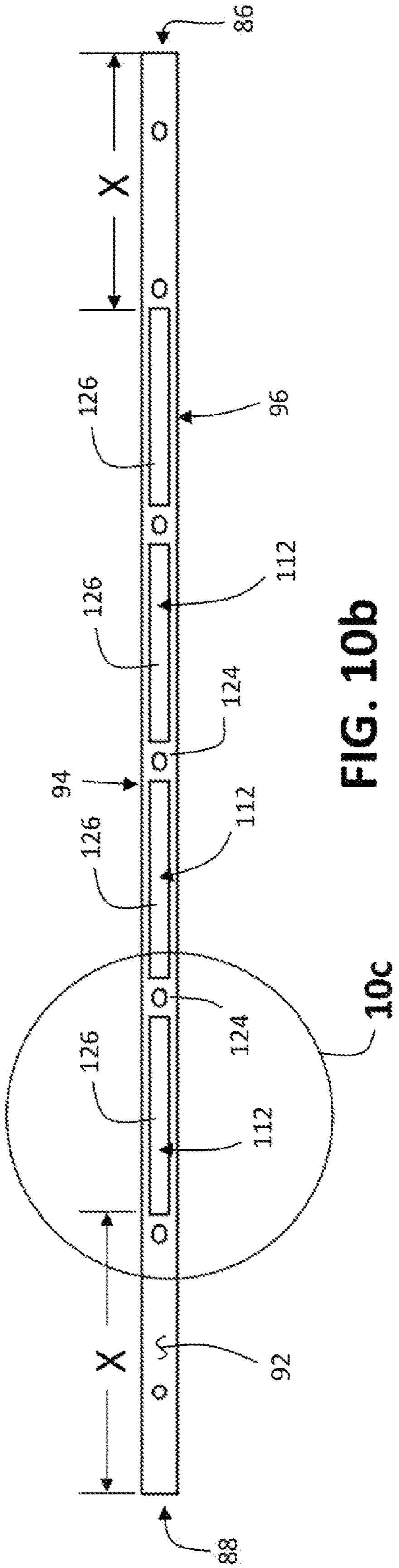
FIG. 10*b* is bottom plan view of the stalk gap rail shown in FIG. 10*a;*

Alternatively, as shown in FIGS. 9*a-c*, the dampening pockets 112 can be formed extending into the bottom rail surfaces 92 wherein each dampening pocket 112 includes a top pocket surface 114 and parallel side pocket surfaces 120, 122. A lug supporting wall 172 is defined between the top pocket surface 114 and the top rail surface 90, a deck trough rail wall 174 is defined between the longitudinal side surface 96 and the side pocket surface 122, and a stalk gap rail wall 144 is defined between the stalk gap abutting surface 94 and the side pocket surface 120. The stalk gap rail walls 144, the lug supporting walls 172, and the deck trough rail walls 174 are adapted to flex and bend for further cushioning the impact of the corn ears 16 against the row unit 10.

For example, as the corn ears 16 strike and are pulled against the stalk gap rails 34, the lug supporting walls 172 can flex and bend towards the deck plates 30*a*, 30*b*, and the stalk gap and deck trough rail walls 144, 174 can bow outwardly apart from each other, for absorbing energy from the impact. Preferably, the stalk gap rail walls 144, the lug supporting walls 172, and the deck trough rail walls 174 have a "memory" wherein as the corn ears 16 strike the stalk gap rails 34, the stalk gap rail walls 144, the lug supporting walls 172, and the deck trough rail walls 174 elastically deform for absorbing the impact and, thereafter, return to their original, undeformed shape.

Preferably, as best seen in FIG. 9*c*, the stalk gap rails 34 can include rounded portions 175 formed within the dampening pockets 112 at the intersection of the stalk gap rail walls 144 and the lug supporting walls 172. The rounded portions 175 are adapted to slightly increase the rigidity of the stalk gap rails 34 along the stalk gap rail walls 144 such that, as the corn ears 16 impact the stalk gap rails 34, the deck trough rail walls 174 flex and bend more than the stalk gap rail walls 144 for thereby causing the lug supporting walls 172 to tilt slightly towards the deck troughs 164. By having the lug supporting walls 172 tilt slightly towards the deck troughs 164 during impact, the stalk gap rails 34 can be adapted to direct loose kernels stripped/dislodged from the corn ears 16 into the deck troughs 164.

Preferably, the stalk gap rails 34 further include solid outboard sections X adjacent to the leading and trailing ends 86, 88 which do not include any dampening pockets 112. The outboard sections X can be adapted to resist deformation and/or curling of the leading and trailing ends 86, 88 during operation of the harvester combine 18.

As best seen in FIGS. 10*a-d*, the stalk gap rails 34 can also include dampening inserts 126 which can be inserted into or formed within the dampening pockets 112. The dampening inserts 126 can be adapted to absorb energy from the impact of the corn ears 16 against the stalk gap rails 34 while simultaneously supporting the walls 144, 172, 174 and preventing the stalk gap rails 34 from permanently deforming over extended periods of use.

Preferably, the dampening inserts 126 are sized and shaped to substantially fill the dampening pockets 112. Yet more preferably, the dampening inserts 126 can be constructed from a material having desired elasticity, pliability, and dampening characteristics for "tuning" the pliability of the stalk gap rails 34 and thereby maximizing the wear-life thereof while minimizing stripping/dislodging of kernels from the corn ears 16.

Preferably, the stalk gap rails 34 are constructed from a first resilient elastic material and the dampening inserts 126 are constructed from a second pliable elastic material. Yet more preferably, the stalk gap rails 34 are constructed from ultra-high molecular weight polyethylene, high-density polyethylene, nylon, or other similar high-density, high wear-resistant engineered polymer materials which have a low-friction coefficient and are abrasion resistant, and the dampening inserts 126 are constructed from silicone, polyurethane, rubber, or other similar low-density, energy absorbing engineered composites which are more pliable and more elastic than the first resilient elastic material.

Preferably, the stalk gap rails 34 can be manufactured by machining, molding, forming, or otherwise shaping from a unitary material. Preferably, the dampening inserts 126 can be formed by molding a unitary material within the dampening pockets 112. Alternatively, the dampening inserts 126 can be manufactured by machining, molding, forming, or otherwise shaping from a unitary material and the dampening inserts 126 can then be inserted into the dampening pockets 112 and secured to the stalk gap rails 34.

Figure 11A:
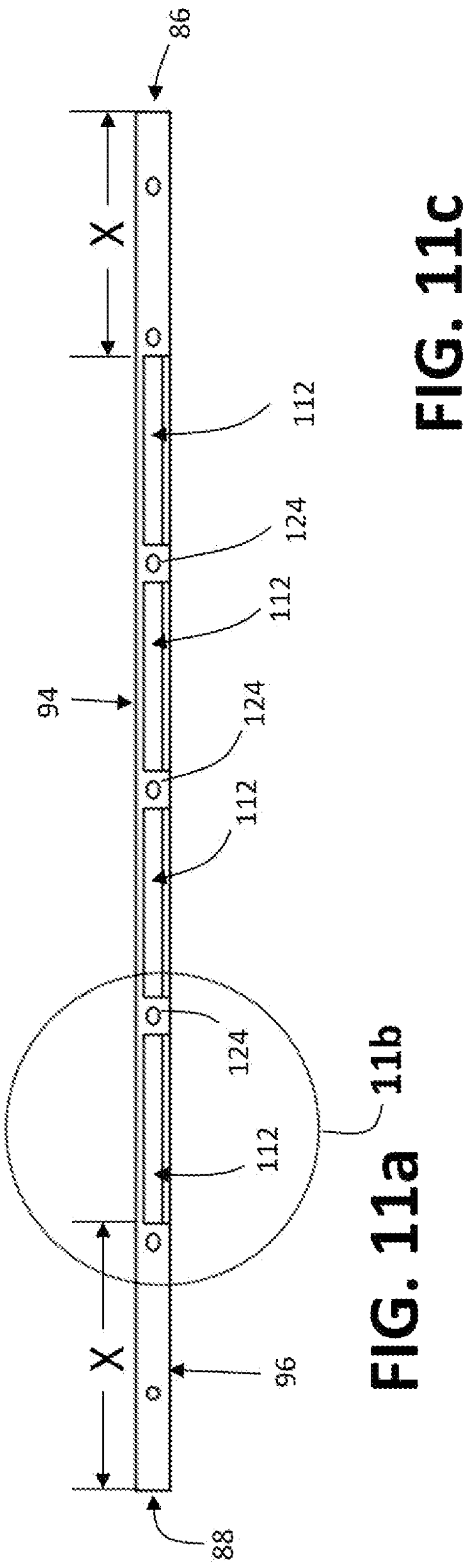
FIG. 11*a* is a bottom plan view of a stalk gap rail having slots extending through the deck trough rail walls thereof.
Figure 11C:
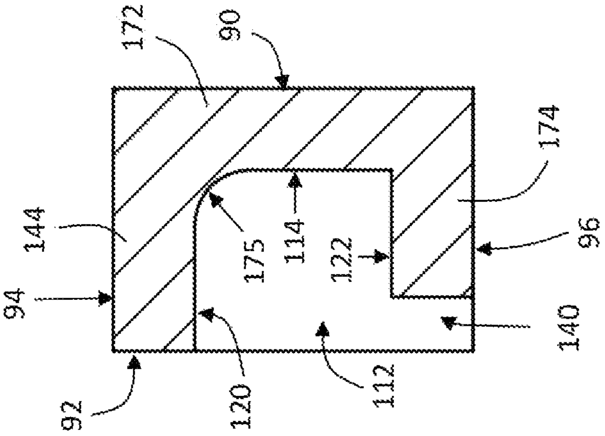
FIG. 11*c* cross section view of the stalk gap rail taken along the line 11*c*-11*c* shown in FIG. 11*b;*
Figure 11B:
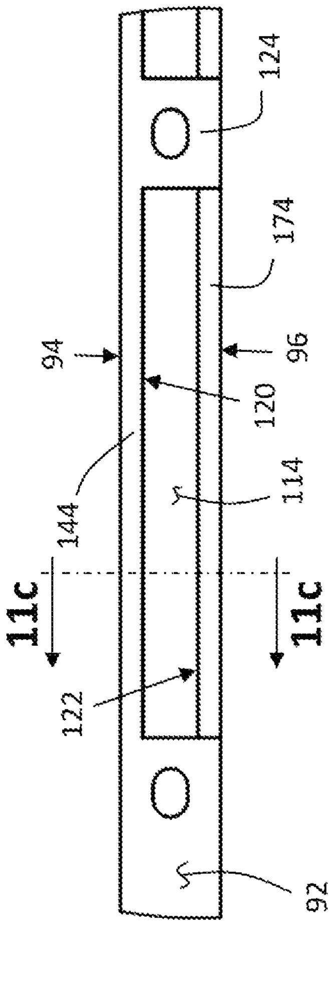
FIG. 11*b* a magnified detail view of the Circled Detail 11*b* shown in FIG. 11*a;*
Figure 12A:
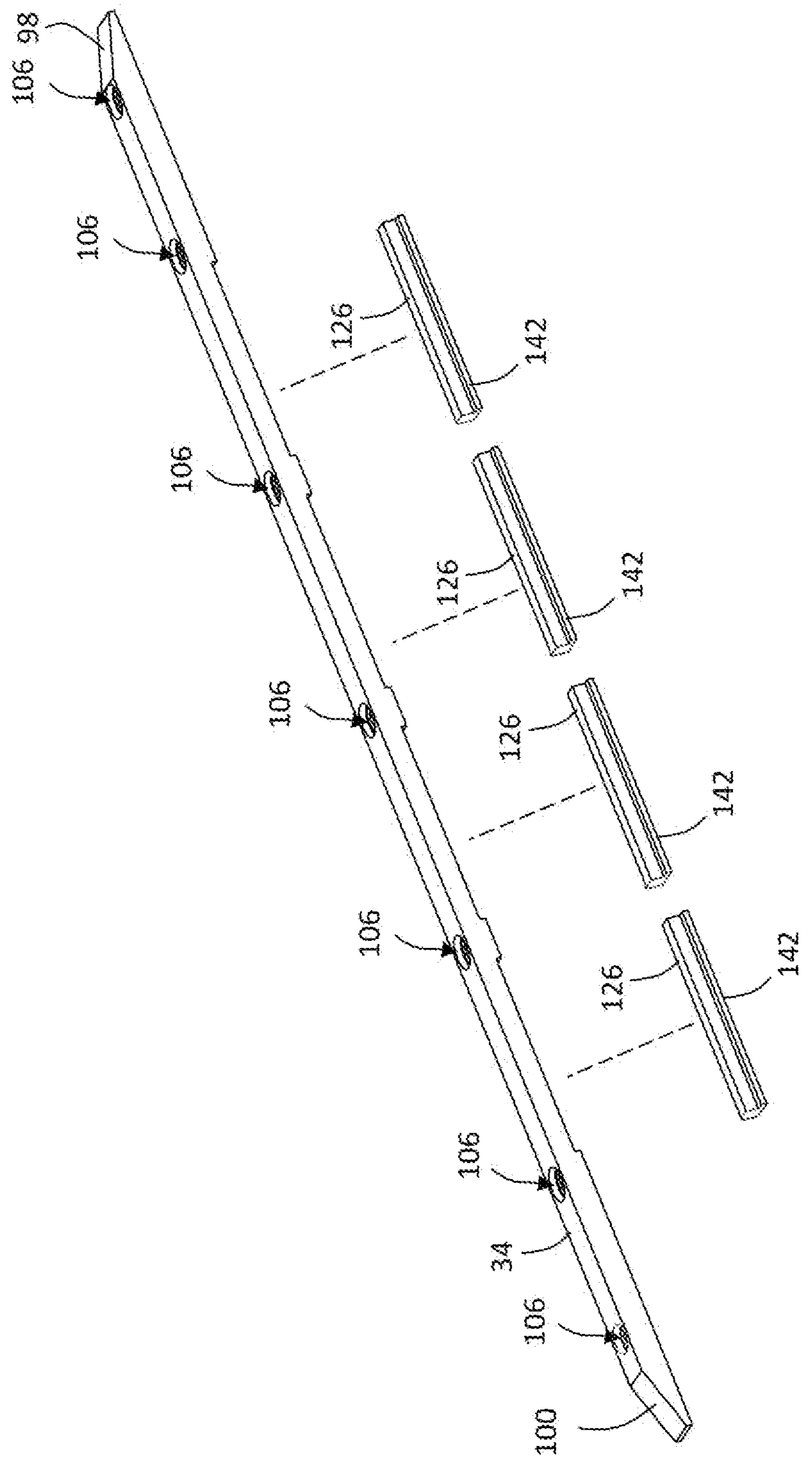
FIG. 12*a* is an exploded perspective view of a stalk gap rail having dampening inserts with step portions.
Figure 12B:
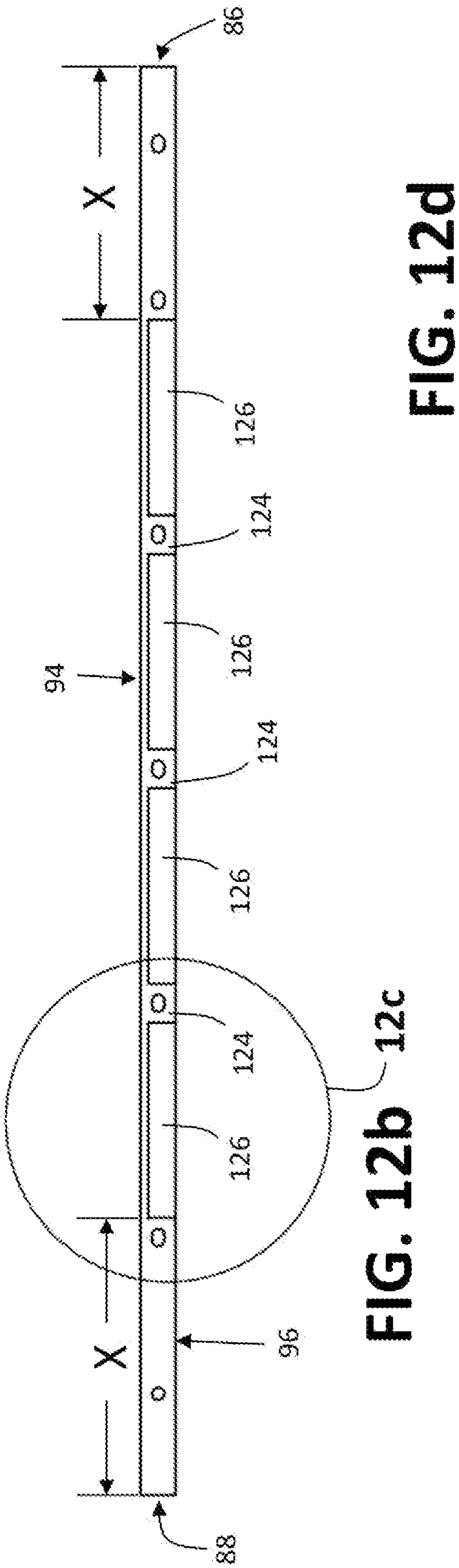
FIG. 12*b* is a bottom plan view of the stalk gap rail shown in FIG. 12*a;*
Figure 12D:
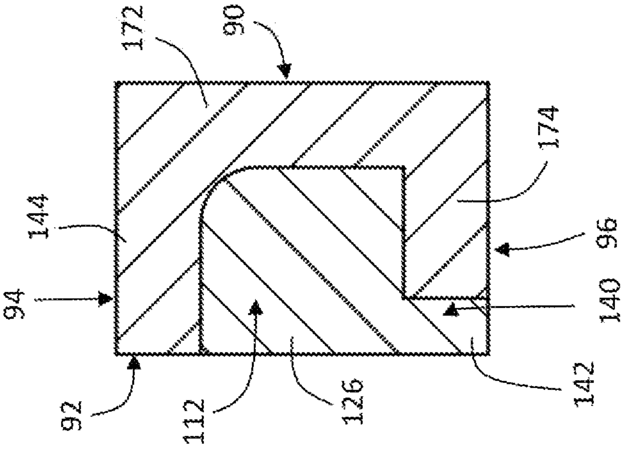
FIG. 12*d* is a cross section view of the stalk gap rail taken along the line 12*d*-12*d* shown in FIG. 12*c;*
Figure 12C:
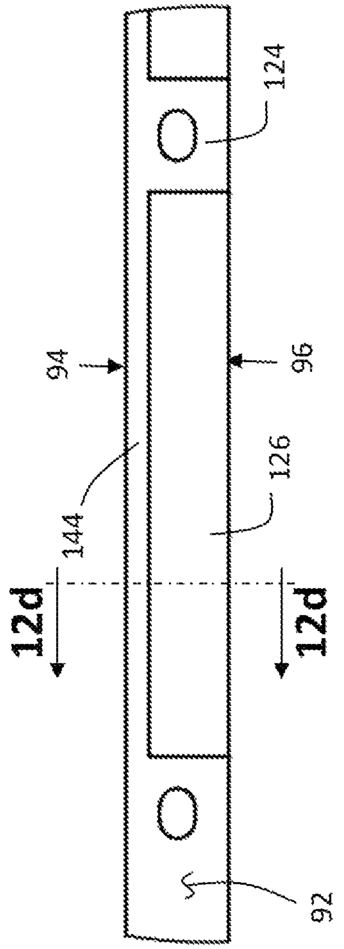
FIG. 12*c* is a magnified detail view of the Circled Detail 12*c* shown in FIG. 12*b;*
Figure 13A:
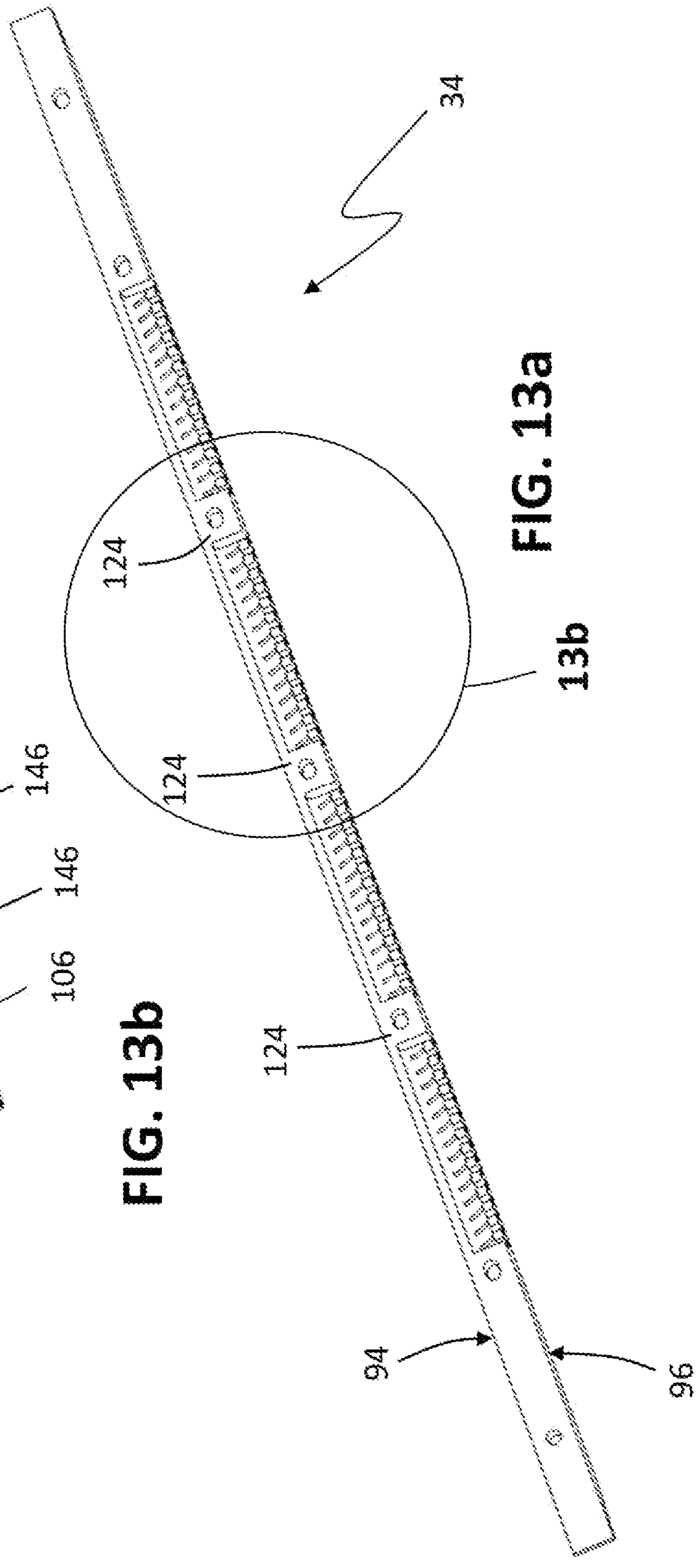
FIG. 13*a* is a perspective view of a stalk gap rail having notches, posts, and ribs.
Figure 13B:
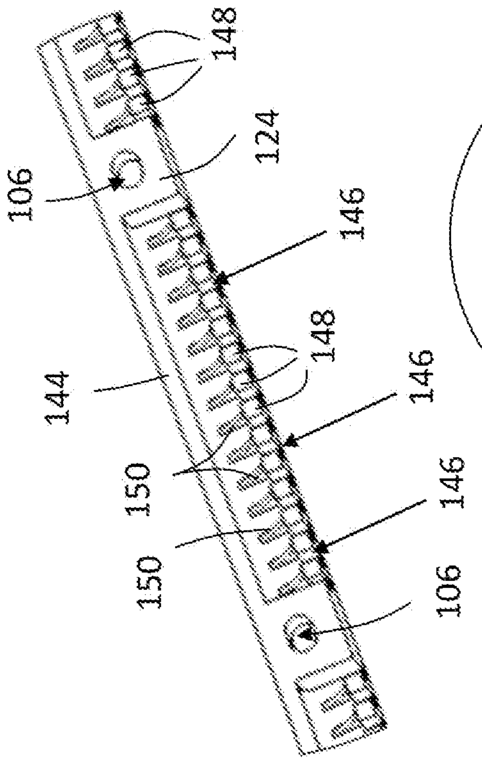
FIG. 13*b* is a magnified detail view of the Circled Detail 13*b* shown in FIG. 13*a;*
Figures 13C, 13D, 13E:
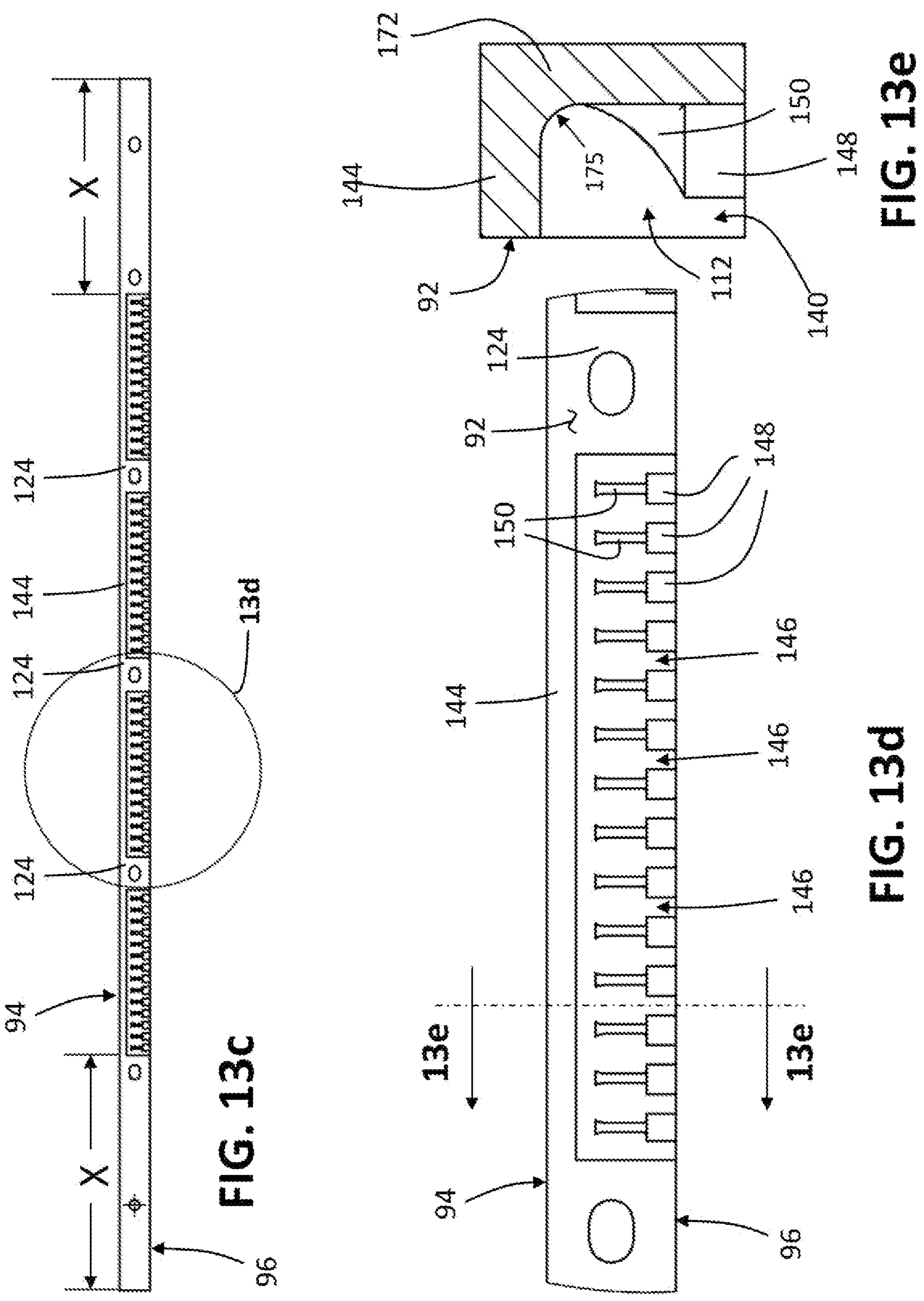
FIG. 13*c* is a bottom plan view of the stalk gap rail shown in FIG. 13*b;*
FIG. 13*d* is a magnified detail view of the Circled Detail 13*d* shown in FIG. 13*c;*
FIG. 13*e* is a cross section view of the stalk gap rail taken along the line 13*e*-13*e* shown in FIG. 13*d;*

As best seen in FIGS. 11*a-c*, slots 140 can be formed extending through the deck trough rail walls 174 adjacent the bottom rail surfaces 92. The slots 140 can be adapted to increase the pliability of the deck trough rail wall 174 relative to the pliability of the stalk gap rail wall 144 for allowing the lug supporting walls 172 to flex and tilt away from the stalk gap 84 and thereby directing kernels dislodged from their corn ears 16 away from the stalk gap 84. Preferably, the slots 140 are formed between adjacent support/fastener pads 124.

Preferably, as best seen in FIGS. 12*a-d*, the dampening inserts 126 can include step protrusions 142 which extend into and fill the slots 140. The step protrusions 142 can be adapted to support the deck trough rail walls 174 while maintaining the pliability thereof.

As best seen in FIGS. 13*a-e*, a plurality of notches 146 can be formed extending through the deck trough rail walls 174 whereby a plurality of posts 148 are defined therebetween. Preferably, support ribs 150 are provided extending between and connecting the posts 148 and lug supporting walls 172. Preferably, the support ribs 150 are generally triangular-shaped.

Figure 14A:
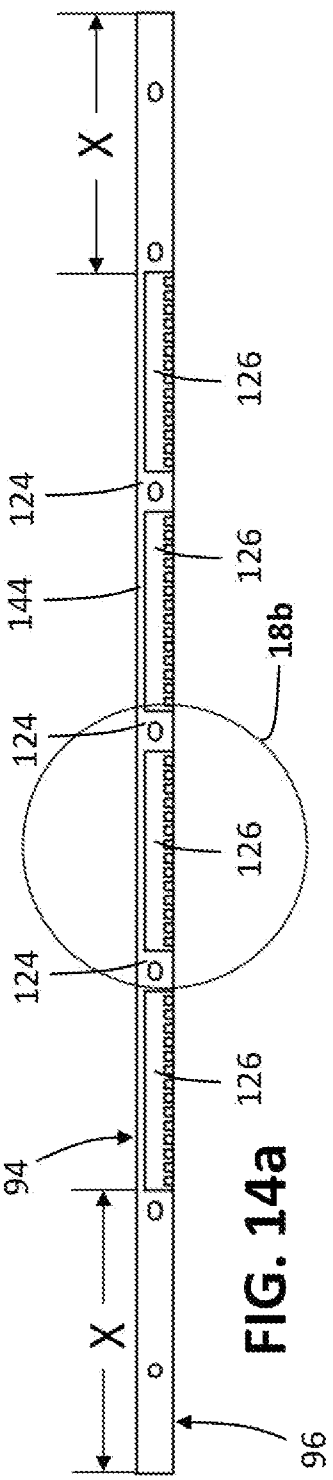
FIG. 14*a* is a bottom plan view of the stalk gap rail having notches, posts, ribs, and dampening inserts.
Figure 14C:
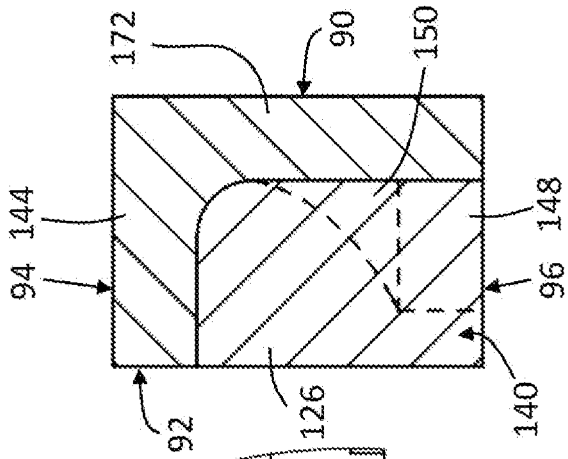
FIG. 14*c* is a cross section view of the stalk gap rail taken along the line 14*c*-14*c* shown in FIG. 14*b;*
Figure 14B:
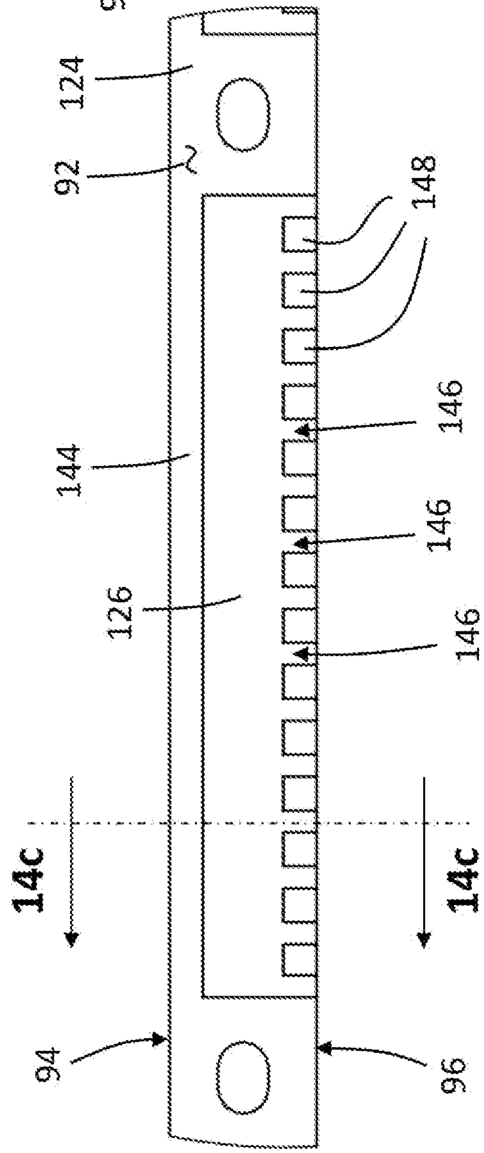
FIG. 14*b* is a magnified detail view of the Circled Detail 14*b* shown in FIG. 14*a;*

Preferably, as best seen in FIGS. 14*a-c*, the dampening inserts 126 can be adapted to engage the posts 148 and the support ribs 150 such that the dampening inserts 126 extend into the notches 146. Put another way, the posts 148 and support ribs 150 preferably impinge into dampening inserts 126 for increasing the contact surface area between the stalk gap rails 34 and the dampening inserts 126 and thereby facilitating securement of the dampening inserts 126 to the stalk gap rails 34.

Figure 15C:
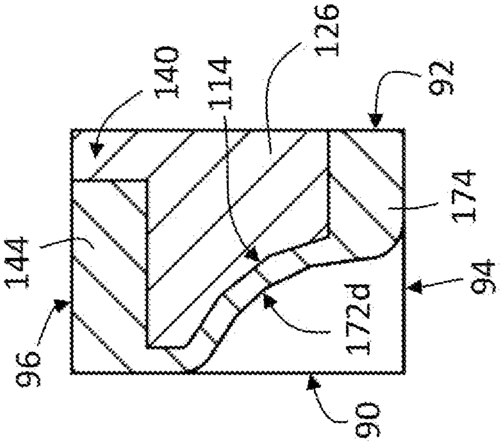
FIG. 15*c* is a cross section view of the stalk gap rail taken along the line 15*c*-15*c* shown in FIG. 15*b;*
Figure 15B:
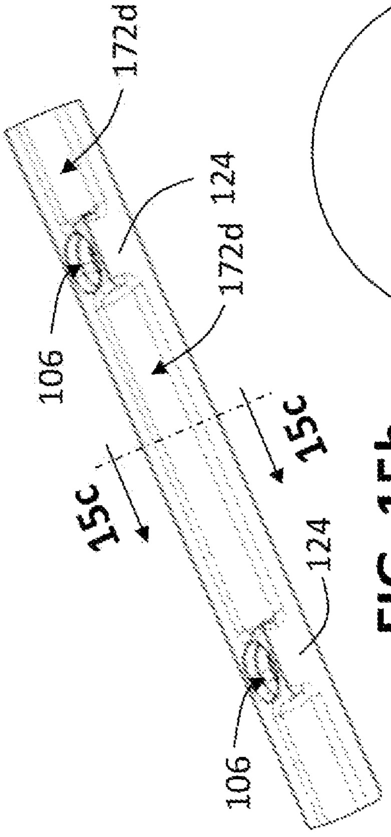
FIG. 15*b* is a magnified detail view of the Circled Detail 15*b* shown in FIG. 15*a;*
Figure 15A:
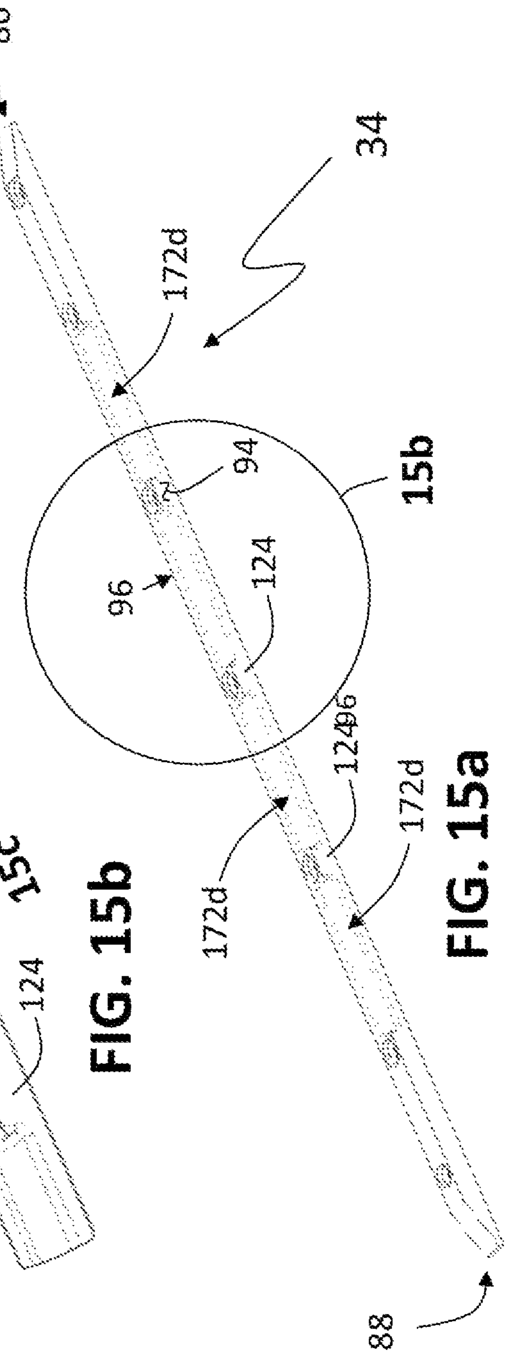
FIG. 15*a* is a perspective view of a stalk gap rail having depressed portions.
Figure 16:
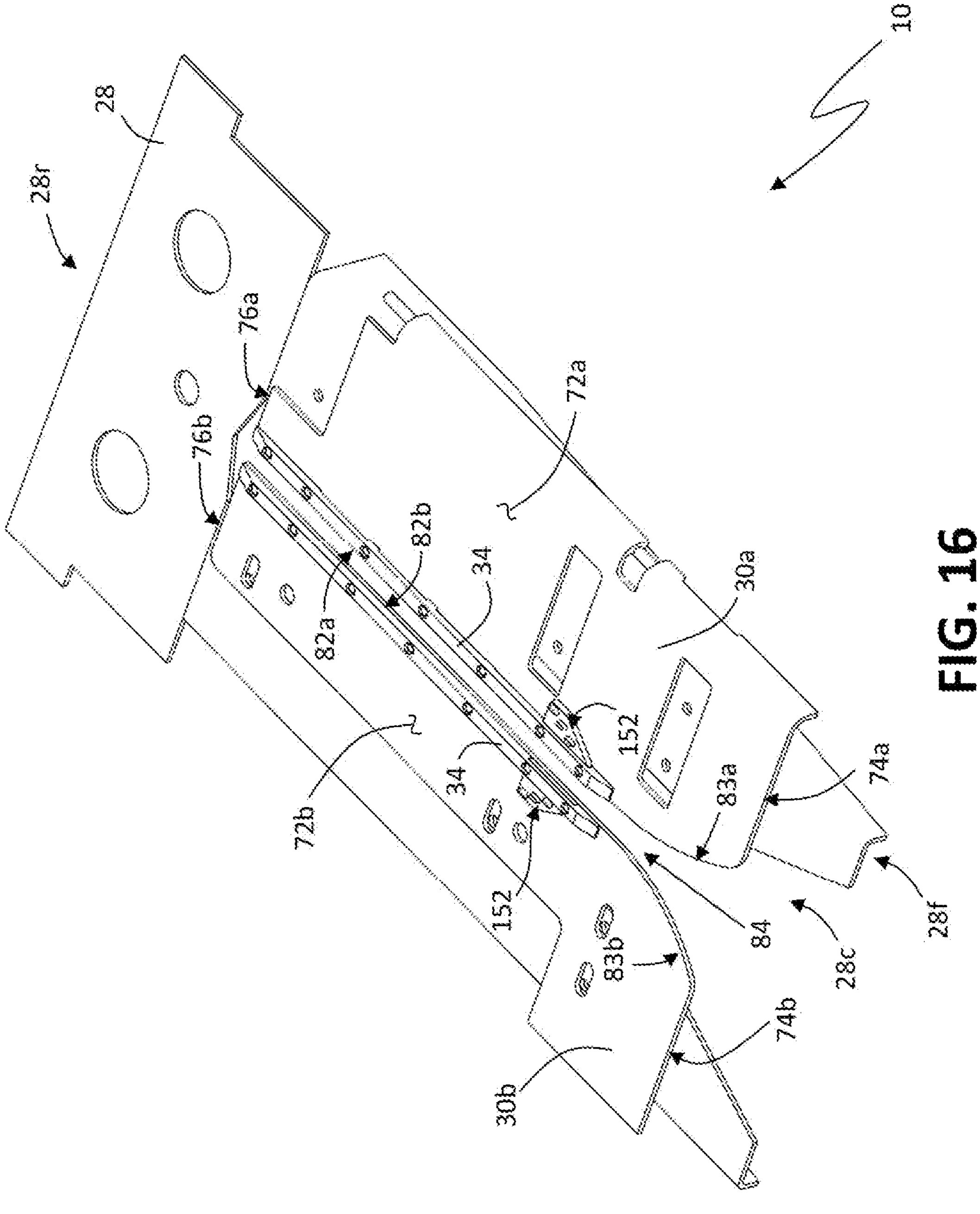
FIG. 16 is a perspective view of a row unit having stalk gap rails with dams/brush agitators.
Figure 17:
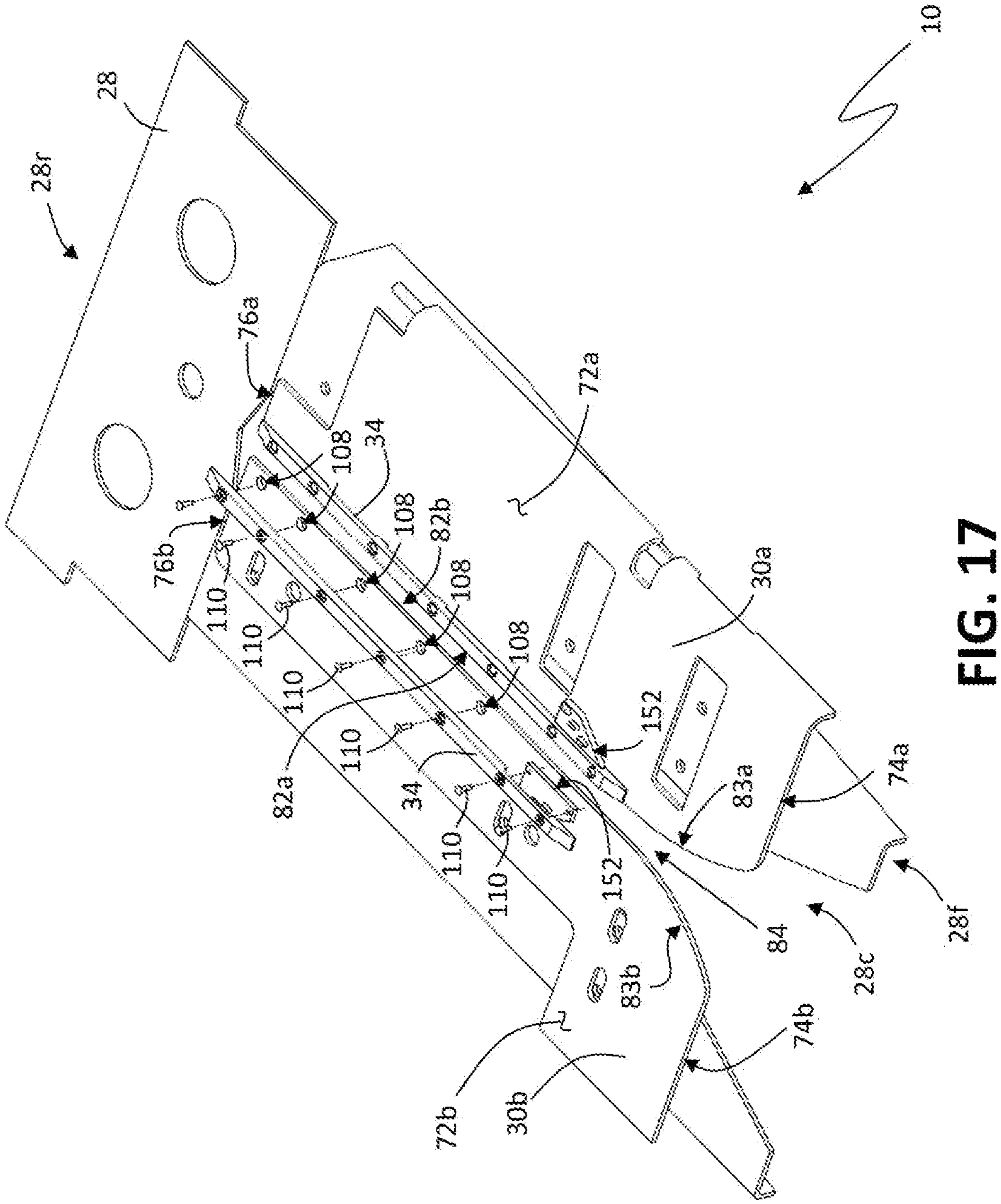
FIG. 17 is a partially exploded perspective view of the row unit shown in FIG. 16.
Figure 18B:
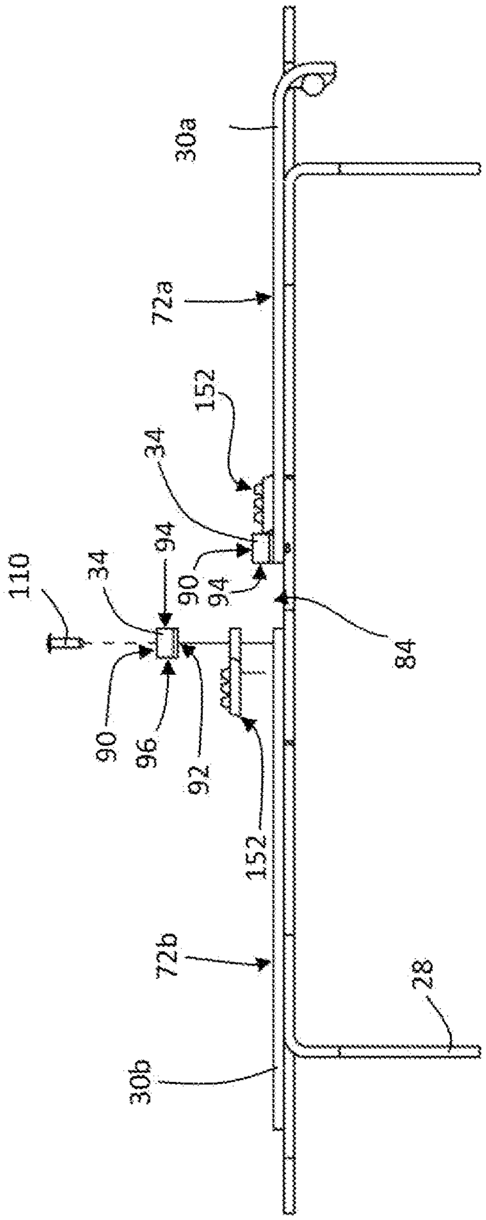
FIG. 18*b* is a partially exploded front elevation view of a row unit having stalk gap rails with separately formed dams/brush agitators.
Figure 18A:
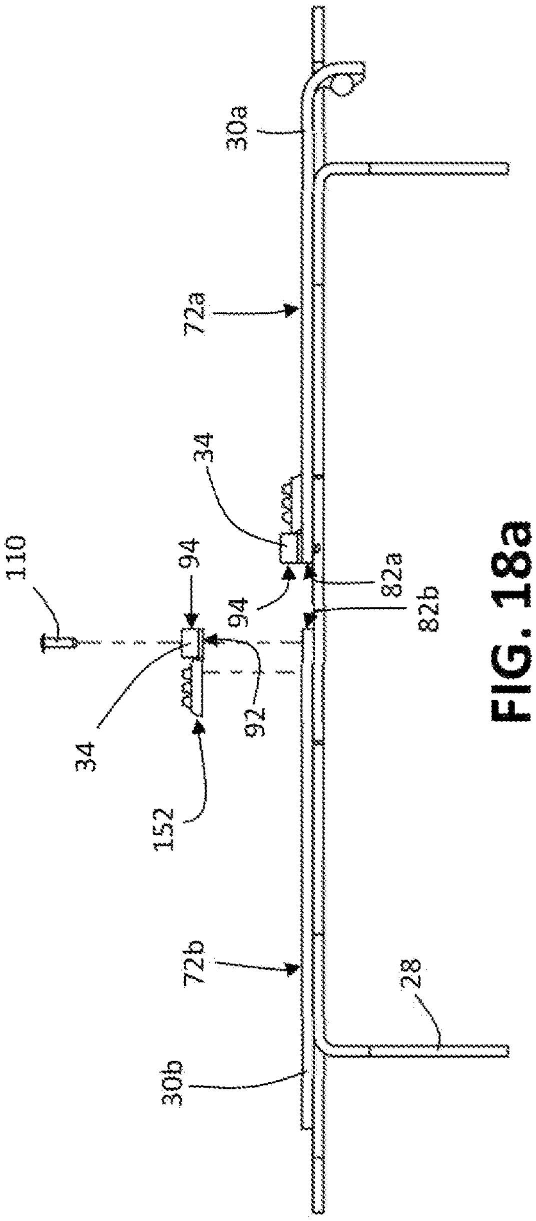
FIG. 18*a* is a partially exploded front elevation view of a row unit having stalk gap rails with integrally formed dams/brush agitators.
Figures 19A, 19B:
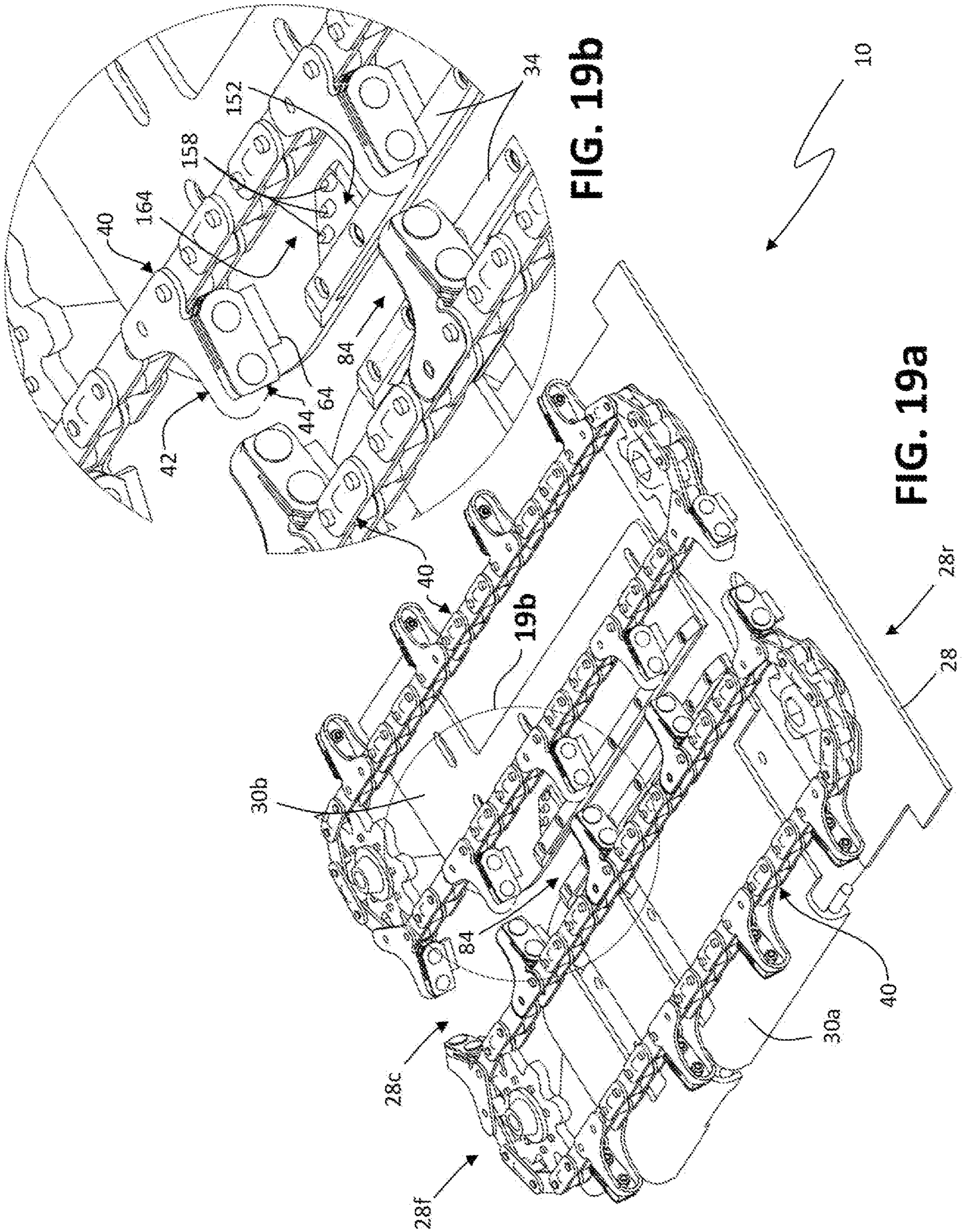
FIG. 19*a* is another perspective view of the row unit shown in FIG. 16 showing the gathering chains, sweeping lugs, and sweeping members.
FIG. 19*b* is a magnified detail view of the Circled Detail 19*b* shown in FIG. 19*a;*
Figures 20A, 20B, 20C:
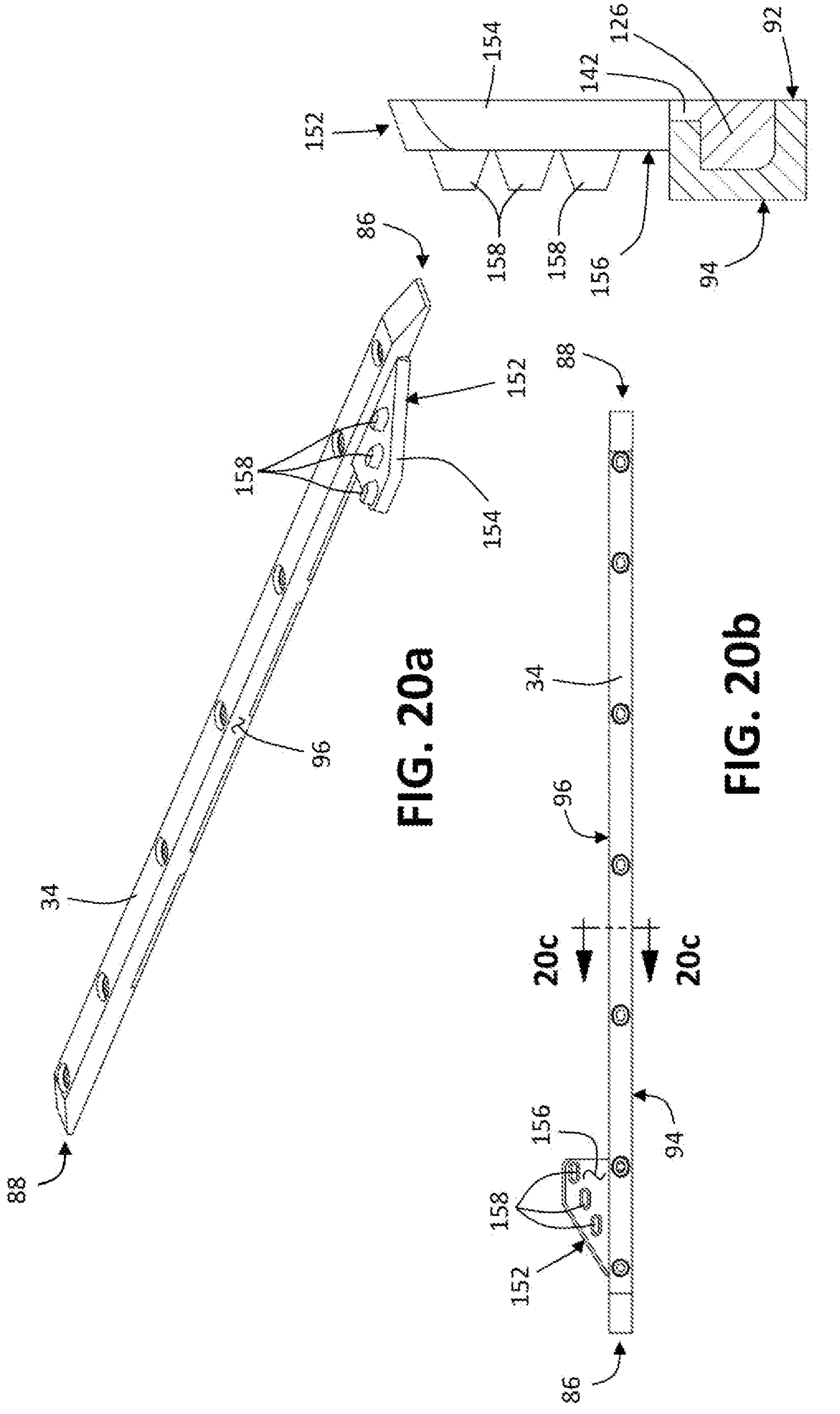
FIG. 20*a* is a perspective view of a stalk gap rail having integrally formed dams/brush agitators.
FIG. 20*b* is a top plan view of the stalk gap rail shown in FIG. 20*a;*
FIG. 20*c* is a cross section view of the stalk gap rail taken along the line 20*c*-20*c* shown in FIG. 20*b;*
Figure 21:
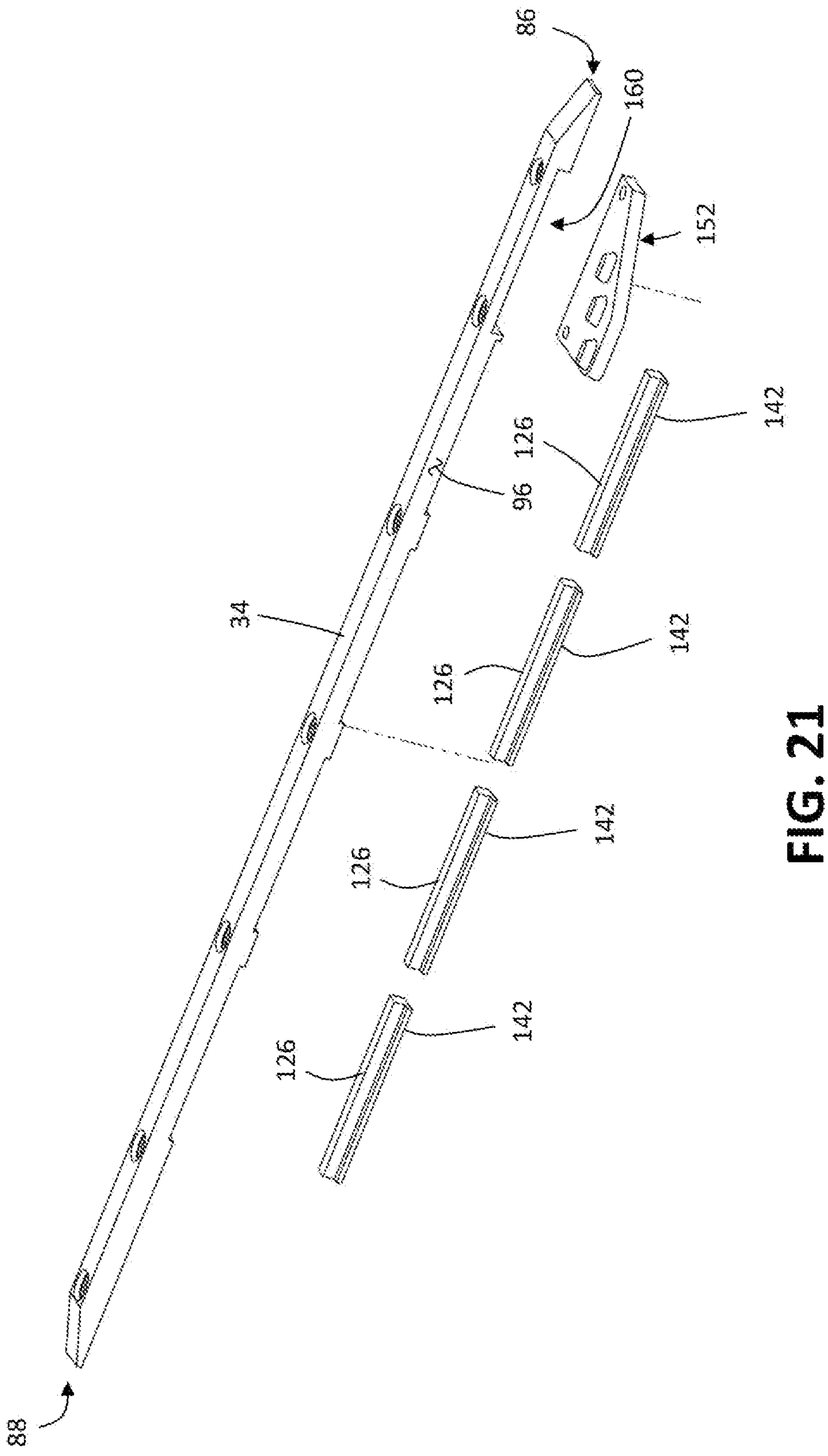
FIG. 21 is an exploded perspective view of a stalk gap rail having separately formed dams/brush agitators and dampening inserts.
Figure 22A:
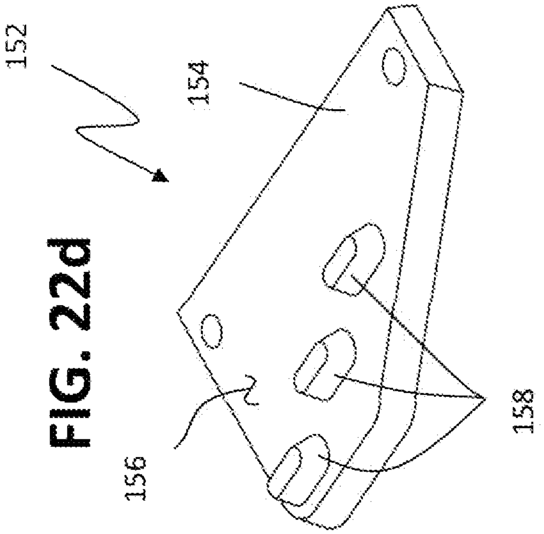
FIG. 22*a* is a perspective view of a separately formed dam/brush agitator.
Figure 22B:
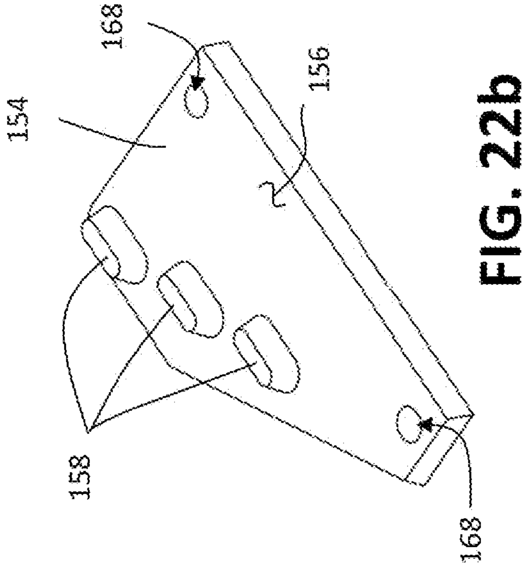
FIG. 22*b* is another perspective view of the dam/brush agitator shown in FIG. 22*a;*
Figure 22C:
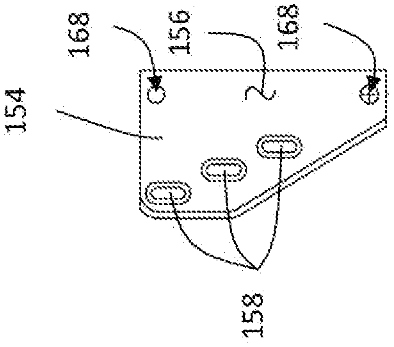
FIG. 22*c* is a top plan view of the dam/brush agitator shown in FIG. 22*a;*
Figure 22D:
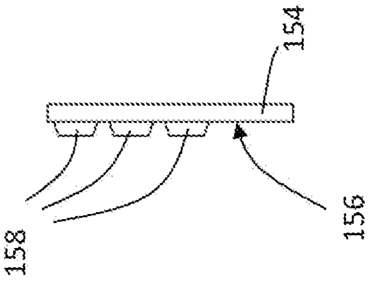
FIG. 22*d* is a side elevation view of the dam/brush agitator shown in FIG. 22*a;*

As best seen in FIGS. 15*a-c*, the stalk gap rail 34 lug supporting walls 172 can include depressed portions 172*d* extending between adjacent support/fastener pads 124 along the stalk gap rail walls 144 and sloping upwardly from the stalk gap rail walls 144 to the deck trough rail walls 174. The depressed portions 172*d* and the deck trough rail walls 174 can be adapted to act as cantilevered live hinges which can flex and tilt towards the deck troughs 164 for absorbing energy from the impact of the corn ears 16 against the row unit 10 and directing stripped/dislodged kernels away from the stalk gap 84. As best seen in FIG. 15*c*, the depressed portions 172*d* preferably have a curvilinear cross-sectional shape. Preferably, the dampening pockets 112 and the dampening inserts 126 can be shaped to match the curvilinear shape of the depressed portions 172*d.*

As shown in FIGS. 27*a-d*, the dampening pockets 112 can further include web portions 112*w* which are located between adjacent support/fastener pads 124 and extend between and connect the stalk gap rail walls 144, the lug supporting walls 172, and the deck trough rail walls 174. The web portions 112*w* can be adapted to support the stalk gap rail walls 144, the lug supporting walls 172, and the deck trough rail walls 174 and slightly increase the rigidity of the stalk gap rails 34 for increasing the wear-life thereof while minimizing stripping/dislodging of kernels from the corn ears 16. Preferably, the dampening pockets 112 can also include chamfered edge surfaces 112*ce* extending along the edges of the dampening pockets 112 adjacent the bottom rail surfaces 92.

As best seen in FIGS. 16, 18*a*, and 20*a-c*, dams/brush agitators 152 can be integrally formed with the stalk gap rails 34 extending into the deck troughs 164 from the longitudinal side surfaces 96 adjacent to the leading ends 86. The dams/brush agitators 152 can comprise dam plates 154 having top dam surfaces 156 and a plurality of agitating protrusions 158 extending upwardly from the top dam surfaces 156. The agitating protrusions 158 can be adapted to engage the sweeping portions 64 as the sweeping lugs 42 sweep across the deck plates 30*a*, 30*b* for thereby displacing and dislodging any debris lodged in the sweeping portions 64.

Alternatively, as best seen in FIGS. 17, 18*b*, 21, 22*a-d*, the dams/brush agitators 152 can be formed separately from the stalk gap rails 34 by injection molding or otherwise molding, forming, or shaping the dams/brush agitators 152 from a unitary material. Preferably, dam pockets 160 can be provided extending into the stalk gap rail bottom rail surfaces 92 for receiving a portion of the dam plates 154 therein. Yet more preferably, the dams/brush agitators 152 can further include dam bores 168 adapted to align with one or more rail bores 106 such that rail fasteners 110 can be extended through rail bores 106, through the dam bores 168, and through or into the fastener bores 108 for thereby clampingly fastening the dams/brush agitators 152 between stalk gap rails 34 and respective deck plates 30*a*, 30*b*.

Figures 23A, 23B:
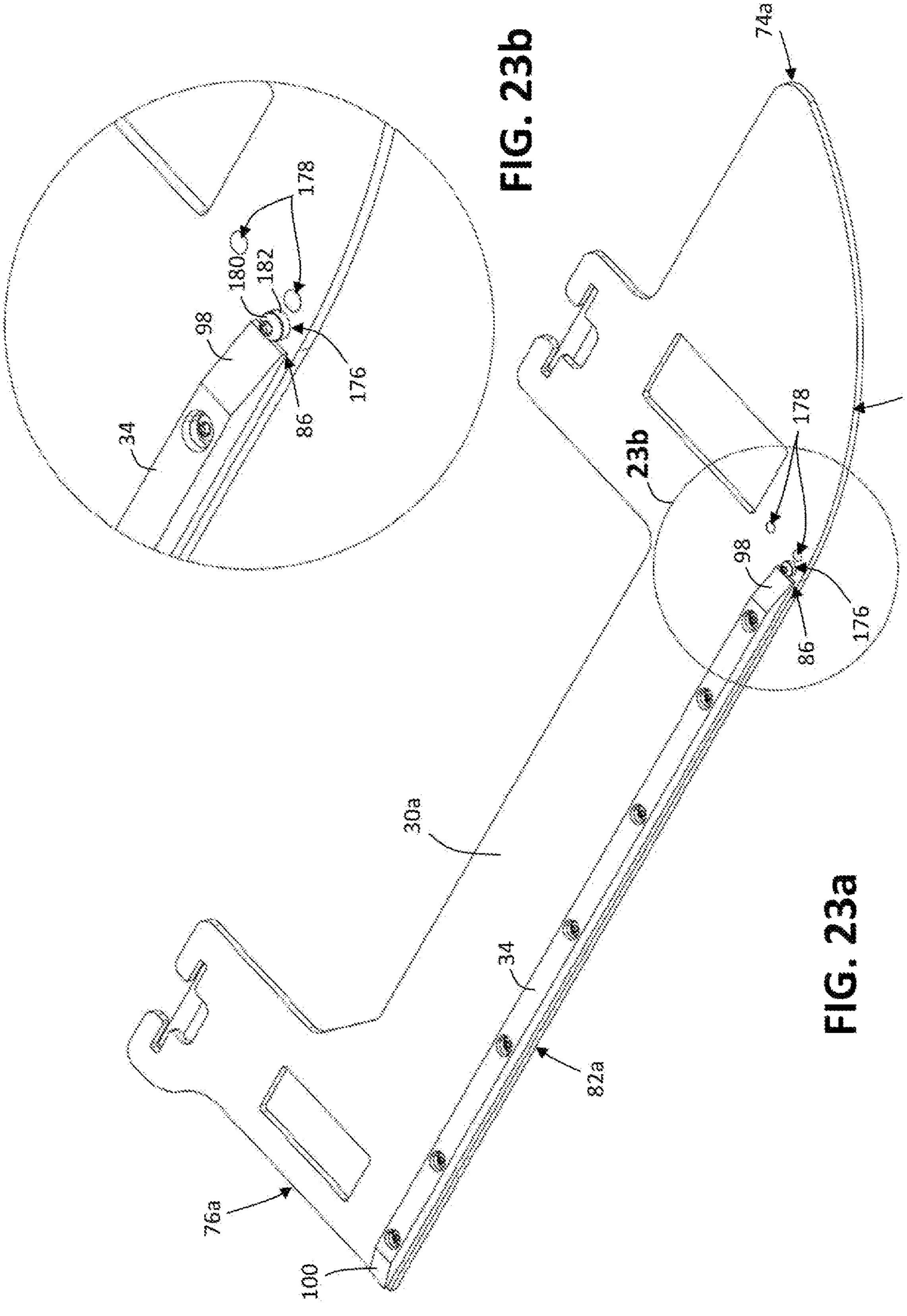
FIG. 23*a* is a perspective view of a deck plate, a stalk gap rail, and a rail end retaining element.
FIG. 23*b* is a magnified detail view of the Circled Detail 23*b* shown in FIG. 23*a;*
Figure 23C:
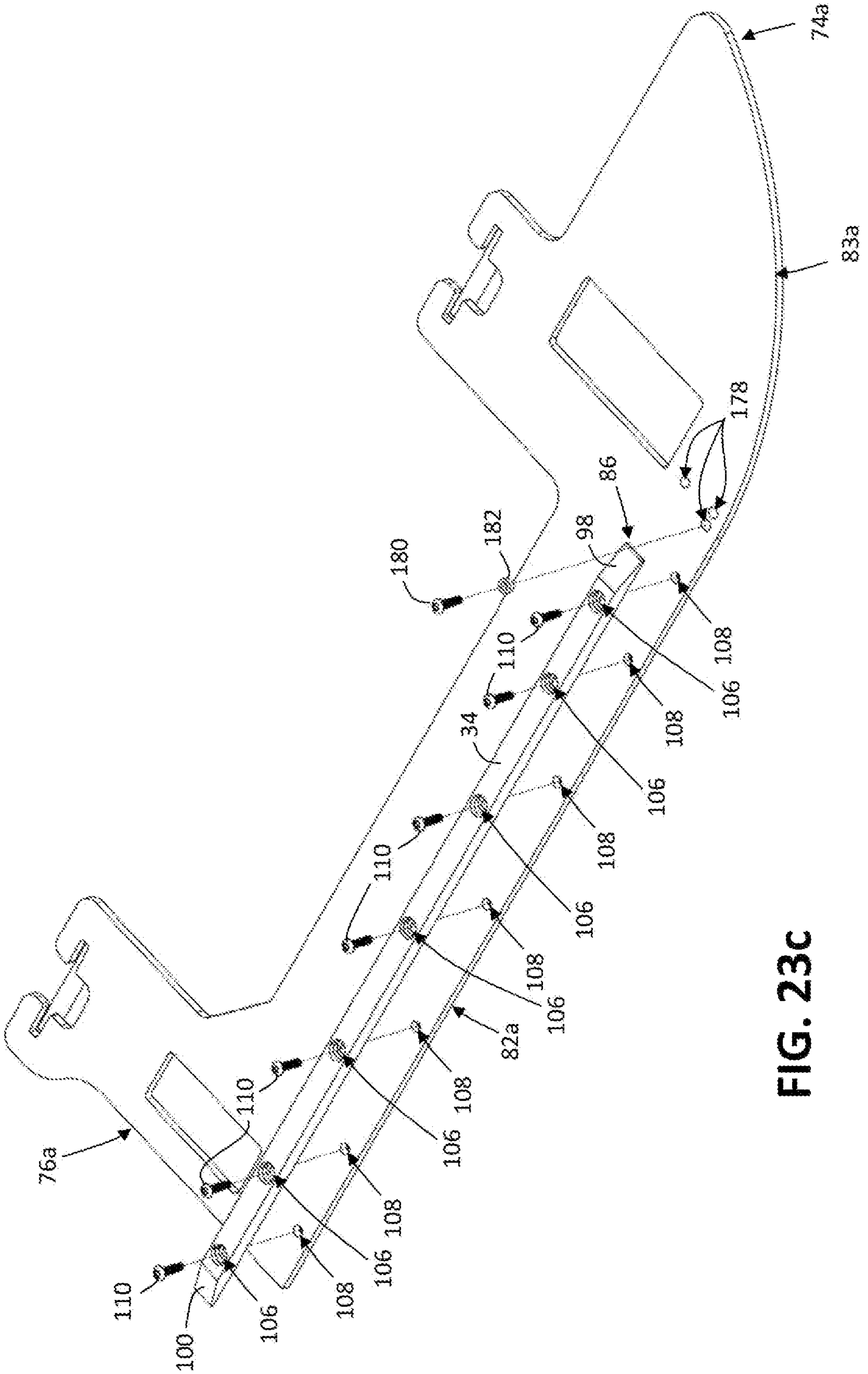
FIG. 23*c* is an exploded perspective view of the deck plate, stalk gap rail, and rail end retaining element shown in FIG. 23*a;*

Preferably, as shown in FIGS. 23*a-c*, the row units 10 can further include rail end retaining elements 176 which can be mounted to the deck plates 30*a*, 30*b* adjacent the stalk gap rail leading ends 86. During operation of the combine harvester 18, plant material and debris can become lodged underneath the stalk gap rail leading ends 86 causing them to lift upwardly away from the top deck surfaces 72*a*, 72*b*, respectively. If enough material builds up, the stalk gap rails 34 may be pulled/ripped apart from the row unit 10 by the gathering chains 40 and sweeping lugs 42. The retaining elements 176 are adapted to prevent material from becoming lodged underneath the leading ends 86 and thereby reduce the likelihood of the stalk gap rails 34 being pulled/ripped apart from the row unit 10.

In a first embodiment, as best seen in FIGS. 23*b* and 23*c*, the retaining elements 176 can comprise retaining fasteners 180. The retaining fasteners 180 can be, for example, bolts, screws, or rivets (not shown) which are adapted to engage retaining bores 178 provided extending through the deck plates 30*a*, 30*b* adjacent to the stalk gap rail leading ends 86. When mounted to the deck plates 30*a*, 30*b*, the retaining fasteners 180 are positioned between the stalk gap rail leading ends 86 and the deck plate first terminal ends 74*a*, 74*b*, respectively, and block material from becoming lodged underneath the leading ends 86.

Preferably, the retaining elements 176 can further include cylindrical, retaining collars 182. The retaining collars 182 can receive the retaining fasteners 180 therethrough and can be adapted for selectively increasing the height of the retaining elements 176 from the top deck surfaces 72*a*, 72*b*, respectively.

Figures 24A, 24B:
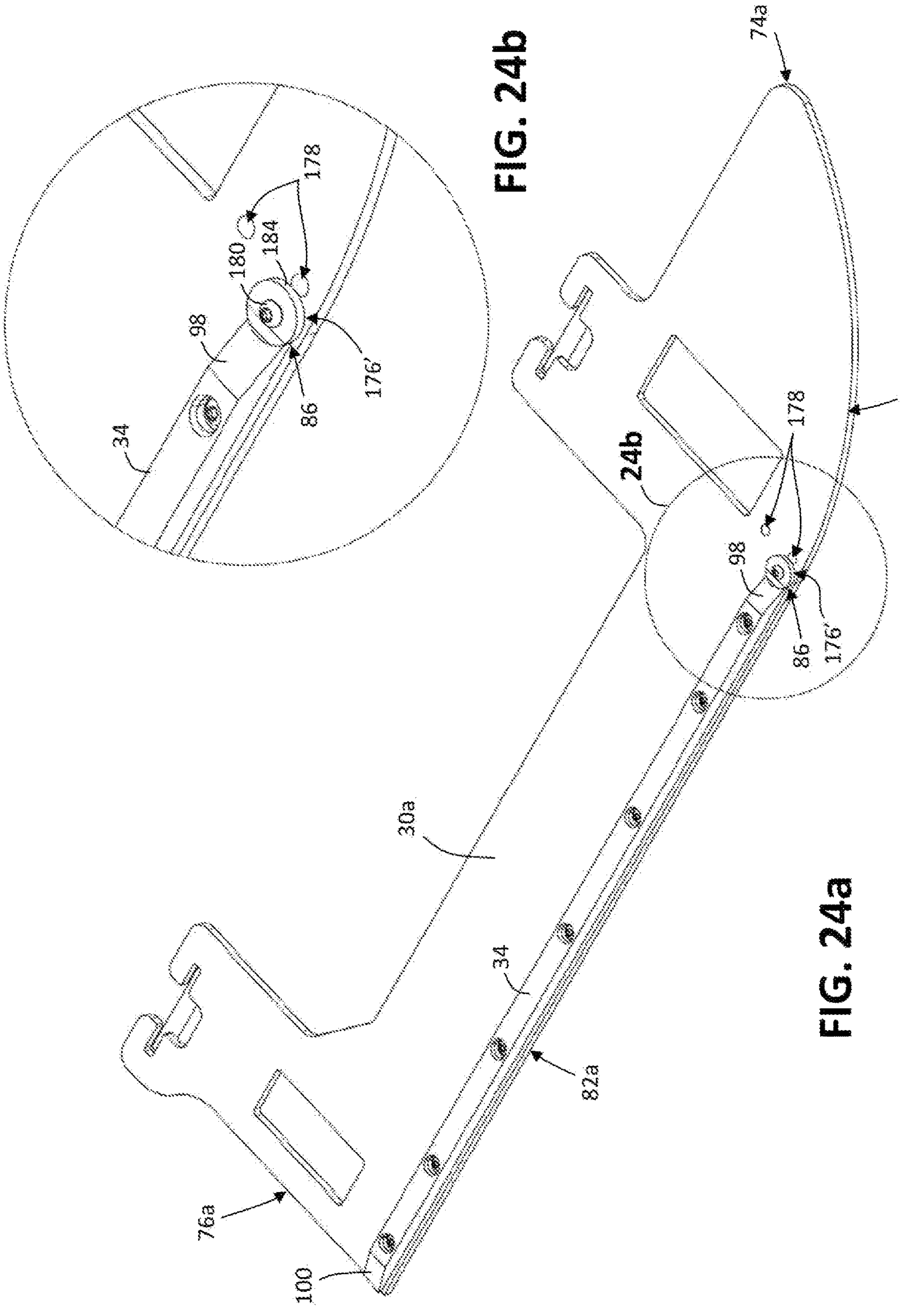
FIG. 24*a* is a perspective view of a deck plate, a stalk gap rail, and a second embodiment of the rail end retaining element.
FIG. 24*b* is a magnified detail view of the Circled Detail 24*b* shown in FIG. 24*a;*
Figure 24C:
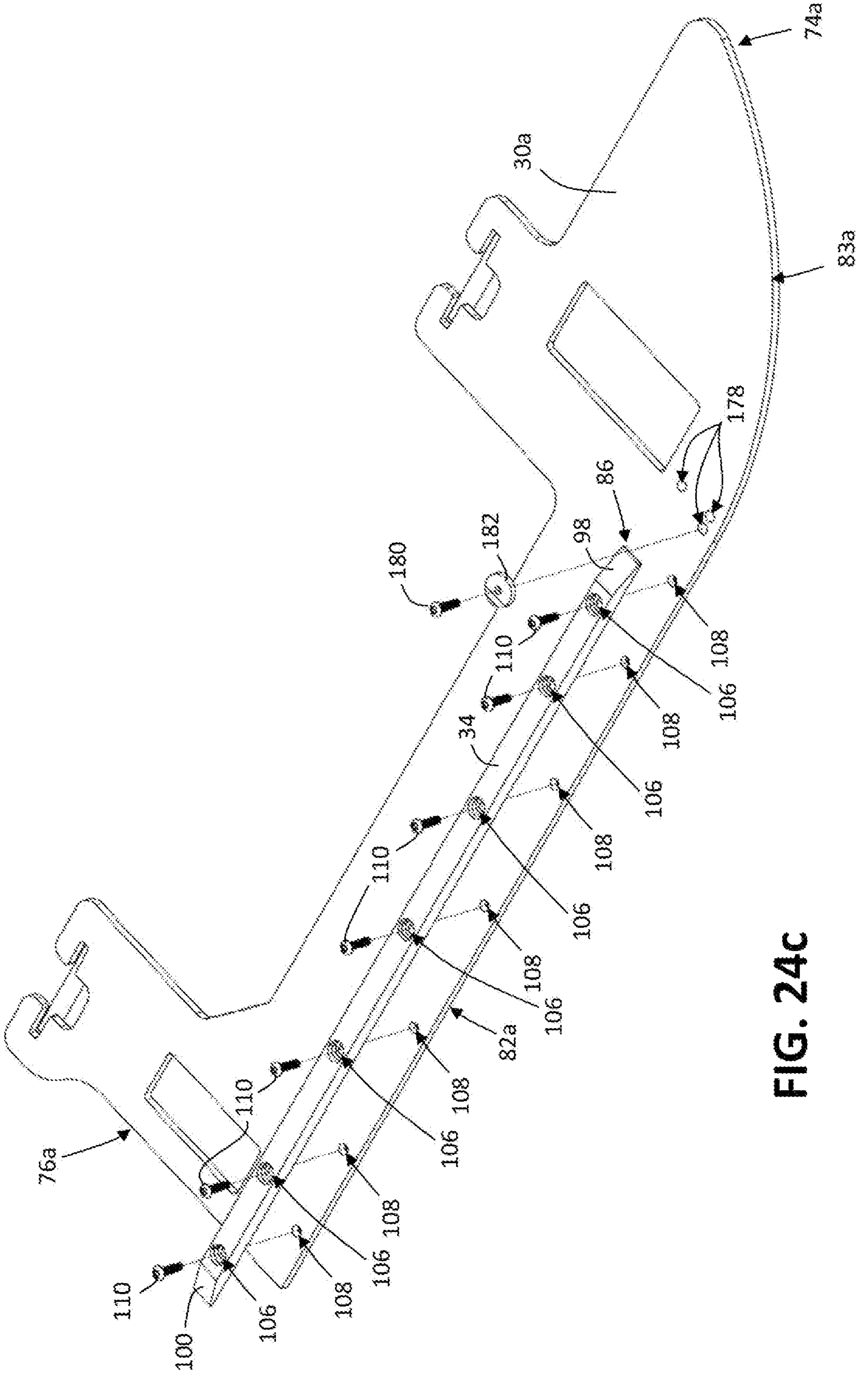
FIG. 24*c* is an exploded perspective view of the deck plate, stalk gap rail, and rail end retaining element shown in FIG. 24*a;*
Figures 25A, 25B:
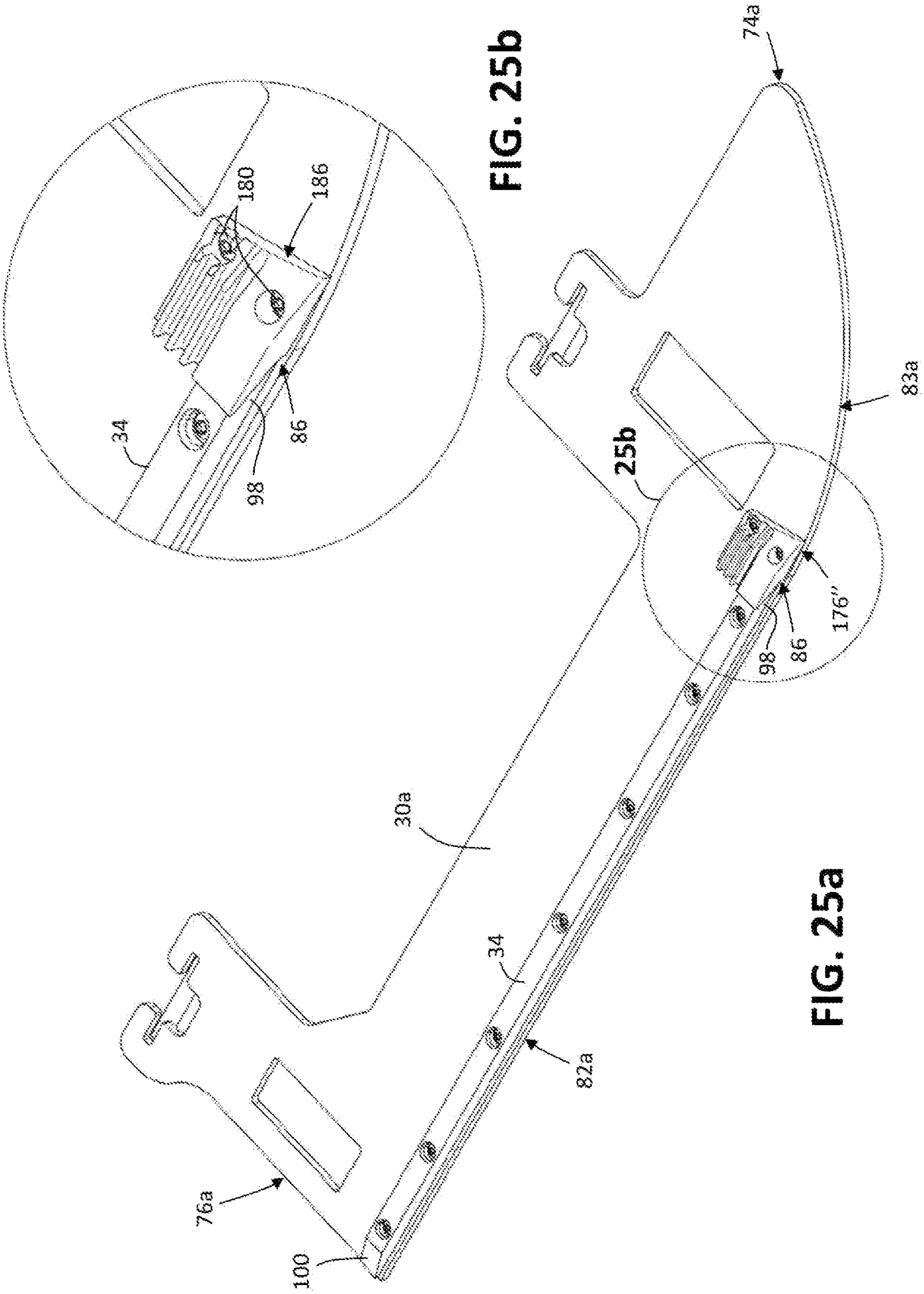
FIG. 25*a* is a perspective view of a deck plate, a stalk gap rail, and a retaining dam.
FIG. 25*b* is a magnified detail view of the Circled Detail 25*b* shown in FIG. 25*a;*
Figure 25C:
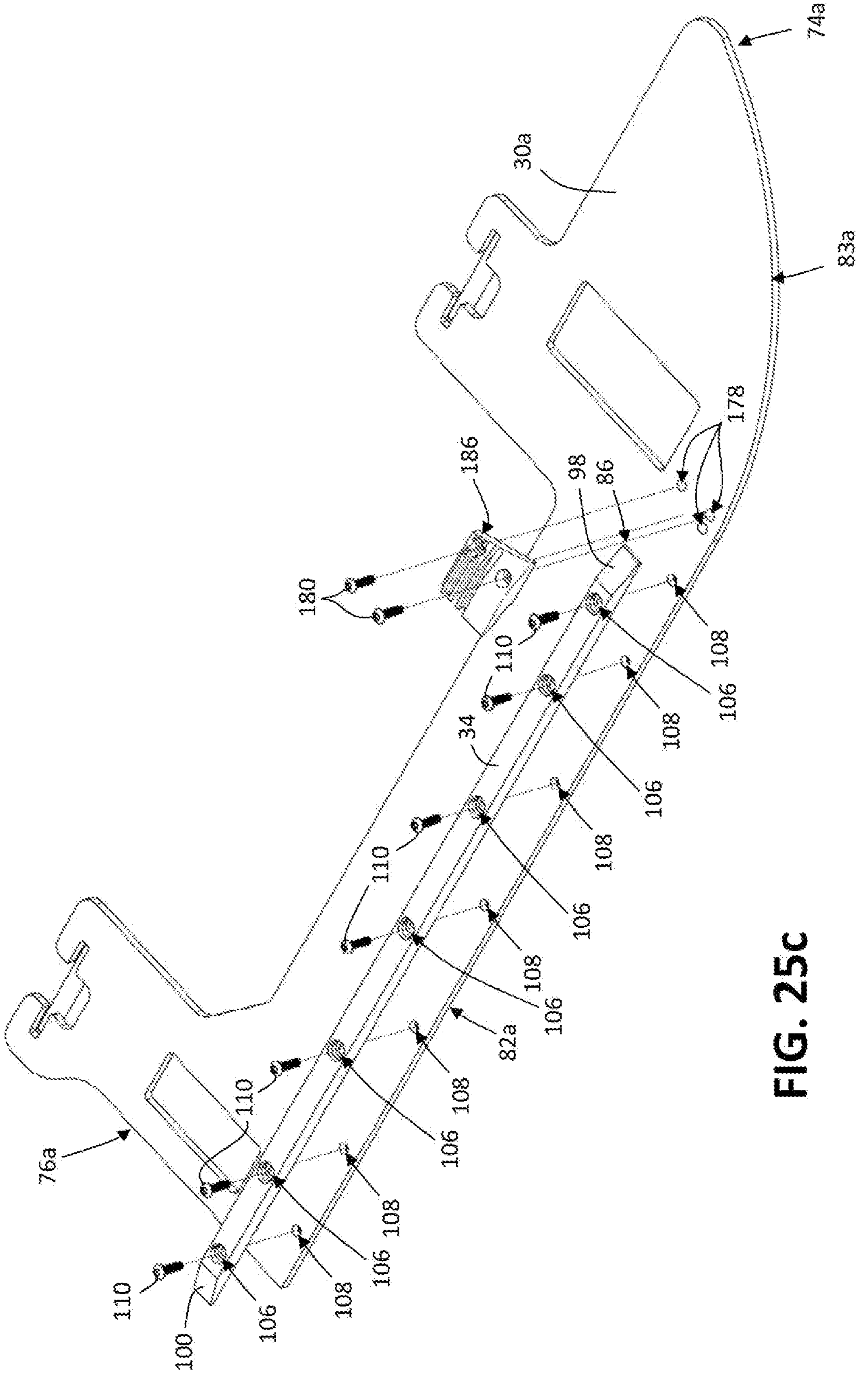
FIG. 25*c* is an exploded perspective view of the deck plate, stalk gap rail, and retaining dam shown in FIG. 25*a;*
Figure 26A:
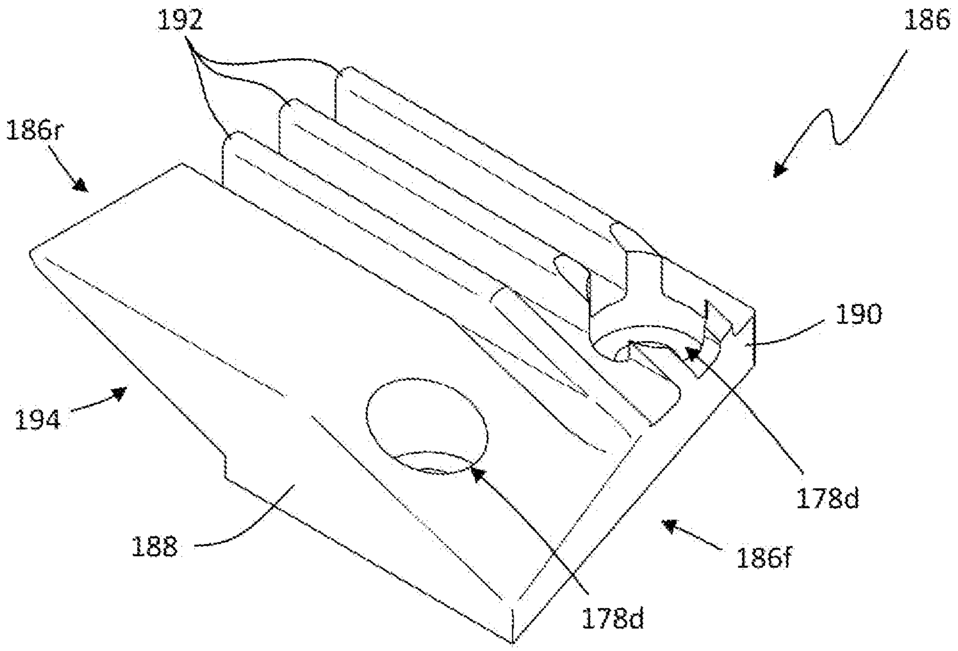
FIG. 26*a* is a perspective view of a retaining dam.
Figure 26B:
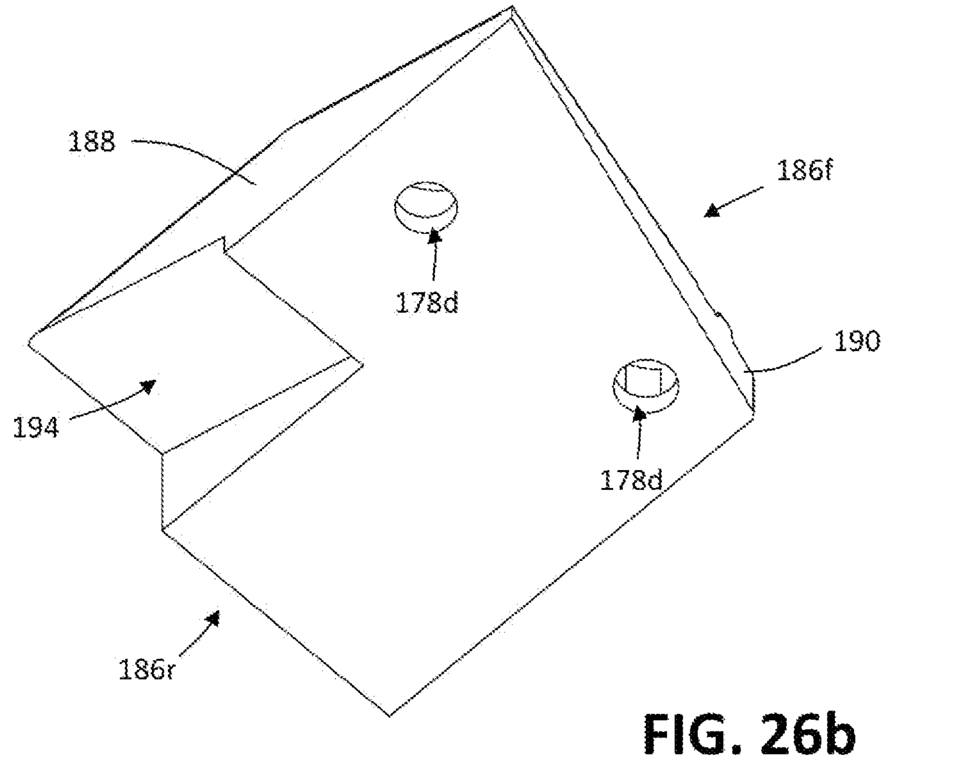
FIG. 26*b* is another perspective view of the retaining dam.
Figure 26D:
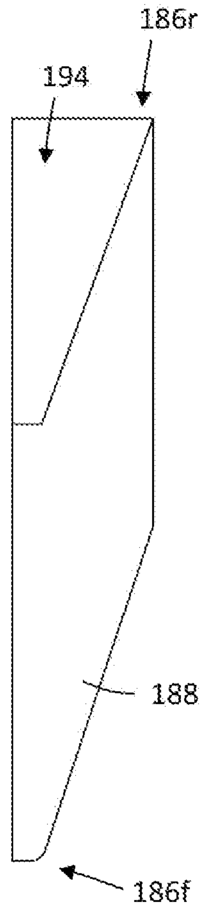
FIGS. 26*c-e* are top, front, and side elevation views of the retaining dam.
Figure 26C:
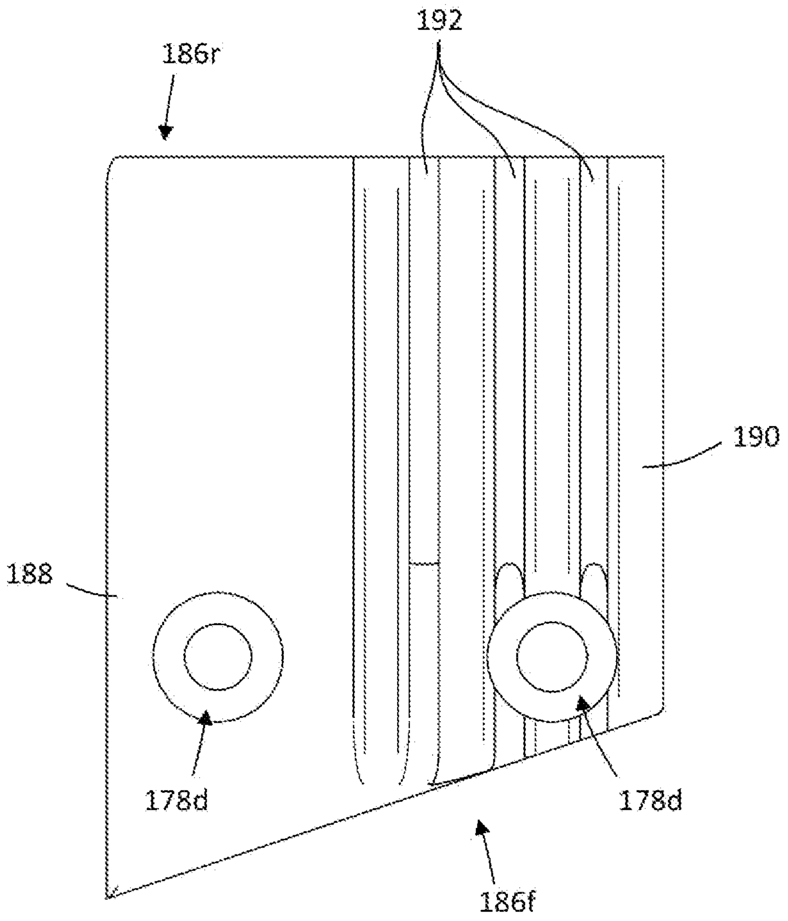
Figure 26E:
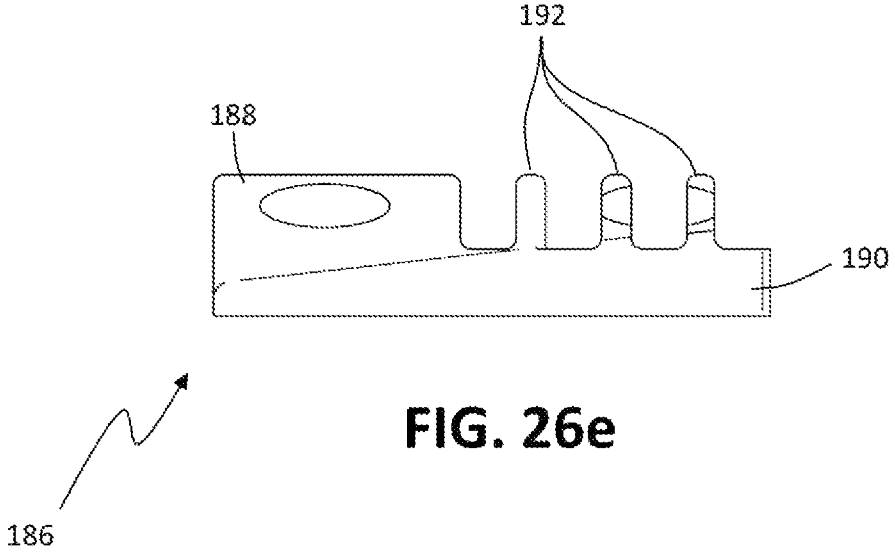
Figures 27A, 27B, 27C, 27D:
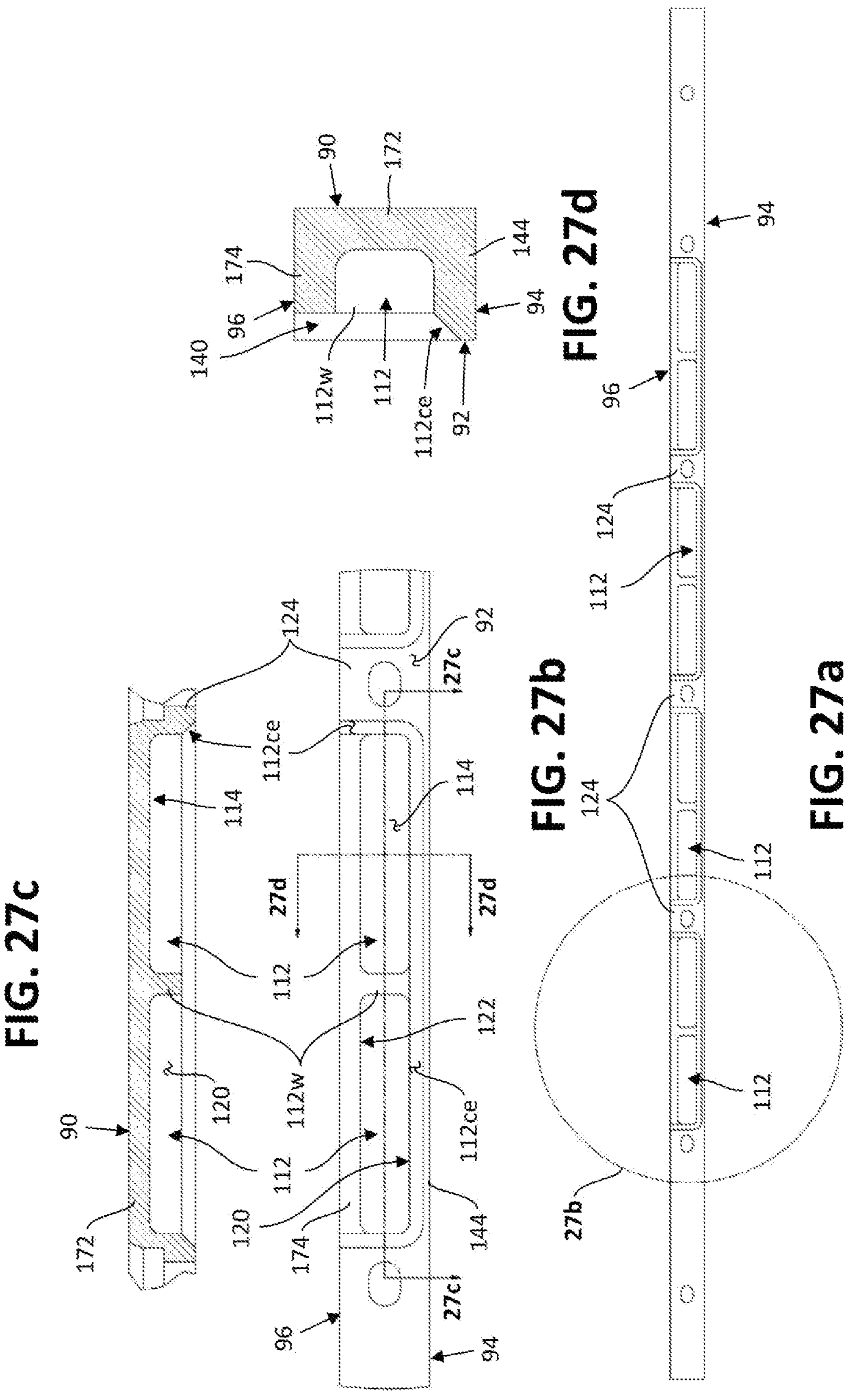
FIG. 27*a* is a bottom plan view of a stalk gap rail with dampening pockets having web portions.
FIG. 27*b* is a magnified detail view of the Circled Detail 27*b* shown in FIG. 27*a;*
FIG. 27*c* is a cross section view of the stalk gap rail taken along the line 27*c*-27*c* shown in FIG. 27*b;*
FIG. 27*d* is a cross section view of the stalk gap rail taken along the line 27*d*-27*d* shown in FIG. 27*b;*

In a second embodiment, as shown in FIGS. 24*a-c*, retaining elements 176' can comprise retaining fasteners 180 and retaining washers 184 which are adapted to be mounted to the deck plates 30*a*, 30*b* by the retaining fasteners 180. The retaining washers 184 are preferably sized such that when they are mounted to the deck plates 30*a*, 30*b*, respectively, a portion of each retaining washer 184 overlaps with and covers a portion of an adjacent stalk gap rail leading end 86 for thereby blocking material from becoming lodged thereunder.

In a third embodiment, as shown in FIGS. 25*a-c* and 26*a-e*, the row units 10 can include retaining dams 186 which are secured to the deck plates 30*a*, 30*b* by retaining fasteners 180. The retaining dams 186 can be adapted to receive and cover the stalk gap rail leading ramped portions 98. As best seen in FIGS. 26*a-e*, the retaining dams 186 comprise front ends 186*f*, rear ends 186*r*, ramped portions 188 sloping upwardly from the front ends 186*f* towards the rear ends 186*r*, plate portions 190 extending horizontally from the ramped portions 188, agitating ridges 192, and rail end receiving pockets 194.

The rail end receiving pockets 194 are adapted to receive the leading ramped portions 98 and are formed extending into the retaining dam rear ends 186*r* into the ramped portions 188. The agitating ridges 192 extend vertically from the plate portions 190 and are adapted to engage the sweeping portions 64 for thereby displacing and dislodging any debris lodged therein. Preferably, retaining dam bores 178*d* are formed extending through the retaining dams 186, the retaining dam bores 178*d* being adapted to align with the retaining bores 178 and to receive the retaining fasteners 180 therethrough for thereby securing the retaining dams 186 to the deck plates 30*a*, 30*b*.

Figure 28:
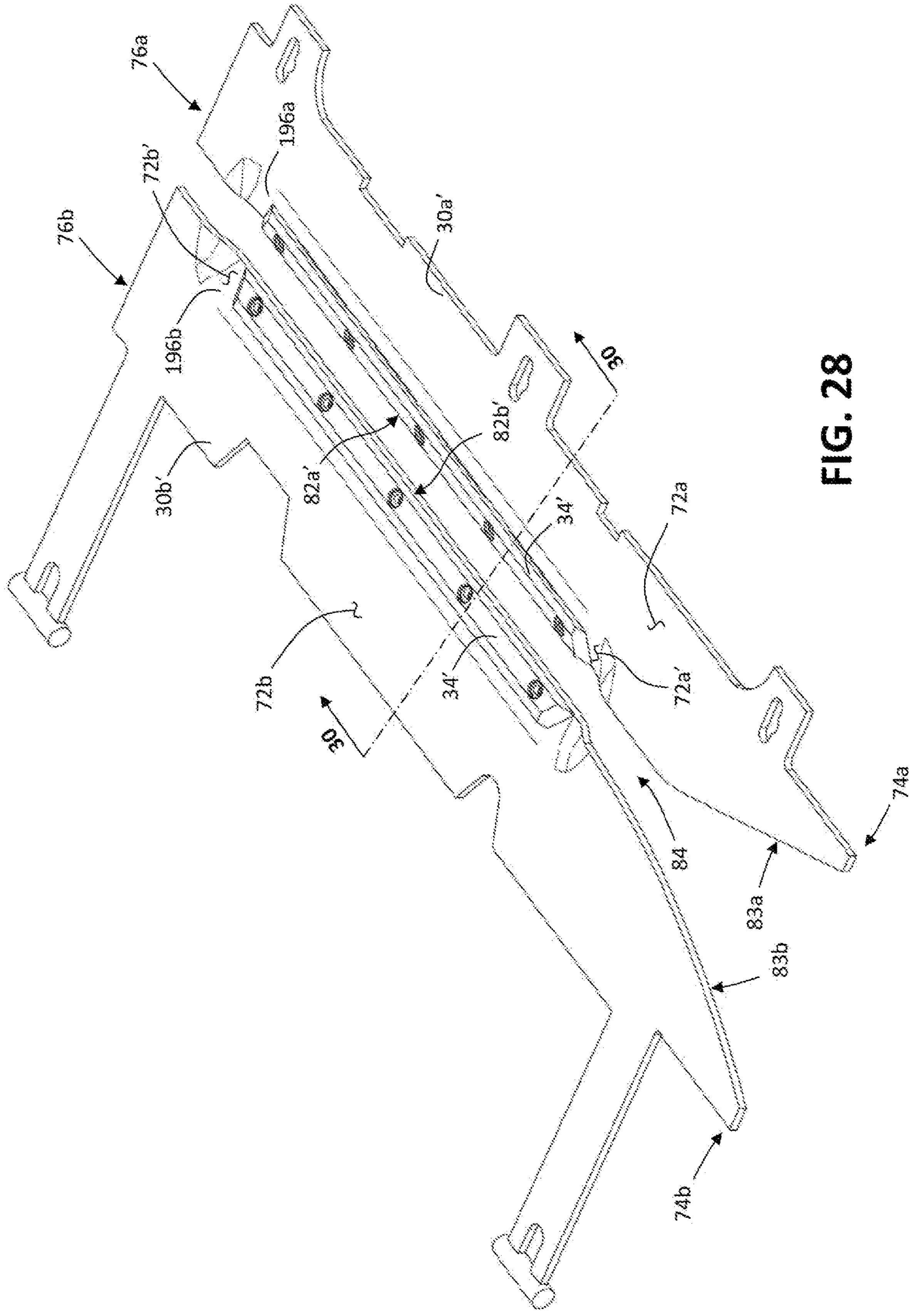
FIG. 28 is a perspective view of deck plates having beveled stripping portions and beveled stalk gap rails.
Figure 29:
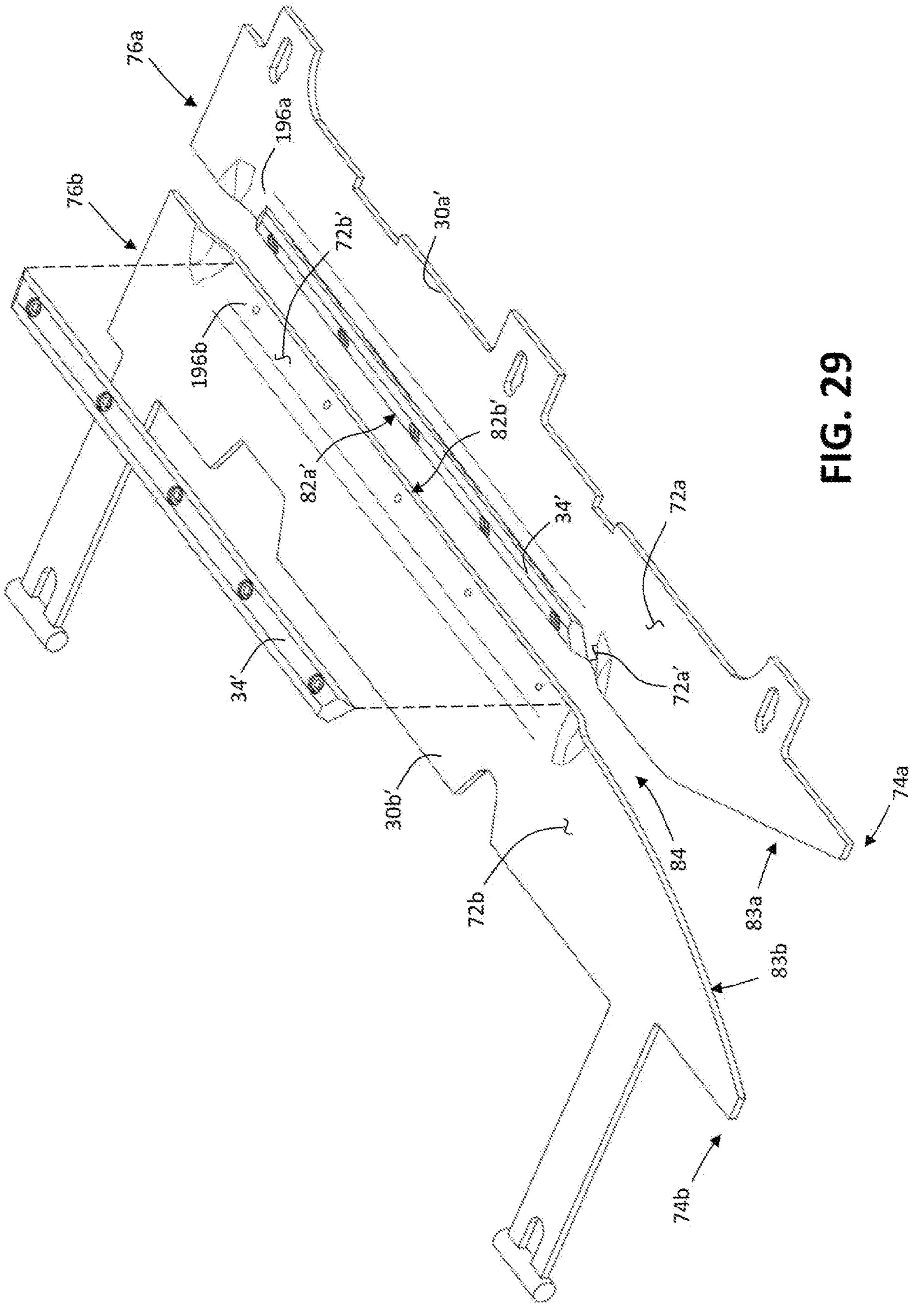
FIG. 29 is a partially exploded view of the deck plates and stalk gap rails shown in FIG. 28.
Figure 30:
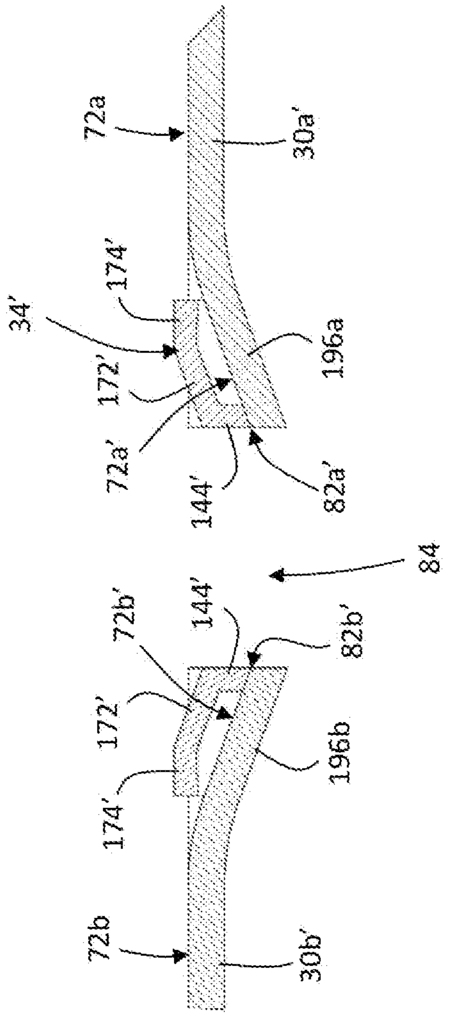
FIG. 30 is a cross section view of the deck plates and stalk gap rails taken along the line 30-30 shown in FIG. 28.
Figure 31A:
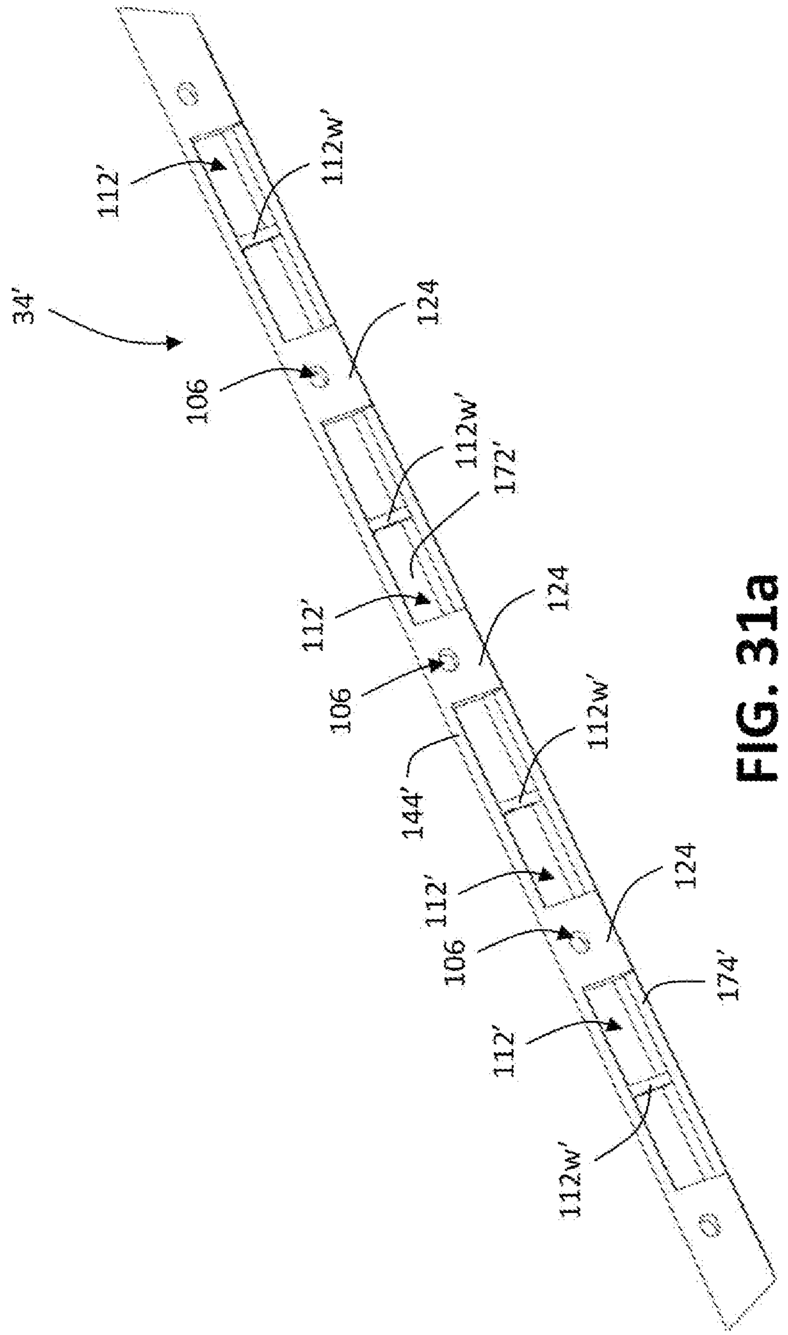
FIG. 31*a* is a perspective view of a beveled stalk gap rail.
Figure 31C:
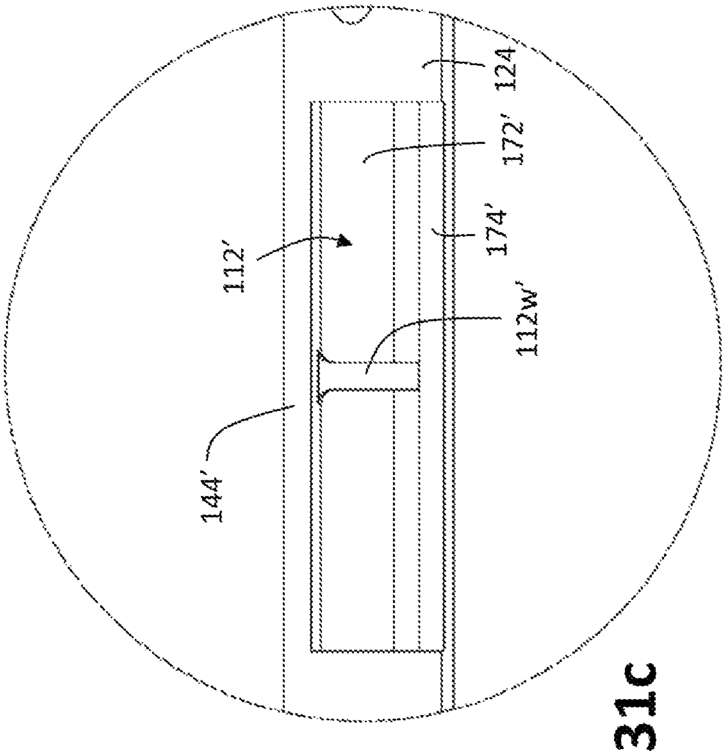
FIG. 31*b* is a bottom plan view of the beveled stalk gap rail shown in FIG. 31*a*; and, FIG. 31*c* is a magnified detail view of the Circled Detail 31*c* shown in FIG. 31*b.*
Figure 31B:
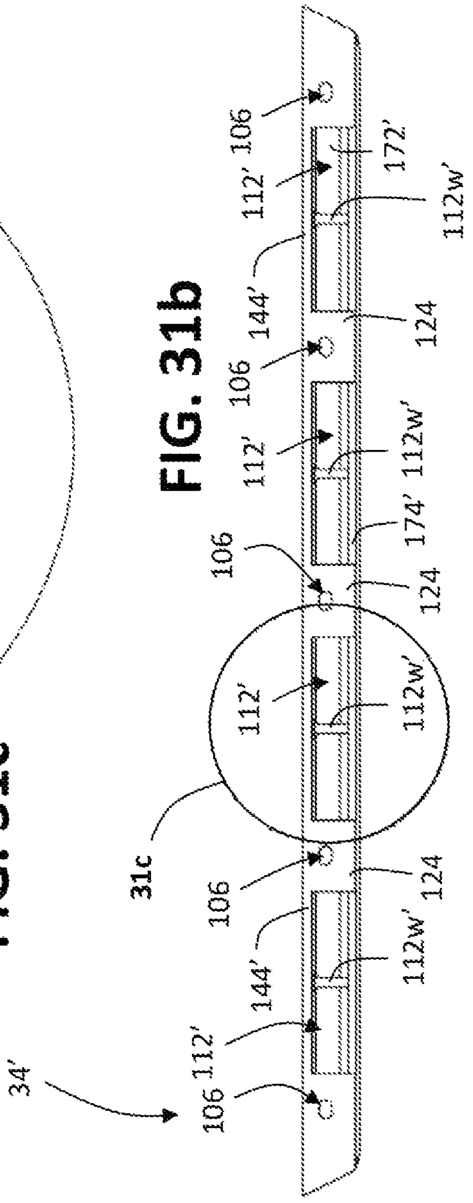

Turning to FIGS. 28-30, in another embodiment, the row unit 10 can include beveled deck plates 30*a'*, 30*b'* having depressed, beveled stripping portions 196*a*, 196*b*, respectively, and beveled stalk gap rails 34' which are adapted to be mounted to the beveled stripping portions 196*a*, 196*b*. The beveled stripping portions 196*a*, 196*b* extend along a portion of the stripping edges 82*a*, 82*b* between the first and second deck plate terminal ends 74*a*, 74*b*, 76*a*, 76*b*, respectively. As best seen in FIG. 30, the beveled stripping portions 196*a*, 196*b* slope downwardly from the top deck surfaces 72*a*, 72*b* towards depressed stripping edges 82*a'*, 82*b'*, respectively, and include sloped deck surfaces 72*a'*, 72*b'*, respectively. In operation, when the corn ears 16 strike and are pulled against the row unit 10, the beveled stripping portions 196*a*, 196*b* are shaped such that the corn ears 16 strike the sloped deck surfaces 72*a'*, 72*b'* rather than the depressed stripping edges 82*a'*, 82*b'* for thereby reducing the number of kernels stripped/dislodged apart from the corn ears 16.

As best seen in FIGS. 30 and 31*a-d*, beveled stalk gap rails 34' can be mounted to the beveled stripping portions 196*a*, 196*b* extending along the depressed stripping edges 82*a*', 82*b*', respectively. The beveled stalk gap rails 34' can include vertical stalk gap rail walls 144', sloped, lug supporting rail walls 172', horizontal deck trough rail walls 174', and dampening pockets 112' having web portions 112*w*' which extend between the stalk gap rail walls 144', sloped rail walls 172', and deck trough rail walls 174'.

As discussed hereinabove with respect to other embodiments of the stalk gap rails 34, the beveled stalk gap rails 34' are adapted such that the stalk gap rail walls 144', the sloped, lug supporting rail walls 172', and the deck trough rail walls 174' flex and bend when a corn ear 16 strikes and is pulled against the stalk gap rails 34' for thereby absorbing energy from the impact. Additionally, the beveled stalk gap rails 34' are shaped to mimic the beveled stripping portions 196*a*, 196*b* such that the corn ears 16 strike the sloped, lug supporting rail walls 172' rather than the corner edges formed between the sloped, lug supporting rail walls 172' and the vertical stalk gap rail walls 144' for thereby further reducing stripping/dislodging of kernels from the corn ears 16.

While this invention has been described as having exemplary designs, the present invention may be further modified within the spirit and scope of this disclosure. This application is therefore intended to cover any variations, uses, or adaptations of the invention using its general principles. Additionally, although various features, and various embodiments of the stalk gap rails 34 have been shown and described hereinabove, it should be understood that the stalk gap rails 34 can include any or all of the features shown and described hereinabove and any and all combinations thereof

What is claimed is:

1. A harvester row unit comprising:
- a first deck plate having a first stripping edge;
- a second deck plate having a second stripping edge, wherein the first and second stripping edges are facing and spaced apart for defining a stalk gap therebetween;
- a first gathering chain extending over the first deck plate, the first gathering chain comprising a plurality of sweeping lugs adapted to traverse adjacent to and along the stalk gap;
- a second gathering chain extending over the second deck plate, the second gathering chain comprising a plurality of sweeping lugs adapted to traverse adjacent to and along the stalk gap;
- one or more elastically compressible stalk gap rails mounted to the first and second deck plates adjacent to and extending along the first and second stripping edges, the one or more elastically compressible stalk gap rails having a ramped leading end and a trailing end; and,
- wherein as the sweeping lugs traverse adjacent to and along the stalk gap, the sweeping lugs engage the stalk gap rails and climb up the ramped leading end, traverse across the stalk gap rails, and climb down the trailing end.

2. The harvester row unit of claim 1, wherein the stalk gap rails are constructed from a material other than metal.

3. The harvester row unit of claim 1, wherein the stalk gap rails are constructed from a material selected from the group consisting of ultra-high molecular weight polyethylene, high-density polyethylene, and nylon.

4. The harvester row unit of claim 1, wherein the stalk gap rails further comprise support pads which abut the first and second deck plates and flexible beams which are supported above the first and second deck plates by the support pads.

5. The harvester row unit of claim 1, wherein one or more pockets are formed extending into the stalk gap rails.

6. The harvester row unit of claim 1, wherein the trailing end of the stalk gap rails is ramped.

7. The harvester row unit of claim 1, wherein the stalk gap rails are mounted to the first and second deck plates with one or more fasteners each of which is received through a fastener bore extending through the stalk gap rail, and wherein one or more pockets are formed in the stalk gap rails between adjacent fastener bores.

8. The harvester row unit of claim 1, wherein agitating portions are provided adjacent the stalk gap rails.

9. The harvester row unit of claim 8, wherein the agitating portions are adjacent the ramped leading ends.

10. The harvester row unit of claim 8, wherein the agitating portions comprise dam plates which extend from the stalk gap rails away from the stalk gap and agitating protrusions which extend from the dam plates away from the first and second deck plates.

11. The harvester row unit of claim 4 further comprising one or more rail end retaining elements mounted to the first and second deck plates adjacent to the stalk gap rail ramped leading end, wherein the rail end retaining elements prevent lodging of debris under the ramped leading end.

12. The harvester row unit of claim 11, wherein the one or more rail end retaining elements comprise retaining fasteners which are adapted to be secured to the first and second deck plates.

13. The harvester row unit of claim 11, wherein the one or more rail end retaining elements comprise ramped portions having rail end receiving pockets formed therein and agitating portions extending from the ramped portions, wherein the ramped leading ends are received into rail end receiving pockets.

14. The harvester row unit of claim 13, wherein the agitating portions extend from the ramped portions away from the respective first and second stripping edges.

15. A harvester row unit comprising:
- a first deck plate having a first stripping edge;
- a second deck plate having a second stripping edge, wherein the first and second stripping edges are facing and spaced apart for defining a stalk gap therebetween;
- a first gathering chain extending over the first deck plate, the first gathering chain comprising a plurality of sweeping lugs adapted to traverse adjacent to and along the stalk gap;
- a second gathering chain extending over the second deck plate, the second gathering chain comprising a plurality of sweeping lugs adapted to traverse adjacent to and along the stalk gap;
- one or more elastically compressible stalk gap rails mounted to the first and second deck plates adjacent to and extending along the first and second stripping edges, the one or more elastically compressible stalk gap rails comprising:
- an elongate body including a plurality of support pads and one or more pockets between adjacent support pads defining one or more flexible walls; and,
- wherein the flexible walls elastically deform when impacted by kernel carriers.

16. The harvester row unit of claim 15, wherein the elongate body is constructed from a first elastic polymer, and wherein one or more of the pockets are filled with a second elastic polymer.

17. The harvester row unit of claim 16, wherein the first elastic polymer is more wear-resistant than the second elastic polymer, and wherein the second elastic polymer is more pliable than the first elastic polymer.

18. The harvester row unit of claim 16, wherein the first elastic polymer is a high density, wear-resistant polymer, and wherein the second elastic polymer is a low-density, pliable elastic polymer.

19. The harvester row unit of claim 15, wherein the body further comprises opposite, longitudinal side surfaces, wherein a pair of side rail walls are defined between the longitudinal side surfaces and the pockets, and wherein one or more slots are formed extending through one of the side rail walls, through the bottom rail surface, and into one or more of the pockets.

20. The harvester row unit of claim 19, wherein one or more of the pockets and one or more of the slots are filled with a pliable elastic material.

21. The harvester row unit of claim 16, wherein the first elastic polymer is constructed from a material selected from the group consisting of ultra-high molecular weight polyethylene, high-density polyethylene, and nylon, and wherein the second elastic polymer is constructed from a material selected from a group consisting of silicone, polyurethane and rubber.

* * * * *